(12) United States Patent
Yoshiike et al.

(10) Patent No.: US 8,311,677 B2
(45) Date of Patent: Nov. 13, 2012

(54) CONTROL DEVICE FOR LEGGED MOBILE ROBOT

(75) Inventors: Takahide Yoshiike, Wako (JP); Hiroyuki Kaneko, Wako (JP); Atsuo Orita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 241 days.

(21) Appl. No.: 12/912,178

(22) Filed: Oct. 26, 2010

(65) Prior Publication Data

US 2011/0098860 A1 Apr. 28, 2011

(30) Foreign Application Priority Data

Oct. 28, 2009 (JP) ................................. 2009-248104

(51) Int. Cl.
*G05B 19/00* (2006.01)
(52) U.S. Cl. ........ 700/260; 700/245; 700/246; 700/252; 700/254; 901/1; 901/47; 901/50
(58) Field of Classification Search .................. 700/245, 700/246, 252, 254, 260; 901/1, 47, 50
See application file for complete search history.

(56) References Cited

U.S. PATENT DOCUMENTS

| | | | | |
|---|---|---|---|---|
| 5,838,130 A * | 11/1998 | Ozawa | ........................ | 318/568.2 |
| 6,992,457 B2 * | 1/2006 | Furuta et al. | ............. | 318/568.12 |
| 6,999,851 B2 * | 2/2006 | Kato et al. | ..................... | 700/245 |
| 7,236,852 B2 * | 6/2007 | Moridaira et al. | ............ | 700/245 |
| 7,386,364 B2 * | 6/2008 | Mikami et al. | ................ | 700/245 |
| 7,606,634 B2 * | 10/2009 | Takenaka et al. | ............. | 700/260 |
| 7,734,377 B2 * | 6/2010 | Hasegawa | ..................... | 700/252 |
| 2004/0205417 A1 * | 10/2004 | Moridaira et al. | .............. | 714/48 |
| 2007/0126387 A1 * | 6/2007 | Takenaka et al. | .......... | 318/568.2 |
| 2007/0152620 A1 * | 7/2007 | Takenaka et al. | ........ | 318/568.13 |
| 2008/0065269 A1 * | 3/2008 | Hasegawa | ..................... | 700/260 |
| 2008/0208391 A1 * | 8/2008 | Hasegawa et al. | ............. | 700/245 |
| 2009/0312867 A1 * | 12/2009 | Hasegawa et al. | ............. | 700/245 |

FOREIGN PATENT DOCUMENTS

| | | |
|---|---|---|
| JP | 3269852 | 1/2002 |
| JP | 4246638 | 1/2009 |

* cited by examiner

*Primary Examiner* — Dalena Tran
*Assistant Examiner* — Jonathan L Sample
(74) *Attorney, Agent, or Firm* — Rankin, Hill & Clark LLP

(57) ABSTRACT

A control device for a legged mobile robot has a unit which generates the time series of a future predicted value of a model external force manipulated variable as a feedback manipulated variable for reducing the deviation of the posture of the robot. A desired motion determining unit sequentially determines the instantaneous value of a desired motion such that the motion of the robot will reach or converge to a reaching target in the future in the case where it is assumed that the time series of an additional external force defined by the time series of a future predicted value of the model external force manipulated variable is additionally applied to the robot on a dynamic model.

4 Claims, 20 Drawing Sheets

ORIGIN OF SUPPORTING
LEG COORDINATE SYSTEM

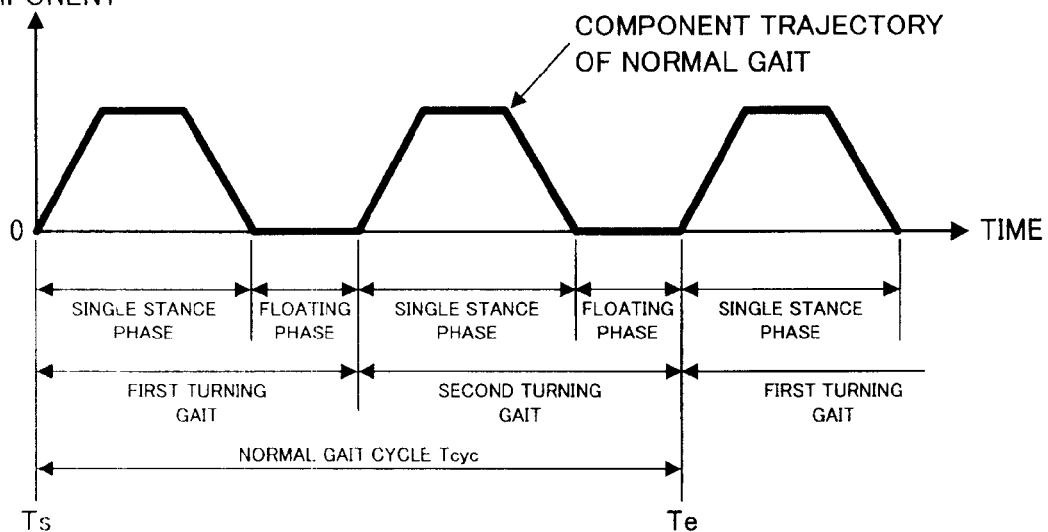
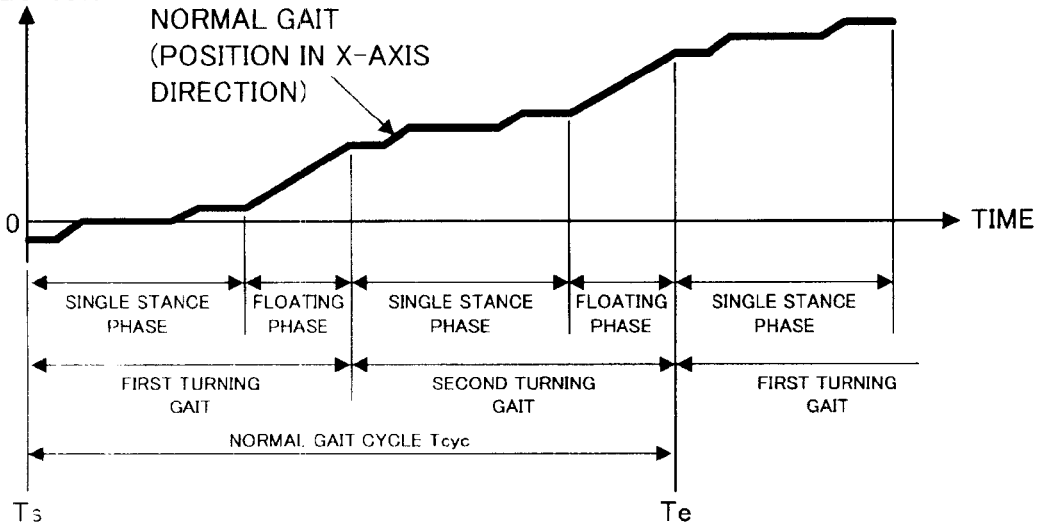

CONTROL DEVICE FOR LEGGED MOBILE ROBOT

BACKGROUND OF THE INVENTION

1. Field of the Invention

The present invention relates to a control device for a legged mobile robot, such as a bipedal robot.

2. Description of the Related Art

As a technique for enhancing the stability of the posture of a legged mobile robot, which travels by moving a plurality of legs extended from a base body, the technique disclosed in, for example, Japanese Patent No. 3269852 has been proposed by the applicant of the present application.

According to the technique, a state amount deviation of an actual posture of the body of a robot from a desired posture is observed, and an operational moment (an operational moment about a desired ZMP) to be additionally applied to the robot is calculated according to a PD law (proportional-differential law) from the observed value of the state amount deviation as the feedback manipulated variable (control input) required to converge the state amount deviation to zero.

Further, the operational moment is divided into an actual robot manipulation moment to be directly applied to an actual robot and a model manipulation moment to be applied to a robot in a dynamic model for generating a desired gait of the robot.

In the actual robot, the motions of the actual robot are controlled by compliance control such that the actual motion of the robot follows the motion of a desired gait (desired motion). Further, in the dynamic model, a desired gait of the robot is generated such that a model manipulation moment is generated about the desired ZMP.

Thus, in the case where the actual posture of the body of the robot deviates from a desired posture due to a disturbance or the like, a floor reaction force moment for eliminating the deviation is applied to the robot.

Further, a technique for generating in real time a desired gait that permits a continuous motion of a robot has been proposed in, for example, Japanese Patent No. 4246638 by the applicant of the present application. According to the technique, a desired gait is generated such that the motion of the desired gait to be generated anew is converged to a virtual reference motion, which is a future convergence target.

In the technique, to generate the time series of a new desired gait, a cyclic motion in which a motion of the same pattern is repeated is set as a reference motion (the motion of a normal gait). Then, the time series of the new desired gait is generated such that the time series of the new desired gait is converged to the aforesaid reference motion in the future. The technique disclosed in Japanese Patent No. 4246638 adopts the technique disclosed in Japanese Patent No. 3269852. In this case, according to the technique disclosed in Japanese Patent No. 4246638, the motion of a desired gait is sequentially determined by determining the trajectory of a desired ZMP such that the motion of a desired gait to be generated anew can be converged to a reference motion and the aforesaid model manipulation moment is generated about the determined desired ZMP.

In the technique disclosed in Japanese Patent No. 4246638, the reference motion providing the future convergence target of the desired gait to be generated anew is set on the assumption that the moment in the motion (specifically, the horizontal component of the moment) about a desired ZMP is zero. Therefore, the trajectory of the desired ZMP in the motion of the desired gait to be generated anew is also determined on the assumption that the horizontal component of the moment about the desired ZMP in the future will be zero.

Meanwhile, when the instantaneous value of the motion of a desired gait is sequentially determined using the trajectory of the desired ZMP determined as described above, the instantaneous value of the motion is determined such that the aforesaid model manipulation moment is generated about the desired ZMP on a dynamic model. In this case, the aforesaid state amount error related to the posture of a robot 1 does not usually converge to zero instantly. Hence, there are cases where a state in which the aforesaid non-zero model manipulation moment is fed back to the dynamic model for generating gaits lasts for a relatively long period of time.

In such a case, there is a possibility that the motion of the desired gait to be actually generated deviates from an appropriate motion that converges to the reference motion, which is the convergence target. As a result, a motion of a desired gait that makes it difficult for the robot 1 to accomplish a continuous motion may be undesirably generated.

SUMMARY OF THE INVENTION

The present invention has been made with a view of the background described above, and it is an object of the invention to provide a control device capable of controlling the motion of a robot by generating a desired motion that makes it possible to properly achieve a continuous motion of the robot and a reduction in the deviation of an actual posture of the robot from a desired posture.

To this end, a control device for a legged mobile robot in accordance with the present invention is adapted to control the motion of a legged mobile robot, which travels by moving, a plurality of legs extended from a base body thereof, by sequentially determining the instantaneous value of a desired motion of the robot and by controlling the motion of the robot such that an actual motion of the robot follows the time series of the instantaneous value of the desired motion, the control device including:

a desired motion determining unit which uses a preset dynamic model expressing the dynamics of the robot and carries out arithmetic processing for calculating a motion of the robot on the dynamic model so as to sequentially determine an instantaneous value of a desired motion of the robot;

a motion control unit which controls the motion of the robot so as to cause the actual motion of the robot to follow the time series of the instantaneous value of the desired motion;

a feedback manipulated variable determining unit which sequentially observes a posture state amount error indicating the degree of deviation of an actual posture of the robot from a posture of the robot defined by the instantaneous value of the desired motion, and sequentially determines, on the basis of the observed value of the posture state amount error, at least a model external force manipulated variable specifying an additional external force to be additionally applied to the robot on the dynamic model as a feedback manipulated variable having a function for bringing the posture state amount error close to zero;

a model external force manipulated variable predicting unit which determines the time series of a future predicted value of the model external force manipulated variable supplied to the desired motion determining unit from the feedback manipulated variable determining unit on the basis of the determined model external force manipulated variable; and a future target determining unit which determines a future reaching target of a desired motion of the robot.

wherein the desired motion determining unit includes at least a unit which determines arithmetic parameters necessary for the arithmetic processing by using the time series of a future predicted value of the determined model external force manipulated variable and the determined reaching target such that a requirement that the time series of the instantaneous value of the desired motion determined in the case where it is assumed that the arithmetic processing is carried out while additionally applying the time series of an additional external force, which is defined by the time series of a future predicted value of the determined model external force manipulated variable, to the robot on the dynamic model in a predetermined period in the future will reach or converge to the determined reaching target in the future is satisfied, and carries out the arithmetic processing by using the arithmetic parameters while additionally applying the additional external force, which is defined by the model external force manipulated variable determined by the feedback manipulated variable determining unit, to the robot on the dynamic model (a first aspect of the invention).

In the present description, the term "external force" acting on the robot may mean only a floor reaction force acting from a floor of an environment in which a robot travels or may also include an external force other than the floor reaction force. For example, in a case where a robot comes in contact with an external object other than a floor during an operation, such as carrying an object, the reaction force received from the object is also included in the "external force." Further, the term "floor" used in the present description does not only mean a floor in a usual sense, such as an indoor floor but also means a ground or a road surface outdoors.

According to the first aspect of the invention described above, the desired motion determining unit sequentially determines the instantaneous value of the desired motion by carrying out the arithmetic processing by using the arithmetic parameters while additionally applying the additional external force defined by the model external force manipulated variable determined by the feedback manipulated variable determining unit to the robot on the dynamic model.

Further, the motion control unit controls the motion of the robot such that the actual motion of the robot follows the time series of the instantaneous value of a desired motion.

In this case, the arithmetic parameters are determined by using the time series of a future predicted value of the model external force manipulated variable and the target such that a requirement is satisfied. The requirement is that the time series of an instantaneous value of the desired motion determined in the case where it is assumed that the arithmetic processing is carried out while additionally applying the time series of an additional external three, which is defined by at least the time series of the future predicted value of the determined model external force manipulated variable, to the robot on the dynamic model in a future predetermined period will reach or converge to the determined reaching target in the future.

Accordingly, the desired motion determining unit determines the arithmetic parameters such that the time series of the instantaneous value of a desired motion will reach or converge to the reaching target in the future by taking into account the time series of the additional external force expected to be additionally applied to the robot on the dynamic model in a future predetermined period. This makes it possible to determine more appropriate arithmetic parameters for causing the time series of the instantaneous value of the desired motion to reach or converge to the reaching target in the future, as compared with a case where the arithmetic parameters are determined without considering the future additional external force to be additionally applied to the robot on the dynamic model.

Further, the desired motion determining unit sequentially determines the instantaneous value of the desired motion by carrying out the arithmetic processing by using the arithmetic parameters determined as described above while additionally applying the additional external force, which is defined by an actual model external force manipulated variable determined by the feedback manipulated variable determining unit. This makes it possible to generate the time series of the instantaneous value of the desired motion that will reach or converge to the reaching target.

As a result, the first aspect of the invention allows the motion of the robot to be controlled while reducing the deviation of the actual posture of the robot from a desired posture and also generating a desired motion that allows a continuous motion of the robot to be properly achieved.

Supplementally, in the first aspect of the invention, regarding the processing by the desired motion determining unit, additionally applying the additional external force defined by the model external force manipulated variable to the robot on the dynamic model means that the additional external force is added to the external force to be applied to the robot on the dynamic model (a reference desired external force) in the case where the additional external force is maintained at zero.

As the model external force manipulated variable, for example, a desired value of the additional external force (a translational force of a floor reaction force, a floor reaction force moment or the like, or a force moment) or the correction amount of a desired value of the point of action of an external force may be used.

Further, the posture state amount error may include, for example, the angular difference between a desired posture and an actual posture of the base body or the temporal change rate thereof, or a value obtained by multiplying the angular difference or the temporal change rate thereof by a predetermined value, or a difference in the horizontal direction between the position of the center-of-gravity point of the base body in a desired motion and the position of the center-of-gravity point of an actual base body or the temporal change rate thereof.

The processing for determining the arithmetic parameters by the desired motion determining unit may be carried out at the same cycle as the execution cycle of the processing for determining the instantaneous value of a desired motion, or may be carried out for each predetermined timing at a cycle that has a longer span than that of the execution cycle of the processing for determining the instantaneous value of the desired motion. For example, the arithmetic parameters may be determined each time a free leg of the robot lands.

In the first aspect of the invention described above, the aforesaid reaching target preferably adopts, for example, a cyclic reference motion. More specifically, for example, the future target determining unit is a unit which determines, as the parameter indicative of the reaching target, a reference parameter specifying a reference motion, which is a virtual reference motion serving as the future convergence target of a desired motion of the robot and which cyclically repeats a motion of the same pattern, and the aforesaid requirement preferably adopts a requirement that the time series of the instantaneous value of the desired motion determined in the case where it is assumed that the arithmetic processing is carried out while additionally applying the time series of a future predicted value of the determined model external force manipulated variable to the robot on the dynamic model in a predetermined period in the future will converge to the reference motion defined by the determined reference parameter in the future (a second aspect of the invention).

In this case, the reference motion is a cyclic motion, allowing a continuous motion of the robot to be accomplished. Thus, the time series of the instantaneous value of a desired motion that allows a continuous motion of the robot to be achieved can be properly determined by determining the time series of the instantaneous value of the desired motion such that the requirement in which the time series of the instantaneous value of the desired motion determined under the aforesaid assumption will converge to the aforesaid reference motion in the future is satisfied.

The reference motion is preferably, for example, a cyclic motion having a pattern approximating a motional state of the robot at current time or in the vicinity thereof (a cyclic motion that does not develop a sudden change in the motional state of the robot at current time or in the vicinity thereof).

Further, in the first aspect or the second aspect of the invention, more specifically, the following mode may be adopted. For example, the desired motion determining unit has a unit which carries out the arithmetic processing by using a leg motion parameter specifying the desired motion trajectory of the distal end of each leg of the robot and the ZMP trajectory parameter specifying the trajectory of a desired ZMP of the robot as the arithmetic parameters and which variably determines the leg motion parameter and the ZMP trajectory parameter such that at least the aforesaid requirement is satisfied and that the desired ZMP defined by the ZMP trajectory parameter falls in a predetermined permissible range depending on the desired motion trajectory of the distal end of each leg defined by the leg motion parameter (a third aspect of the invention).

According to the third aspect of the invention, the desired motion determining unit variably determines the leg motion parameter and the ZMP trajectory parameter such that the aforesaid requirement related to the convergence to the aforesaid reference motion is satisfied and the desired ZMP defined by the ZMP trajectory parameter falls in the predetermined permissible range depending on the desired motion trajectory of the distal end of each leg defined by the leg motion parameter.

Further, the desired motion determining unit carries out the arithmetic processing by using the leg motion parameter and the ZMP trajectory parameter determined as described above so as to sequentially determine the instantaneous value of the desired motion.

This arrangement enables the desired motion determining unit to properly determine the time series of the instantaneous value of a desired motion that permits a stable motion of the robot while satisfying dynamic requirements, including one that requires a desired ZMP (a desired actual floor reaction force central point) exist in a so-called supporting polygon.

Further, in the first to the third aspects of the invention described above, the feedback manipulated variable determining unit is a unit which sequentially determines, as the feedback manipulated variables having the function for bringing the posture state amount error close to zero, the model external force manipulated variable and the actual robot external force manipulated variable that defines the additional external force to be additionally applied to the actual robot on the basis of the observed value of the posture state amount error, and the motion control unit may have a compliance control function which controls the motion of the robot to cause the actual motion of the robot to follow the time series of the instantaneous value of the desired motion while additionally applying an additional external force defined by the actual robot external force manipulated variable to the actual robot (a fourth aspect of the invention).

According to the fourth aspect of the invention, the motion of the robot can be controlled such that the posture state amount error is brought close to zero by the combination of the model external force manipulated variable fed back to the dynamic model and the actual robot external force manipulated variable fed back to the actual robot.

In the fourth aspect of the invention, the difference between the additional external three defined by the actual robot external force manipulated variable and the additional external force defined by the model external force manipulated variable preferably functions to bring the posture state amount error close to zero. In this case, for example, the feedback manipulated variable for bringing the posture state amount error close to zero may be calculated according to an appropriate feedback control law (e.g., proportional law or proportional-differential law) from the posture state amount error, and then the actual robot external force manipulated variable and the model external three manipulated variable may be determined such that the aforesaid difference coincides with (or is proportional to) the aforesaid feedback manipulated variable.

In this case, if the actual robot external force manipulated variable is a manipulated variable that causes, for example, the perturbation of the horizontal component of a floor reaction force moment about a desired ZMP of the actual robot (the component about a horizontal axis) and consequently causes the perturbation of the actual floor reaction force central point, then preferably, the actual robot external force manipulated variable or the floor reaction force moment defined thereby (or the position of the actual floor reaction force central point) is restricted to a predetermined permissible range. In this case, the permissible range may be variably set according to a floor geometry or the properties of a floor.

BRIEF DESCRIPTION OF THE DRAWINGS

FIG. 14 is a graph illustrating a desired floor reaction force vertical component trajectory in a normal turning gait of the robot shown in FIG. 1;

FIG. 15 is a graph illustrating a desired ZMP trajectory (a component in the X-axis direction) in the normal turning gait of the robot shown in FIG. 1;

DESCRIPTION OF THE PREFERRED EMBODIMENTS

The following will describe an embodiment of the present invention by taking a bipedal mobile robot as an example of a legged mobile robot.

Figure 1:
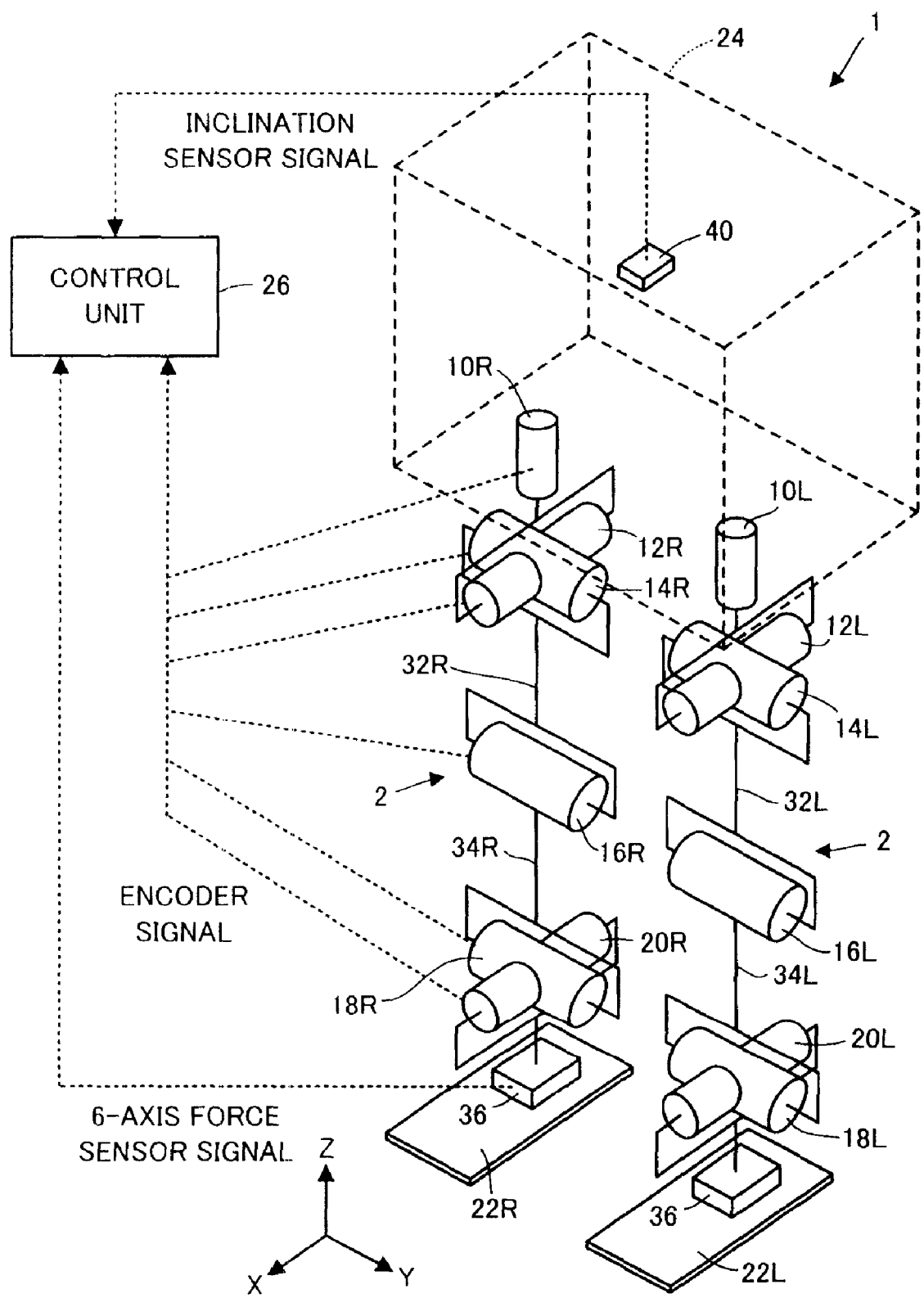
FIG. 1 is a perspective view illustrating the schematic construction of a bipedal mobile robot as a mobile body in an embodiment of the present invention.

As illustrated in FIG. 1, a bipedal mobile robot 1 (hereinafter referred to simply as the robot 1 according to the present embodiment has a body 24 as a base body and a pair of right and left legs (leg links) 2, 2 extended from the body 24 as a moving mechanism for moving the body 24 above a floor surface.

The body 24 is connected to the proximal end portions (upper end portions) of the two legs 2, 2 through the intermediary of a waist joint (hip joint), which will be discussed later, and is supported above the floor surface by one or both of the legs 2, 2 that are in contact with the ground.

The two legs 2, 2 share the same construction and each thereof has six joints. The six joints are a joint 10R or 10L for turning a waist (hip) (for the rotation in the yaw direction relative to the body 24), a joint 12R or 12L for turning the waist (hip) in a roll direction (about an X-axis), a joint 14R or 14L for rotating the waist (hip) in a pitch direction (about a Y-axis), a joint 16R or 16L for rotating a knee in the pitch direction, a joint 18R or 18L for rotating an ankle in the pitch direction, and a joint 20R or 20L for rotating an ankle in the roll direction, which are arranged in this order from the body 24.

In the description of the present embodiment, reference characters R and L mean the correspondence to the right leg and the left leg. Further, the X-axis, a Y-axis, and a Z-axis mean three coordinate axes of a supporting leg coordinate system, which will be discussed later. The X-axis direction and the Y-axis direction of the supporting leg coordinate system are the directions of two axes that are orthogonal to each other on a horizontal plane, the X-axis direction corresponding to the longitudinal direction (the direction of the roll axis) of the robot 1 and the Y-axis direction corresponding to the lateral direction (the direction of the pitch axis) of the robot 1. The Z-axis direction is the vertical direction (the gravitational direction) and corresponds to the up-and-down direction (the direction of a yaw axis) of the robot 1.

The joints 10R(L), 12R(L) and 14R(L) of each leg 2 constitute a waist joint (hip joint) having 3 degrees of freedom, the joint 16R(L) constitutes a knee joint having 1 degree of freedom, and the joints 18R(L) and 20R(L) constitute an ankle joint having 2 degrees of freedom.

Further, the waist joint (hip joint) 10R(L), 12R(L), and 14R(L) and the knee joint 16R(L) are connected by a thigh link 32R(L), while the knee joint 16R(L) and the ankle joint 18R(L) and 20R(L) are connected by a crus link 34R(L). A foot 22R(L) constituting a distal portion (lower end portion) of each leg 2 is attached under the ankle joints 18R(L) and 20R(L) of each leg 2. Further, the upper end portion (the proximal end portion) of each leg 2 is connected to the body 24 through the intermediary of the waist joints (hip joints) 10R(L), 12R(L), and 14R(L).

Each of the aforesaid joints may have a publicly known structure proposed in, for example, Japanese Patent Publication Laid-Open No. 3-184782 by the applicant of the present application. In this case, an actuator rotatively driving each joint is constructed of an electric motor 42 (refer to FIG. 2) provided with a speed reducer.

The construction of each leg 2 described above provides the foot 22R(L) of each leg 2 with 6 degrees of freedom relative to the body 24. When the robot 1 travels, desired motions of the two feet 22R and 22L can be accomplished by driving 6*2=12 joints of the two legs 2, 2 together ("*" in the present description denotes multiplication for scalar calculation, while it denotes an outer product in vector calculation) at appropriate angles. This arrangement enables the robot 1 to implement motions for traveling in a three-dimensional space, such as a walking motion or a running motion.

In this case, both legs 2, 2 function as the moving mechanism for moving the body 24, which serves as the base body, on the floor surface. The body 24 serving as the base body is supported by the legs 2, 2 such that the body 24 is enabled to perform relative motions in relation to the legs 2, 2 through the intermediary of the waist joint (hip joint). Further, the motions of the body 24 relative to the floor surface can be controlled by controlling the drive of each joint of both legs. The motions of the body 24 include motions in an up-and-down direction (the vertical direction, a direction perpendicular to the floor surface, and the like) and motions for changing the posture of the body 24 in addition to motions in the horizontal direction (or a direction parallel to the floor surface) of the body 24.

In the present embodiment, a pair of right and left arms is attached to both sides of an upper portion of the body 24 and a head is mounted on the upper end of the body 24, although not shown. Further, each arm is capable of performing motions, such as swinging the arm to the front and the rear relative to the body 24, by a plurality of joints (a shoulder joint, an elbow joint, a wrist joint, and the like) provided therein. However, these arms and the head may be omitted.

The body 24 includes therein a control unit 26 which controls the operation of the robot 1. In FIG. 1, however, the control unit 26 is shown outside the body 24 for the convenience of illustration.

A six-axis force sensor 36 is interposed between the ankle joints 18R(L), 20R(L) and the foot 22R(L) of each leg 2. The six-axis force sensor 36 detects the translational force components in the directions of three axes of a floor reaction force and the moment components about the three axes, which are transmitted to each of the legs 2 from a floor through the intermediary of the foot 22R(L), then outputs the detection signals to the control unit 26.

The body 24 has an inclination sensor 40 for measuring the inclination angles (the inclination angles in the roll direction and the pitch direction) of the body 24 relative to the vertical direction (the gravitational direction) and the changing velocities (angular velocities) thereof. More specifically, the inclination sensor 40 is constructed of an acceleration sensor and a rate sensor (angular velocity sensor), such as a gyro sensor, and outputs the detection signals of these sensors to the control unit 26. Then, the control unit 26 measures the inclination angle and the angular velocity of the body 24 relative to the vertical direction by a publicly known technique on the basis of the outputs of the inclination sensor 40.

Further, the electric motor 42 (refer to FIG. 2), which rotatively drives each joint is provided with an encoder (rotary encoder) 44 (refer to FIG. 2) for detecting the rotational angle of each joint, and a detection signal of the encoder 44 is output to the control unit 26.

Figure 2:
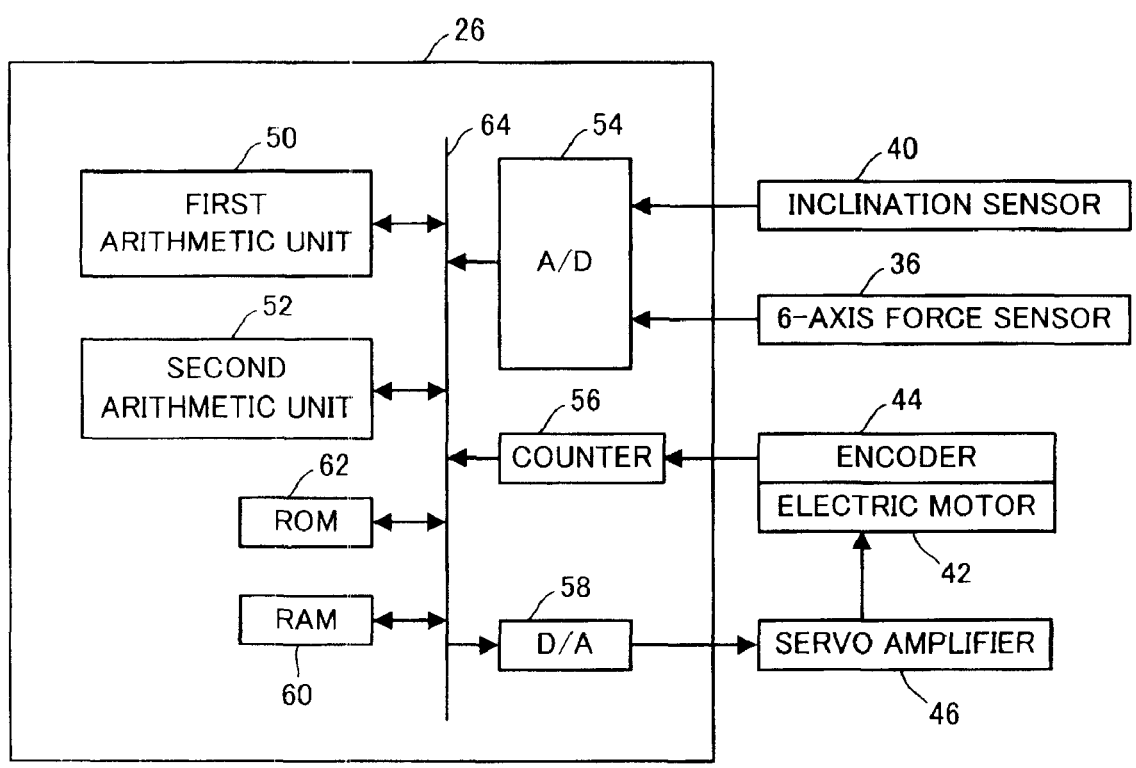
FIG. 2 is a block diagram illustrating the hardware configuration of a control unit provided in the robot of FIG. 1.

Referring to FIG. 2, the control unit 26 is constructed of an electronic circuit unit having a microcomputer including a first arithmetic unit 50 and a second arithmetic unit 52 composed of CPUs, an A/D converter 54, a counter 56, a D/A converter 58, a RAM 60, a ROM 62, and a bus line 64 which transfers data among these constituent elements.

In the control unit 26, the outputs of the six-axis force sensor 36 and the inclination sensor 40 are converted into digital values by the A/D converter 54, and then input to the RAM 60 through the bus line 64. An output of the encoder (rotary encoder) 44 of each joint of the robot 1 is input to the RAM 60 through the counter 56.

The first arithmetic unit 50 generates a desired gait, which will be discussed later, calculates a joint displacement command (the desired value of the rotational angle of each joint), and sends out the calculated joint displacement command to the RAM 60. The second arithmetic unit 52 reads out a joint displacement command from the RAM 60 and an actual joint displacement (the actually measured value of the rotational angle of each joint) measured through the counter 56 from an output of the encoder 44, and calculates a drive command of the electric motor 42 of each joint necessary to cause the actual joint displacement to follow the joint displacement command (a command value that specifies the output torque of the electric motor 42).

Further, the second arithmetic unit 52 outputs the calculated drive command to a servo amplifier 46 for driving the electric motor 42 through the intermediary of the D/A converter 58. At this time, the servo amplifier 46 drives the electric motor 42 (energizes the electric motor 42) on the basis of the input drive command. Thus, the actual joint displacement of each joint is controlled to follow a joint displacement command.

Figure 3:
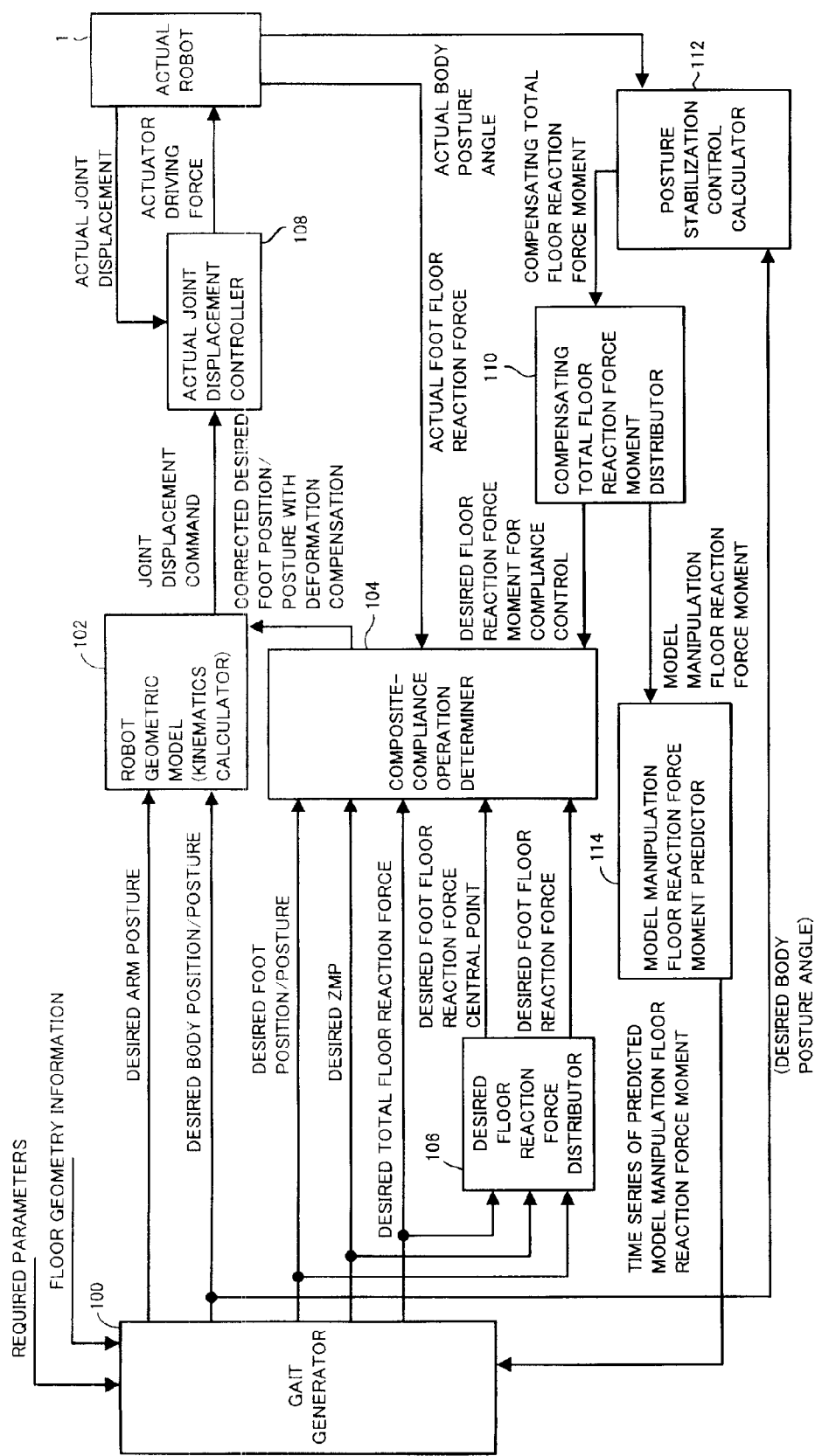
FIG. 3 is a block diagram illustrating the functional construction of the control unit.

Referring now to FIG. 3, the operation of the control device of the robot 1 in the present embodiment will be outlined. The sections except for the actual robot in FIG. 3 indicate the functions implemented by the processing carried out by the control unit 26 (the processing carried out primarily by the first arithmetic unit 60 and the second arithmetic unit 62).

In FIG. 3, for the sake of convenience, it is assumed that the actually measured values (actual joint displacements and the like) recognized by the control unit 26 from the outputs of the aforesaid sensors mounted on the robot 1 are output from the actual robot 1. In the following description, the aforesaid reference characters R and L will be omitted unless it is necessary to particularly distinguish the right leg 2 and the left leg 2.

The control unit 26 has a gait generator 100 that generates a desired gait, which is a target of the motion (gait) of the robot 1, by using a dynamic model expressing the dynamics of the robot 1 (the relationship between a motion of the robot 1 and an external force acting on the robot 1) and outputs the generated desired gait. The desired gait generated and output by the gait generator 100 is composed of a target related to the motion of the robot 1 and a target related to the external force acting on the robot 1.

In the present embodiment, a desired gait is composed of a desired body position/posture trajectory, which is the trajectory of a desired position and a desired posture of the body 24, a desired foot position/posture trajectory, which is the trajectory of a desired position and a desired posture of each foot 22, a desired arm posture trajectory, which is the trajectory of a desired posture of each arm, a desired ZMP trajectory, which is the trajectory of a desired position of the ZMP (Zero Moment Point) of the robot, and a desired total floor reaction force trajectory, which is a desired trajectory of the total floor reaction force as an external force acting on the robot 1. Of these constituent elements, the desired body position/posture trajectory, the desired foot position/posture trajectory, and the desired arm posture trajectory correspond to the targets related to the motion of the robot 1, while the desired ZMP trajectory and the desired total floor reaction force trajectory correspond to the targets of the external force. If any other part that can be moved in relation to the body 24 in addition to the legs 2 and the arms are provided, then a desired position/posture trajectory of the movable part will be added to the desired gait as a part of the targets related to the motion of the robot 1.

Here, the term "trajectory" in the aforesaid desired gait means a temporal change pattern (time series patter) and is formed of the time series of instantaneous values calculated for each control cycle (arithmetic processing cycle) of the gait generator 100. In the following description, the term "trajectory" may be replaced by the term "pattern." In the following description, the term "desired" will be frequently omitted unless there is a possibility of misunderstanding.

The position and the velocity of the body 24 will mean the position and its moving speed of a predetermined representative point of the body 24 (e.g., the central point between the right and left hip joints). Similarly, the position and the speed of each foot 22 will mean the position and its moving velocity of a predetermined representative point of each foot 22. In the present embodiment, the representative point of each foot 22 is set at a point on the bottom surface of each foot 22, such as a point at which a perpendicular line from the center of the ankle joint of each of the legs 2 to the bottom surface of each foot 22 intersects with the bottom surface.

The term "posture" means a spatial orientation. For example, the posture of the body is expressed by the inclination angle (posture angle) of the body 24 in the roll direction relative to the vertical direction (about the X-axis) and the inclination angle (posture angle) of the body 24 in the pitch direction (about the Y-axis). The posture of a foot is expressed by the spatial azimuths of two axes fixedly set on each foot 22. In the present description, a body posture may be referred to as a body posture angle. The body posture may include the rotational angle of the body 24 in the yaw direction (about the Z-axis).

Further, constituent elements in a gait other than the elements related to an external force acting on the robot 1 (a desired ZMP and a desired total floor reaction force), namely, foot position/posture, body position/posture and the like, which relate to the motion of each portion of the robot 1 are generically referred to as "motions."

The floor reaction force acting on each foot 22 (a floor reaction force composed of a translational force and a moment) is referred to as "each foot floor reaction force" and the resultant force of "each foot floor reaction force" of all (two) feet 22R and 22L of the robot 1 is referred to as "total floor reaction force." The following description, however, will hardly refer to each foot floor reaction force. Hence, the term "floor reaction force" will be regarded to have the same meaning as the term "total floor reaction force."

The ZMP means a point on a floor surface at which the horizontal component of a moment (a moment component about the horizontal axis) acting about the point due to the resultant force of an inertial force generated by a motion of the robot 1 and the gravitational force acting on the robot 1 becomes zero. In a gait that satisfies a dynamic balance condition, the ZMP and the central point of a floor reaction force agree with each other. In this case, imparting a desired ZMP is equal to imparting the central point of a desired floor reaction force.

A desired floor reaction force is generally expressed by a point of action and a translational force and moment acting on the point. The point of action may be set anywhere, and in the present embodiment, a desired ZMP is used as the point of action of a desired floor reaction force. In a gait that satisfies the dynamic balance condition, the ZMP and the central point of a floor reaction force agree with each other, as described above, so that the moment component of the desired floor reaction force having the desired ZMP as the point of action will be zero, excluding a vertical component (a moment component about the Z-axis).

A desired body position/posture trajectory and a desired arm posture trajectory of a desired gait generated by the gait generator 100 are input to a robot geometric model (kinematics calculator) 102.

Further, a desired foot position/posture trajectory, a desired ZMP trajectory (a desired floor reaction force central point trajectory), and a desired total floor reaction force trajectory (more specifically, a desired translational floor reaction force vertical component trajectory, a desired translational floor reaction force horizontal component trajectory, and the trajectory of a desired floor reaction force moment about a desired ZMP) are input to a composite-compliance operation determiner 104 and a desired floor reaction force distributor 106.

Then, the desired floor reaction force distributor 106 distributes the desired floor reaction force to the respective feet 22R and 22L to determine the desired foot floor reaction force central point (the desired position of the floor reaction force central point of each of the feet 22R and 22L) and the desired foot floor reaction force (the desired floor reaction force to be applied to the floor reaction force central point of each of the feet 22R and 22L). The trajectories of desired foot floor reaction force central points and the desired foot floor reaction forces, which have been determined, are input to the composite-compliance operation determiner 104. Regarding a desired floor reaction force output from the gait generator 100, only a component necessary for the compliance control by the composite-compliance operation determiner 104 may be output. For example, the output of a desired translational floor reaction force horizontal component from the gait generator 100 may be omitted.

The composite-compliance operation determiner 104 determines a corrected desired foot position/posture with mechanism deformation compensation obtained by correcting a desired foot position/posture. The trajectory of the corrected desired foot position/posture is input to the robot geometric model 102.

The robot geometric model 102 calculates the joint displacement commands of the joints of the two legs 2, 2 that satisfy the desired body position/posture and the corrected desired foot position/posture with mechanism deformation compensation, which have been received, by inverse-kinematics calculation on the basis of a kinematics model (rigid link model) of the robot 1, and then outputs the calculated joint displacement commands to a joint displacement controller 108. Further, the robot geometric model 102 calculates the joint displacement commands of the joints of the arms that satisfy a desired arm posture, and outputs the calculated joint displacement commands to the joint displacement controller 108.

Then, the joint displacement controller 108 uses the joint displacement commands calculated by the robot geometric model 102 as the desired values to carry out follow-up control of the rotational angles of the joints (actual joint displacements) of both legs 2, 2 and both arms of the robot 1 through the intermediary of the servo amplifier 46. More specifically, the joint displacement controller 108 adjusts the output torque of the electric motor 42 as an actuator driving force such that the actual joint displacements (actually measured values) measured on the basis of the outputs of the encoder 44 agree with the joint displacement commands.

An actual foot floor reaction force, which is the floor reaction force actually acting on each foot 22 of the robot 1 by an actual motion of the robot 1 subjected to the follow-up control described above is measured from an output of the six-axis force sensor 36, and the actually measured value of the actual foot floor reaction force is input to the composite-compliance operation determiner 104.

Further, the actual body posture angle, which is the real posture angle (an inclination angle relative to the vertical direction) of the body 24 of the robot 1, is measured on the basis of an output of the inclination sensor 40, and the actually measured value of the actual body posture angle is input to a posture stabilization control calculator 112. The posture stabilization control calculator 112 also receives, for example, a desired body posture angle (the desired value of the posture angle of the body 24 relative to the vertical direction) of a desired body position/posture generated by the gait generator 100. The desired body posture angle takes a constant value (fixed value) in the present embodiment, and it is, for example, the posture angle of the body 24 when the body trunk axis of the body 24 of the robot 1 is set in the vertical direction (the posture angle=0). If the desired body posture angle takes a constant value (fixed value) as described above, then the step for supplying the desired body posture angle to the posture stabilization control calculator 112 may be omitted.

Then, the posture stabilization control calculator 112 calculates a body posture angle deviation $\Delta\theta$, which is a difference between an input actual body posture angle (actually measured value) and a desired body posture angle. Further, the posture stabilization control calculator 112 calculates a compensating total floor reaction force moment Mdmd, which is the required value or a floor reaction force moment to be additionally applied to the robot 1 about a desired ZMP, on the basis of the calculated body posture angle error $\Delta\theta$ by the feedback control law as a required manipulated variable (required feedback manipulated variable) for converging the body posture angle error $\Delta\theta$ to zero.

In this case, a PD law, for example, is used as the feedback control law. Based on the body posture angle error $\Delta\theta$ and the temporal change rate thereof (differential value) Δω, the compensating total floor reaction force moment Mdmd is calculated according to the following expression 50.

$$Mdmd = K1 * \Delta\theta + K2 * \Delta\omega \quad \text{Expression 50}$$

K1 and K2 in this expression 50 denote a proportional gain and a differential gain, respectively. The values of these K1 and K2 are predetermined values set beforehand in the present embodiment.

In this case, more specifically, the compensating total floor reaction force moment Mdmd is composed of a component in the roll direction (about the X-axis) Mdmdx and a component in the pitch direction (about the Y-axis) Mdmdy. The reference characters Mdmdx and Mdmdy mean required moments about a desired ZMP (more specifically, the required value of a perturbation of a floor reaction force moment about a desired ZMP) necessary for converging the component in the roll direction (about the X-axis) and the component in the pitch direction (about the Y-axis), respectively, of the body posture angle error Δθ to zero.

Further, the component about the X-axis Mdmdx is calculated according to expression 50 on the basis of the components of the X-axis of Δθ and Δω. Similarly, the component about the Y-axis Mdmdy is calculated according to expression 50 on the basis of the components of the Y-axis of Δθ and Δω.

The values of the gains K1 and K2 in expression 50 may be variably set as necessary according to the motional state of the robot 1. For example, the value or values of one or both of K1 and K2 may be variably determined according to the entire center of gravity of the robot 1 or the vertical inertial force of the body 24. This makes it possible to compensate for the influence of the vertical inertial force attributable to a motion of the robot 1 and calculate the value of Mdmd that allows the body posture angle error Δθ to smoothly converge to zero.

Further, the Δθ may be converted to the positional error of the mass point of an inverted pendulum model, which will be discussed later, (specifically, the Δθ is multiplied by a height h of a body mass point 24b, which will be discussed later), and the Mdmd may be calculated according to the PD law on the basis of the positional error and the temporal change rate thereof.

The compensating total floor reaction force moment Mdmd determined by the posture stabilization control calculator 112 is divided into a desired floor reaction force moment for compliance control and a model manipulation floor reaction force moment through the intermediary of a compensating total floor reaction force moment distributor 110.

The desired floor reaction force moment for compliance control is a perturbation floor reaction force moment about a desired ZMP to be additionally applied to the actual robot 1 in order to bring the aforesaid body posture angle error Δθ close to zero. The model manipulation floor reaction force moment is a perturbation floor reaction force moment about a desired ZMP additionally generated in a dynamic model for generating a gait, which will be discussed later, for the same purpose as that of the desired floor reaction force moment for compliance control. The model manipulation floor reaction force moment is, in other words, a perturbation floor reaction force moment generated about a desired ZMP by a motion of a finally determined desired gait by the gait generator 100 (a desired gait output by the gait generator 100).

These floor reaction force moments are determined as described below for each component in the roll direction (about the X-axis) and the pitch direction (about the Y-axis). First, the model manipulation floor reaction force moment is determined according to expression 52 given below. Incidentally, Mdmd in expression 52 means each component (Mdmdx or Mdmdy) in the roll direction (about the X-axis) and the pitch direction (about the Y-axis). Similarly, a floor reaction force moment permissible range means the permissible range of the floor reaction force moment of each component in the roll direction (about the X-axis) and the pitch direction (about the Y-axis). The floor reaction force moment permissible range is determined in the gait generator 100 (in S1008 of FIG. 24), as will be described later.

In the case where Mdmd>Upper limit value of the floor reaction force moment permissible range:

Model manipulation floor reaction force moment=−
(Mdmd−Upper limit value of floor reaction force moment permissible range)

In the case where Mdmd<Lower limit value of the floor reaction force moment permissible range:

Model manipulation floor reaction force moment=−
(Mdmd−Lower limit value of floor reaction force moment permissible range)

In the case where Lower limit value of the floor reaction force moment permissible range ≦Mdmd≦Upper limit value of the floor reaction force moment permissible range;

$$\text{Model manipulation floor reaction force moment} = 0 \quad \text{Expression 52}$$

In expression 52 given above, the compensating total floor reaction force moment. Mdmd (more specifically. Mdmdx or Mdmdy) itself is compared with the floor reaction force moment permissible range. Basically, however, the object to be compared with the floor reaction force moment permissible range in the above expression 52 is the moment obtained by adding Mdmd to a reference instantaneous value of a floor reaction force moment about a desired ZMP. The reference instantaneous value indicates the moment about the desired ZMP in a desired total floor reaction force generated by the gait generator 100 when it is assumed that the aforesaid body posture angle error Δθ is steadily maintained at zero.

In this case, according to the present embodiment, the reference instantaneous value of the moment about a desired ZMP is steadily zero for the components in both roll direction (about the X-axis) and pitch direction (about Y-axis). Hence, the result obtained by adding Mdmd to the reference instantaneous value is equal to Mdmd. For this reason, in the above expression 52. Mdmd (more specifically, Mdmdx or Mdmdy) is directly compared with the floor reaction force moment permissible range.

Subsequently, the desired floor reaction force moment for compliance control is determined according to expression 54 given below for each component in the roll direction (about the X-axis) and the pitch direction (about the Y-axis). As with the case of expression 52, Mdmd in expression 54 means each component (Mdmdx or Mdmdy) in the roll direction (about the X-axis) and the pitch direction (about the Y-axis).

Desired floor reaction force moment for compliance
control=Mdmd+Model manipulation floor reaction force moment     Expression 54

Hence, the floor reaction force moments are determined such that the difference between the desired floor reaction force moment for compliance control and the model manipulation floor reaction force moment is equal to Mdmd.

Figure 4:
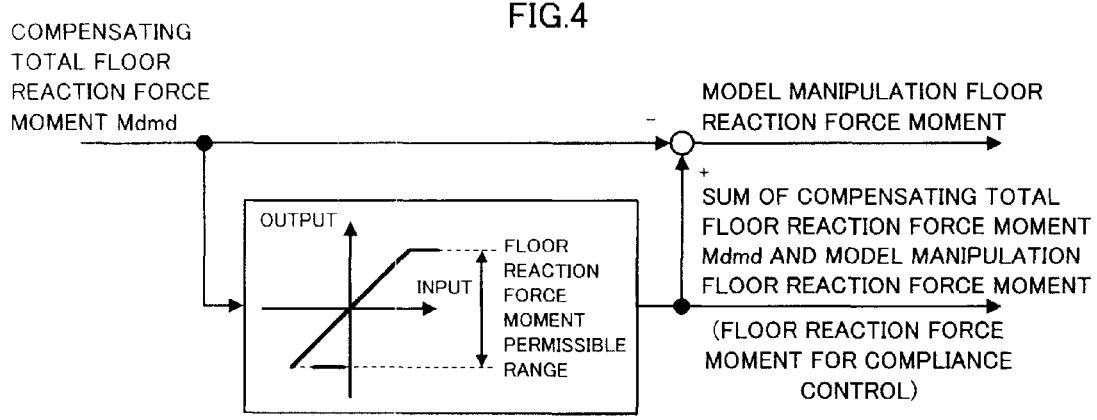
FIG. 4 is a block diagram illustrating the processing by a compensating total floor reaction force moment distributor shown in FIG. 3.
Figure 5:
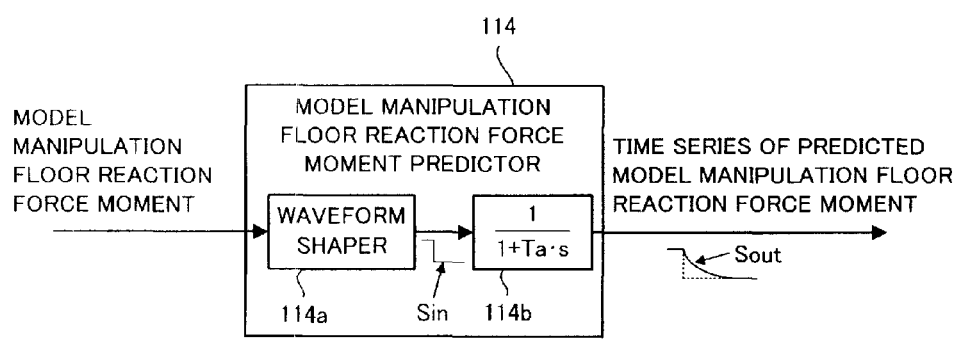
FIG. 5 is a block diagram illustrating the processing by a model manipulation floor reaction force moment estimator shown in FIG. 3.

The block diagram of the compensating total floor reaction force moment distributor 110 performing the computation described above is shown in FIG. 4. The arithmetic processing is carried out on each component in the roll direction (about the X-axis) and the pitch direction (about the Y-axis). If the compensating total floor reaction force moment Mdmd (Mdmdx or Mdmdy) stays within a floor reaction force moment permissible range, then Mdmd is immediately determined as the desired floor reaction force moment for compliance control and the model manipulation floor reaction force moment is determined to be zero.

For each component in the roll direction (about the X-axis) and the pitch direction (about the Y-axis), if the compensating total floor reaction force moment Mdmd (Mdmdx or Mdmdy) deviates from a floor reaction force moment permissible range, then the boundary value of either the upper limit value or the lower limit value of the floor reaction force moment permissible range, whichever is closer to Mdmd, is determined as the desired floor reaction force moment for compliance control, and a moment obtained by reversing the sign of a deviation of Mdmd from the floor reaction force moment permissible range (=Mdmd−Boundary value of the floor reaction force moment permissible range) is determined as the model manipulation floor reaction force moment.

Referring back to FIG. 3, the model manipulation floor reaction force moment determined by the compensating total floor reaction force moment distributor 110 is input to a model manipulation floor reaction force moment predictor 114.

The model manipulation floor reaction force moment predictor 114 predicts the time series of the model manipulation floor reaction force moment output by the compensating total floor reaction force moment distributor 110 after the current time, and then generates and outputs the predicted time series (hereinafter referred to as the time series of the predicted model manipulation floor reaction force moment).

In this case, according to the present embodiment, the model manipulation floor reaction force moment predictor 114 generates the time series of the predicted model manipulation floor reaction force moment, assuming that a first model manipulation floor reaction force moment after the current time will attenuate according to a first-order lag characteristic of a predetermined time constant Ta from, for example, the value at the current time.

To be more specific, the model manipulation floor reaction force moment predictor 114 has a waveform shaper 114a and a first-order lag filter 114b (a first-order lag filter of time constant Ta), the transfer function of which is expressed by $1/(1+Ta \cdot s)$, and generates a waveform Sin, which will be supplied to the filter 114b, by the waveform shaper 114a on the basis of the value of the model manipulation floor reaction force moment at the current time. As illustrated in the drawing, the waveform Sin is a step input waveform, in which the value after the current time changes to zero in steps from the value at the current time.

Subsequently, the model manipulation floor reaction force moment predictor 114 supplies the waveform Sin from the waveform shaper 114a to the filter 114b. At this time, an output waveform Sout of the filter 114b will be a waveform which attenuates according to the first-order lag characteristic from the value of the model manipulation floor reaction force moment at the current time, as illustrated in the drawing. The waveform data is generated in the form of the time series of predicted model manipulation floor reaction force moment.

In the present embodiment, as described above, the time series of the model manipulation floor reaction force moment after the current time has been predicted, assuming that the model manipulation floor reaction force moment after the current time will simply attenuate from the value at the current time according to the first-order lag characteristic, as described above. Alternatively, however, the time series of the model manipulation floor reaction force moment after the current time may be predicted on the basis of for example, the history of the time series of the model manipulation floor reaction force moment before the current time.

The time series of the predicted model manipulation floor reaction force moment generated by model manipulation floor reaction force moment predictor 114 as described above is input to the gait generator 100. The time series of the predicted model manipulation floor reaction force moment to be input to the gait generator 100 includes the value of a model manipulation floor reaction force moment supplied to the model manipulation floor reaction force moment predictor 114 from the compensating total floor reaction force moment distributor 110 at the current time.

Although the details will be given later, the gait generator 100 determines a desired ZMP trajectory by reflecting the predicted value of the model manipulation floor reaction three moment in the future indicated by the time series of the predicted model manipulation floor reaction force moment. Then, the gait generator 100 sequentially generates the motion of a desired gait (a desired motion) by using the dynamic model such that the model manipulation floor reaction force moment at the current time is additionally applied around the determined desired ZMP. The desired total floor reaction force output from the gait generator 100 to the composite-compliance operation determiner 104 is output, aiming at setting the horizontal component of the floor reaction force moment about the desired ZMP to zero.

Further, the desired floor reaction force moment for compliance control, which has been determined as described above by the compensating total floor reaction force moment distributor 110, is input to the composite-compliance operation determiner 104. Then, the composite-compliance operation determiner 104 determines the corrected desired foot position/posture with mechanism deformation compensation (trajectory) obtained by correcting a desired foot position/posture such that the actual floor reaction force moment about the desired ZMP approaches the desired floor reaction force moment for compliance control, while causing the motion of the robot 1 to follow the motion of the desired gait generated by the gait generator 100.

In this case, it is virtually impossible to make the foot position/posture of the robot 1 and all floor reaction three states agree with desired states, so that tradeoff is adopted to achieve maximum possible agreement in a compromising manner. More specifically, the composite-compliance operation determiner 104 imparts a weight to the control error relative to each desired value when determining the corrected desired foot position/posture with mechanism deformation compensation (trajectory) thereby to minimize the weighted average of the control error (or the squared control error).

In other words, the corrected desired foot position/posture with mechanism deformation compensation (trajectory) is determined such that the actual floor reaction force moment about the desired ZMP and the actual foot position/posture of the robot 1 approach the desired floor reaction force moment for compliance control and the desired foot position/posture, respectively, as much as possible. Then, the composite-compliance operation determiner 104 outputs the corrected desired foot position/posture as the final desired values of the foot position/posture to the robot geometric model 102, thereby controlling the operation of the robot 1.

In the present embodiment, the operation control means in the present invention is implemented by the processing carried out by the composite-compliance operation determiner 104 described above. More specifically, the composite-compliance operation determiner 104 controls the operation of the actual robot 1 to additionally apply the desired floor reaction force moment for compliance control as an additional external force to the robot 1 while causing the actual motion of the robot 1 to follow the motion of the desired gait.

The construction and the operation of the composite-compliance operation determiner 104 or the like described above are described in detail in, for example, Japanese Patent Application Laid-Open No. 10-277969 filed by the present applicant. Therefore, no further detail of the composite-compliance operation determiner 104 will be given in the present description.

Thus, the operation of the robot 1 is controlled such that no model manipulation floor reaction force moment will be added to the floor reaction force of the actual robot 1 while generating the motion of the desired gait such that a model manipulation floor reaction force moment as the model manipulation external force on the dynamic model of the robot 1 is additionally generated about the desired ZMP. Hence, there will be an imbalance (unbalance) between the motion of the desired gait and the floor reaction force by the model manipulation floor reaction force moment, which is the difference. This is equivalent to applying a floor reaction force moment, which has a sign reversed from the sign of the model manipulation floor reaction force moment, to the actual robot 1 from the viewpoint of the effect for converging the body posture angle error $\Delta\theta$ to zero.

In other words, determining an appropriate model manipulation floor reaction force moment makes it possible to converge the actual posture of the body 24 of the actual robot 1 to a desired posture and consequently stabilize the entire posture of the actual robot 1.

In this case, the sum of the model manipulation floor reaction force moment with a reversed sign and the desired floor reaction force moment for compliance control will be a total restoring force (floor reaction force moment) for converging the body posture angle error $\Delta\theta$ to zero. In other words, the difference between the desired floor reaction force moment for compliance control and the model manipulation floor reaction force moment will be the total restoring force.

The model manipulation floor reaction force moment can take any value independently of a range in which ZMP can exist, thus enabling an extremely high posture restoring force to be generated.

Figure 6:
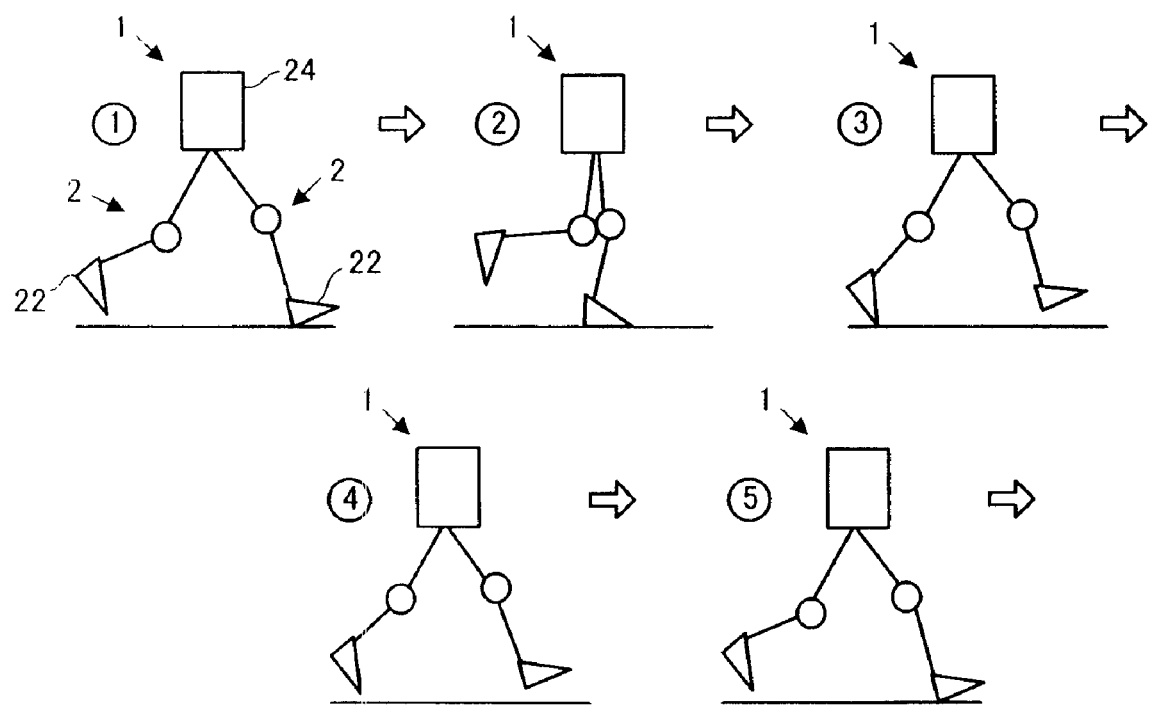
FIG. 6 is a diagram illustrating a running gait of the robot of FIG. 1.

Taking the running gait illustrated in FIG. 6 as an example, a desired gait generated by the gait generator 100 will now be outlined.

In the following description, the terms "floor reaction force vertical component" and "floor reaction force horizontal component" will mean "translational floor reaction force vertical component" and "translational floor reaction force horizontal component." respectively, unless otherwise particularly specified.

Further, the term "two-leg supporting period" in a gait will refer to a period during which the robot 1 supports its own weight by its both legs 2, 2, the term "one-leg supporting period" will refer to a period during which the robot 1 supports its own weight by either one of the legs 2, 2, and the term "floating period" will refer to a period during which both legs 2, 2 are off a floor (floating in the air). Further, the leg 2 supporting the self weight of the robot 1 during the one-leg supporting period will be referred to as "the supporting leg," while the leg 2 not supporting the self eight will be referred to as "the free leg." The running gait, which will be mainly described in the present embodiment, does not include the two-leg supporting period. Instead, the running gait repeats the one-leg supporting period (landing phase) and the floating period alternately. In this case, neither of the legs 2, 2 supports the self weight of the robot 1; however, the leg 2 which was a free leg and the leg 2 which was a supporting leg in the one-leg supporting period immediately preceding the floating period will be still called the free leg and the supporting leg, respectively, in the floating period.

First, referring to FIG. 6, which illustrates the running gait, this running gait is the same gait as that of a normal running gait of a human. This running gait alternately repeats the one-leg supporting period during which the foot 22 of only one of the right and left legs 2 (supporting leg) of the robot 1 lands (comes in contact with the ground) and the floating period during which both legs 2, 2 float in the air.

The circled numerals in FIG. 6 indicate the time-series sequence in the running gait. In this case, the first state in FIG. 6 indicates the state at the beginning (initial state) of the one-leg supporting period, the second state indicates the state at a midpoint of the one-leg supporting period, the third state indicates the state at the beginning of the floating period (the end of the one-leg supporting period) following the one-leg supporting period, the fourth state indicates the state at a midpoint in the floating period, and the fifth state indicates the state at the end of the floating period (the beginning of the next one-leg supporting period). The blank arrows in FIG. 6 indicate the direction in which the robot 1 advances.

In this running gait, the robot 1 lands at the heel of the foot 22 of the supporting leg (the leg 2 on the front side in the running direction of the robot 1) at the beginning of the one-leg supporting period, as illustrated in the first state of FIG. 6.

Subsequently, after landing with substantially the entire bottom surface of the landed foot 22 (the foot 22 of the supporting leg) in contact with the floor, as illustrated by the second state in FIG. 6, the robot 1 jumps into the air by kicking the floor with the tiptoe of the foot 22 of the supporting leg (the foot 22 of the leg 2 on the rear side relative to the advancing direction of the robot 1 in the third state of FIG. 6), as illustrated by the third state in FIG. 6. This ends the one-leg supporting period and starts the floating period at the same time. The free leg in the one-leg supporting period exists at the rear of the supporting leg at the beginning of the one-leg supporting period, as illustrated by the first state in FIG. 6. Thereafter, the free leg is swung to the front of the supporting leg toward the next intended landing position, as illustrated by the second and the third states in FIG. 6.

Subsequently, after the floating period illustrated by the fourth state in FIG. 6, the robot 1 lands at the heel of the foot 22 of the free leg (the leg 2 that was the free leg in the one-leg supporting period immediately before the start of the floating period), starting the next one-leg supporting period.

Assuming the running gait illustrated in FIG. 6, the basic general outline of a desired gait generated by the gait generator 100 will be given.

When the gait generator 100 generates a desired gait, a required parameter representing basic requirements related to a motion mode of the robot 1 is input to the gait generator 100 through radio communication or the like from a control device, a server or the like which are outside the robot 1 and which are not shown. The required parameter is composed of, for example, the type of motion (walking, running, or the like) of the robot 1, desired landing position/posture (expected landing position/posture) of the foot 22 of the free leg, targeted landing time (expected landing time) or a parameter necessary to determine the above factors (e.g., the mean traveling speed or traveling direction or the like of the robot 1). The required parameter may be stored and retained beforehand in a memory device, not shown, of the robot 1 and may be read by the gait generator 100 according to a predetermined schedule. The gait generator 100 also receives, as necessary, the information on a floor geometry in an environment in which the robot 1 travels from a memory device, not shown, of the robot 1 or an external server or the like.

Supplementally, the floor geometry information may be acquired as described below. For example, an imaging camera may be mounted on the robot 1 to take an image of an area ahead of the robot 1, thereby acquiring floor geometry information in the control unit 26 on the basis of the captured image. As another example, map information, including the information on a floor geometry in the environment in which the robot 1 travels, may be stored and retained in the control unit 26 of the robot 1 beforehand and a self-position recognizing function may be imparted to the robot 1. The recognized self-position is referred to the map information thereby to acquire the information on a floor geometry around the robot 1 by the control unit 26. The floor geometry information may include the information on properties, such as a hardness or frictional coefficient of a floor.

The gait generator 100 generates a desired gait according to a predetermined algorithm by using the aforesaid required parameter or the floor geometry information. To be more specific, according to the present embodiment, the gait generator 100 determines the gait parameters as the parameters that define some constituent elements of the desired gait, such as the desired foot position/posture trajectory of the desired gait and a desired floor reaction force vertical component trajectory, on the basis of the required parameter and the floor geometry information for generating gaits, and then sequentially determines the instantaneous values of the desired gait by using the aforesaid gait parameters and the dynamic model of the robot 1. Thus, the gait generator 100 generates the time series pattern (trajectory) of the desired gait.

In this case, the desired foot position/posture trajectory is generated for each foot 22 by using a finite-duration setting filter proposed in, for example, Patent No. 3233450 by the applicant of the present application. The finite-duration setting filter is constituted of a plurality of stages (three stages or more in the present embodiment) of variable time constant first-order lag filters, i.e., filters whose transfer functions are expressed in the form of $1/(1+\tau s)$ ("$\tau$" denotes a variable time constant; the filters will be hereinafter referred to as the unit filters), the stages being connected in series. The finite-duration setting filter is capable of generating and outputting a trajectory in which a specified value is reached at desired specified time. In this case, the time constant $\tau$ of the unit filters in each stage is set in a sequentially variable manner according to the remaining time from a start of the output/generation through the finite-duration setting filter to the aforesaid specified time.

More specifically, the time constant $\tau$ is set such that the value of $\tau$ reduces from a predetermined initial value (>0) as the remaining time becomes shorter until finally the value of $\tau$ reaches zero at the specified time when the remaining time reaches zero. Further, a step input having a height based on the specified value (more specifically, a change amount from the initial value to the specified value of the output of the finite-duration setting filter) is supplied to the finite-duration setting filter.

The finite-duration setting filter is capable of not only generating an output that reaches a specified value at specified time but also setting a changing velocity of an output of the finite-duration setting filter at specified time to zero or approximately zero. Especially when three or more stages (three stages are fine) of the unit filters are connected, even the changing acceleration (the differential value of the changing speed) of an output of the finite-duration setting filter can be set to zero or approximately zero.

The foot position/posture trajectory (the position/posture trajectory from the instant she root 22 lands to the instant the foot 22 lands next) is generated, for example, as described below by using the aforesaid finite-duration setting filter. The desired foot position trajectory in, for example, the X-axis direction (longitudinal direction) is generated as follows.

The height of the step input to the finite-duration setting filter is determined on the basis of the position in the X-axis direction of the next expected landing position of each foot 22 defined by the aforesaid required parameter (more specifically, a change amount (movement amount) in the X-axis direction relative to the landing position preceding the next expected landing position, which corresponds to the aforesaid specified value). Further, the time constant $\tau$ is initialized to a predetermined initial value and then the determined step input is supplied to the finite-duration setting filter, starting the generation of the trajectory of the position of the foot 22 in the X-axis direction. At the time of generating the trajectory, the time constant $\tau$ is sequentially and variably set such that the time constant $\tau$ reduces from the initial value to zero by the expected landing time (corresponding to the aforesaid specified time) of the foot 22. Thus, the trajectory of the position of the foot 22 in the X-axis direction, by which the expected landing position is reached at the expected landing time, is generated.

Further, the desired foot position trajectory in the Z-axis direction (the vertical direction) is generated, for example, as described below. First, the position of the foot 22 in the Z-axis direction at which the height (the vertical position) of the foot 22 becomes maximum (hereinafter referred to as the highest-point position) and the time at which the highest-point position is reached are determined on the basis of the next expected landing position and expected landing time of the foot 22. Then, the height of the step input to the finite-duration setting filter is determined on the basis of the highest-point position (corresponding to the aforesaid specified value). Further, the time constant $\tau$ is initialized, and thereafter, the determined step input is supplied to the finite-duration setting filter and the foot position trajectory in the Z-axis direction to the highest-point position is sequentially generated. At this time, the time constant $\tau$ is sequentially and variably set such that the time constant $\tau$ reduces from the initial value to zero until the time at which the highest-point position is reached (corresponding to the aforesaid specified time).

Further, when the generation of the trajectory of the position in the Z-axis direction up to the highest-point position is completed, the time constant $\tau$ is initialized, and a step input having a polarity opposite from that of the previous step input (more specifically, a step input with an opposite polarity that has a height based on the change amount in the Z-axis direction from the highest-point position to the next expected landing position (corresponding to the aforesaid specified value)) is input to the finite-duration setting filter, and the trajectory of the foot position in the Z-axis direction from the highest-point position to the expected landing position is sequentially generated. At this time, the time constant $\tau$ is sequentially and variably set such that the time constant $\tau$ reduces from the initial value to zero by the expected landing time of the foot 22.

In the generation of the foot position trajectory in the Z-axis direction, the time constant $\tau$ may alternatively be variably set such that it continuously reduces from its initial value to zero from the time at which the trajectory generation is started to the time at which the foot 22 is expected to land. At the same time, the polarity of a step input may be switched to an opposite polarity at or in the vicinity of the time when the highest-point position is reached, thereby generating the foot position trajectory in the Z-axis direction. This arrangement enables the foot 22 to reach an expected landing position at expected landing time with no problem although it does not enable the foot 22 to accurately reach a desired highest-point position.

A foot posture trajectory can be also generated by using the finite-duration setting filter in the same manner as with the foot position trajectory described above. In this case, among spatial components of a foot posture, for a component involved in a posture angle that monotonously changes (monotonously increases or monotonously decreases), the foot posture trajectory may be generated in the same manner as the generation of the foot position trajectory in the X-axis direction described above. Further, for a component involved in a posture angle change of an extremely large value or an extremely small value, the foot posture trajectory may be generated in the same manner as the generation of the foot position trajectory in the Z-axis direction described above.

The desired foot position/posture trajectory generated by the finite-duration setting filter as described above is the desired position/posture trajectory of each foot 22 in a supporting leg coordinate system, which will be discussed later.

The desired foot position/posture trajectory to be generated as described above is generated such that the position of each foot 22 starts moving while gradually accelerating from an initial ground contacting state (the state at the starting time of a desired gait) to an expected landing position. Then, the desired foot position/posture trajectory gradually reduces the changing velocity of the position to zero or approximately zero until finally the expected landing time is reached, and the foot stops at the expected landing position at the expected landing time. Accordingly, the ground speed at the instant each foot 22 lands (the changing velocity of the position of each foot 22 in the supporting leg coordinate system fixed to a floor) becomes zero or approximately zero. Therefore, the landing impact will be small even when both legs 2, 2 simultaneously land from the state in which both legs 2, 2 are in the air (the state in the floating period) in the running gait.

In the aforesaid running gait, the vertical velocity of the body 24 is directed downward from the latter part of the floating period due to the gravitational force acting on the robot 1, and remains downward at the time of landing. Hence, the relative velocity of the foot 22 of the free leg in relation to the body 24 is directed upward immediately before landing when the desired foot position/posture trajectory is generated such that the ground speed becomes zero or approximately zero at the instant the foot 22 lands, as described above, and the desired position/posture trajectory of the body 24 is generated such that the dynamic balance condition is satisfied, as will be described later.

This means that, at the landing instant in the running gait, the desired gait of the robot 1 is a gait in which the leg 2 of the free leg side is drawn in toward the body 24 at the time of landing. In other words, according to the desired gait in the present embodiment, the robot 1 lands with the foot 22 of the free leg pulled up, as observed from the body 24, such that the ground speed of the foot 22 becomes zero or approximately zero at the instant of landing. This reduces a landing impact, thus preventing an excessive landing impact.

In the present embodiment, since the finite-duration setting filter is formed of three stages or more (e.g., three stages) of the unit filters connected in series, the velocity of each foot 22 (the changing velocity of the foot position) reaches zero or approximately zero by the expected landing time and also each foot 22 stops with the acceleration thereof reaching zero or approximately zero at the expected landing time. This means that the ground speed at the landing instant also becomes zero or approximately zero. Hence, the landing impact will be further smaller. In particular, even if the landing time of the actual robot 1 deviates from desired landing time, the impact will not increase much. Supplementally, in order to set the ground speed of each foot 22 to zero or approximately zero at expected landing time, the number of stages of the unit filters of the finite-duration setting filter may be two. However, in this case, the acceleration of each foot 22 at the expected landing time will not generally become zero.

Regarding the foot posture, after each foot 22 lands at the heel thereof at the expected landing time, the foot 22 continues to move until substantially the entire bottom surface of the foot 22 comes in contact with the floor. For this reason, the time at which substantially the entire bottom surface of the foot 22 comes in contact with the floor is set to the aforesaid specified time when generating the foot posture trajectory by the finite-duration setting filter.

In the present embodiment, the foot position trajectory has been generated by using the finite-duration setting filter. Alternatively, however, a desired foot position trajectory may be generated by using a function of, for example, a polynomial expression, which is set such that the changing velocity of the foot position at expected landing time becomes zero or approximately zero (the temporal differential value of the foot position becomes zero) and further the changing acceleration (the temporal differential value of the changing velocity) of the foot position at the expected landing time becomes zero or approximately zero. This applies also to the generation of a desired foot posture trajectory. However, regarding the generation of the desired foot posture trajectory, a function of a polynomial expression or the like is set such that the changing velocity of the posture of each foot 22 and further the changing acceleration thereof becomes zero or approximately zero at the time when substantially entire bottom surface of each foot 22 comes in contact with the floor, as described above.

Figure 7:
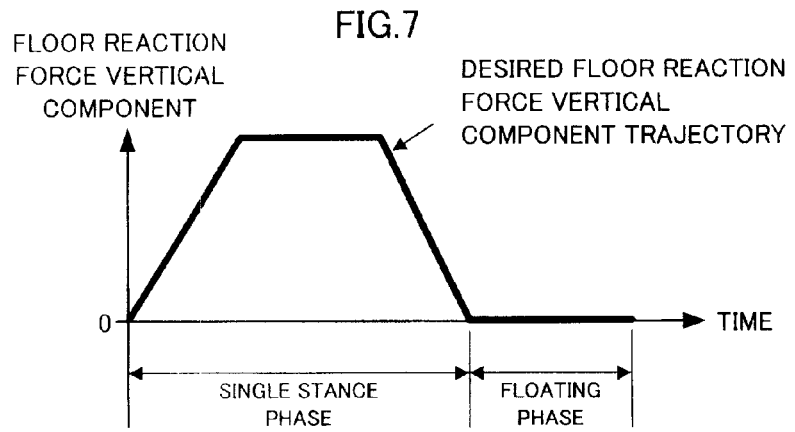
FIG. 7 is a graph illustrating an example of a desired floor reaction force vertical component trajectory generated by a gait generator shown in FIG. 3.

The gait generator 100 explicitly sets a desired floor reaction force vertical component. The desired floor reaction force vertical component trajectory is set, for example, as illustrated in FIG. 7. In the present embodiment, the shape of a desired floor reaction force vertical component trajectory (specifically, the shape in a one-leg supporting period) in a running gait is fixed to a trapezoidal shape (a shape bulging toward an increasing side of the floor reaction force vertical component). Further, the height of the trapezoid and the time of breakpoints are determined as the gait parameters (floor reaction force vertical component trajectory parameters) that define the desired floor reaction force vertical component trajectory.

In the floating period of a running gait, the desired floor reaction force vertical component is constantly set to zero. The desired floor reaction force vertical component trajectory is preferably set to be substantially continuous (such that values are not discontinuous) as with this example. This is for ensuring smooth operations of joints of the robot 1 when controlling a floor reaction force. Here, the phrase "substantially continuous" means that skipped values which inevitably result when a trajectory that is continuous in an analog manner (continuous trajectory in a true sense) is expressed in a digital manner by a discrete-time system do not cause loss of the continuity of the trajectory.

Supplementally, in the present embodiment, a floor reaction force is taken as an overall external force acting on the robot 1, so that a desired floor reaction force vertical component defines the inertial force in the vertical direction of the entire robot 1 (of the overall center of gravity of the robot 1). In other words, the result obtained by subtracting a component balancing the gravitational force acting on the entire robot 1 from the desired floor reaction force vertical component will balance the inertial force in the vertical direction of the entire robot 1. Accordingly, determining the desired floor reaction force vertical component eventually determines the inertial force in the vertical direction of the entire robot 1.

The desired ZMP trajectory is set as illustrated in, for example, FIGS. 8(*a*) and 8(*b*). In the running gait illustrated in FIG. 6, the robot 1 lands at its heel of the foot 22 of the supporting leg, as described above, then jumps into the air by kicking at the tiptoe of the foot 22 of the supporting leg, and lastly lands at the heel of the foot 22 of a free leg.

Hence, the position in the X-axis direction (longitudinal position) of the desired ZMP trajectory in the one-leg supporting period is set such that the position starts from the heel of the foot 22 of the supporting leg as its initial position, moves to the center in the longitudinal direction of the foot 22 in the period during which substantially the entire bottom surface of the foot 22 of the supporting leg comes in contact with the ground, and then moves to the tiptoe of the foot 22 of the supporting leg by the time of leaving the floor, as illustrated in FIG. 8(*a*). The position in the Y-axis direction (lateral position) of the desired ZMP trajectory in the one-leg supporting period is set at the same position as the position in the Y-axis direction of the center of the ankle joint of the leg 2 on the supporting leg side, as illustrated in FIG. 8(*b*).

As illustrated in FIG. 8(*a*), the position of the desired ZMP trajectory in the X-axis direction during the floating period is set to continuously move from the tiptoe of the foot 22 of the supporting leg to the landing position of the heel of the foot 22 of the free leg until the floating period ends (until the leg 2 of the free leg side lands).

Further, as illustrated in FIG. 8(*b*), the position of the desired ZMP trajectory in the Y-axis direction during the floating period is set to continuously move from the position in the Y-axis direction at the center of the ankle joint of the leg 2 on the supporting leg side to the position in the Y-axis direction at the center of the ankle joint of the leg 2 on the free leg side until the floating period ends (until the leg 2 of the free leg side lands). In other words, the desired ZMP trajectory is set to be a trajectory that is continuous (substantially continuous) throughout the entire period of the gait. Here, the meaning of the phrase "substantially continuous" ZMP trajectory mentioned above is the same as that in the case of the aforesaid floor reaction force vertical component trajectory.

In the present embodiment, the positions and time of the breakpoints of the desired ZMP trajectories illustrated in FIGS. 8(*a*) and 8(*b*) are set as the ZMP trajectory parameters (the parameters that define the desired ZMP trajectory).

The ZMP trajectory parameters are determined to have a high stability allowance and not to develop a sudden change. Here, a state in which a desired ZMP exists around the center of a smallest convex polygon (so-called supporting polygon) that includes a ground contact surface of the robot 1 indicates a high stability allowance (for more detail, refer to Japanese Patent Application Laid-Open No. 10-86081). The desired ZMP trajectories illustrated in FIGS. 8(*a*) and 8(*b*) are set such that the aforesaid conditions are satisfied.

Further, a desired arm posture is expressed in terms of a relative posture in relation to the body 24.

Further, desired body position/posture and desired foot position/posture are described using a global coordinate system. The global coordinate system is a coordinate system fixed to a floor. More specifically, the supporting leg coordinate system described below is used. The supporting leg coordinate system is a coordinate system fixed to a floor, in which the origin thereof is a point at which the normal extended from the center of the ankle of the leg 2 on the supporting leg side to a floor surface intersects with the floor surface (this point agrees with the representative point of the foot 22 in a state wherein the substantially entire bottom surface of the foot 22 of the supporting leg is in contact with the floor surface in an example of the present embodiment) in a state wherein the foot 22 of the supporting leg is in a posture parallel to the floor surface and substantially the entire bottom surface of the foot 22 of the supporting leg is in contact (close contact) with the floor surface. The horizontal plane passing the origin is defined as an XY plane. In this case, the X-axis direction and the Y-axis direction are the longitudinal direction and the lateral direction, respectively, of the toot 22 of the supporting leg.

The origin of the supporting leg coordinate system does not necessarily coincide with the representative point of the foot 22 (the point that represents the position of the foot 22) in the state wherein substantially the entire bottom surface of the foot 22 of the supporting leg is in contact with the floor surface. Alternatively, the origin may be set at a point on the floor surface that is different from the aforesaid representative point.

Figure 9:
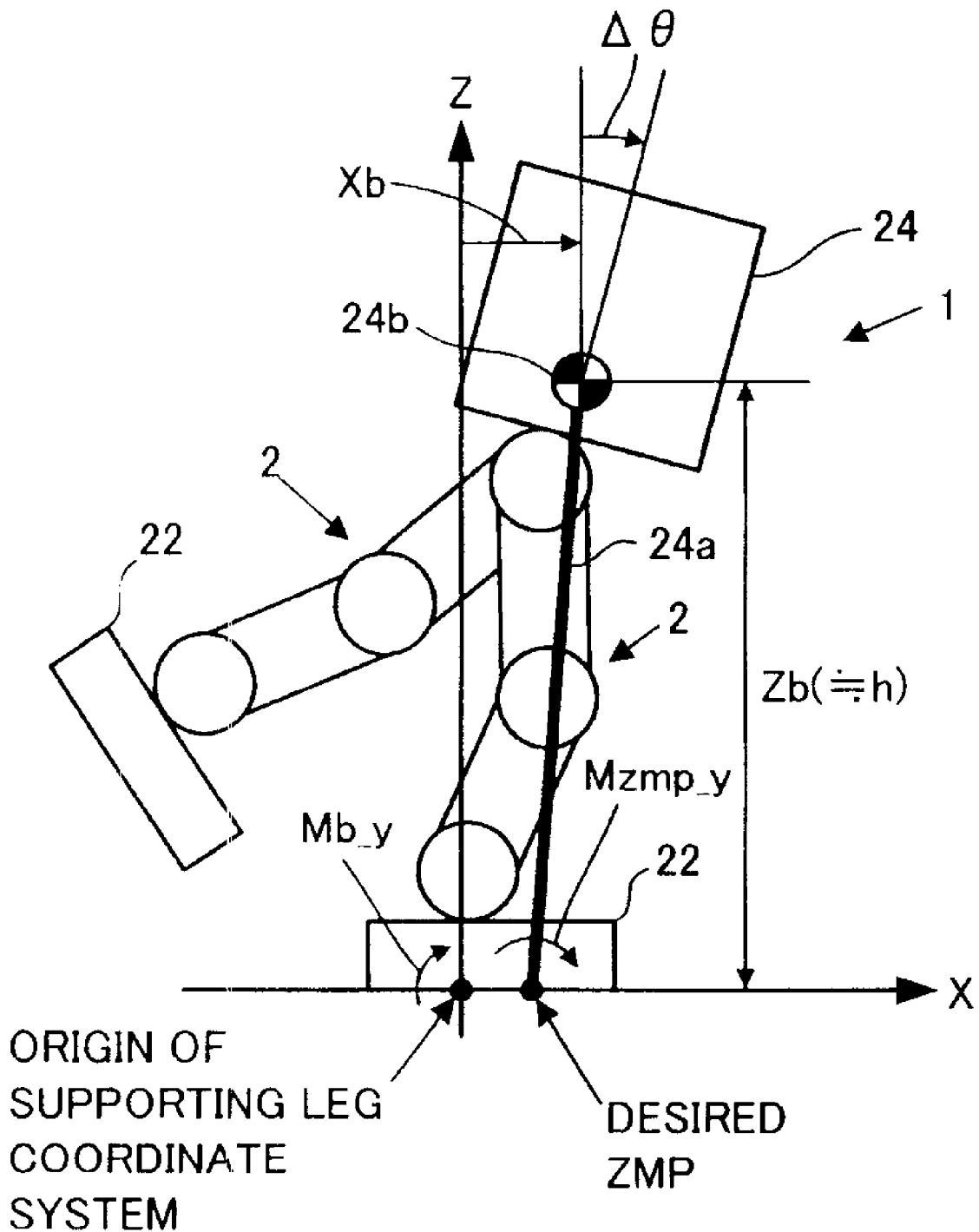
FIG. 9 is a diagram visually illustrating a dynamic model of a robot used in the processing by the gait generator and a posture stabilization control calculator shown in FIG. 3.

Referring now to FIG. 9, the dynamic model of the robot 1 used for generating gaits by the gait generator 100 will be described.

The dynamic model of the robot 1 used in the present embodiment is a model formed of an inverted pendulum provided with a rod 24*a*, which can be swung with a desired ZMP as its supporting point and which has a variable length, and a mass point 24*b* supported by the upper end of the rod 24*a*, as illustrated in FIG. 9 (hereinafter referred to as the inverted pendulum model in some cases). It is assumed that the rod 24*a* does not have a mass.

In this dynamic model, a motion of the mass point 24*b* of the inverted pendulum corresponds to a motion of the body 24 of the robot 1, and the relationship between a motion of the body 24 and a floor reaction force acting on the robot 1 is expressed in terms of the relationship between a motion of the mass point 24*b* (hereinafter referred to as the body mass point 24*b*) and a floor reaction force acting on the inverted pendulum. Further, in the dynamic model, the masses of the legs 2, 2 of the robot 1 are regarded to be sufficiently smaller than that of the body 24 (or the mass of the combination of the body 24, the arms and the head), and the mass of the body mass point 24*b* is to agree with the mass of the entire robot 1. The position of the body mass point 24*b* is set to a position uniquely determined from the body position/posture of the robot 1.

The behavior of the dynamic model (the dynamics of the robot on the dynamic model) is mathematized as shown below. However, for the purpose of simplifying the description, only a dynamic equation on a sagittal plane (a plane that includes the X-axis and the Z-axis of the supporting leg coordinate system) will be described, omitting a dynamic equation on a lateral plane (a plane that includes the Y-axis and the Z-axis of the supporting leg coordinate system).

For the convenience of description, the variables and parameters related to the dynamic model are defined as follows.

ZB: Vertical position of the body mass point (Position in the Z-axis direction)
Xb: Horizontal position of the body mass point (Position in the X-axis direction)
mb: Mass of the body mass point
Xzmp: Horizontal position of a desired ZMP (Position in the X-axis direction)

Zzmp: Vertical position of a desired ZMP (Position in the Z-axis direction)

Fx: Horizontal component of a floor reaction force (more specifically, a component in the X-axis direction of a translational floor reaction force)

Fz: Vertical component of a floor reaction force (more specifically, a component in the Z-axis direction of a translational floor reaction force)

Mzmp_y: Floor reaction force moment about a desired ZMP (more specifically, a component about the Y-axis of the floor reaction force moment)

Mb_y: Floor reaction force moment about the origin of the supporting leg coordinate system (more specifically, a component about the Y-axis of the floor reaction force moment)

On an arbitrary variable A, dA/dt denotes a first-order differential value of A, and d2A/dt2 denotes a second-order differential value of A. Accordingly, if the variable A denotes a displacement (position), then dA/dt denotes a velocity, and d2A/dt2 denotes acceleration. Reference character "g" denotes a gravitational acceleration constant. Here, "g" takes a positive value.

The dynamic equations of the dynamic model are given by expressions 01 to 04.

$$Fz = mb*(g + d2Zb/dt2) \quad \text{Expression 01}$$

$$Fx = mb*d2Xb/dt2 \quad \text{Expression 02}$$

$$Mb\_y = -mb*Xb*(g + d2Zb/dt2) + mb*Zb*(d2Xb/dt2) \quad \text{Expression 03}$$

$$Mzmp\_y = -mb*(Xb - Xzmp)*(g + d2Zb/dt2) + mb*(Zb - Zzmp)*(d2Xb/dt2) \quad \text{Expression 04}$$

In this case, the relationship between Mb_y and Mzmp_y is represented by the following expression 05.

$$Mb\_y = Mzmp\_y - mb*Xzmp*(g + d2Zb/dt2) + mb*Zzmp*(d2Xb/dt2) = Mzmp\_y - Xzmp*Fz + Zzmp*Fx \quad \text{Expression 05}$$

The positional difference between a desired ZMP and the origin of the supporting leg coordinate system in the vertical direction (Z-axis direction) is usually zero or approximately zero, so that Zzmp may be regarded as zero (Zzmp=0).

Further, a relative variation amount of height of the body 24 (the position in the vertical direction) relative to a mean height, that is, the divergence of the vertical position of the body 24, when the robot 1 travels is generally sufficiently small. Therefore, Zb≈h is applicable (h: Constant value indicating a mean height of the body mass point 24b corresponding to a mean height of the body 24). Accordingly, Zb in the second term of the right side of expression 03 given above and the second term of the right side of expression 04 given above may be replaced by the constant value h.

The gait generator 100 in the present embodiment generates a desired gait for one step in order, the desired gait for one step being defined by a period from the instant one of the legs 2 of the robot 1 lands to the instant the other leg 2 lands. Thus, in the running gait which is generated in the present embodiment and which is illustrated in FIG. 6, the desired gait from the instant the one-leg supporting period begins to the instant the floating period following the one-leg supporting period ends (the instant the next one-leg supporting period begins) is generated in order.

Here, in the present description, the term "one step" of a desired gait is used to mean the period from the instant one of the legs 2 of the robot 1 lands to the instant the other leg 2 lands. Further, a desired gait which is about to be generated anew is referred to as "a current time gait," the next desired gait is referred to as "a next gait," and the further next desired gait is referred to as "a next but one time gait." A desired gait generated immediately preceding a current time gait is referred to as "a last time gait."

Further, when the gait generator 100 generates a current time gait, the required parameters that define the expected landing position/posture and the expected landing time of the foot 22 of a free leg for the next two steps of the robot 1 are input to the gait generator 100 (or the gait generator 100 reads the required parameters from a memory device). Then, the gait generator 100 uses the required parameters to generate a desired body position/posture trajectory, a desired foot position/posture trajectory, a desired ZMP trajectory, a desired floor reaction force vertical component trajectory, a desired arm posture trajectory and the like.

At this time, in order to generate a current time gait that enables the continuity of the motion of the robot 1 to be secured, the gait generator 100 determines a normal turning gait as a virtual cyclic gait following the current time gait (a gait in which the same pattern of motion of the robot 1 is continuously repeated at a certain cycle) on the basis of the required parameters. Then, the gait generator 100 generates the current time gait such that the current time gait will be converged to a normal turning gait in the future.

Taking the generation of a running gait illustrated in FIG. 6 as a major example, the following will explain the processing for generating a gait carried out by the gait generator 100 with reference to detailed diagrams of FIG. 10 to FIG. 23.

Figure 10:
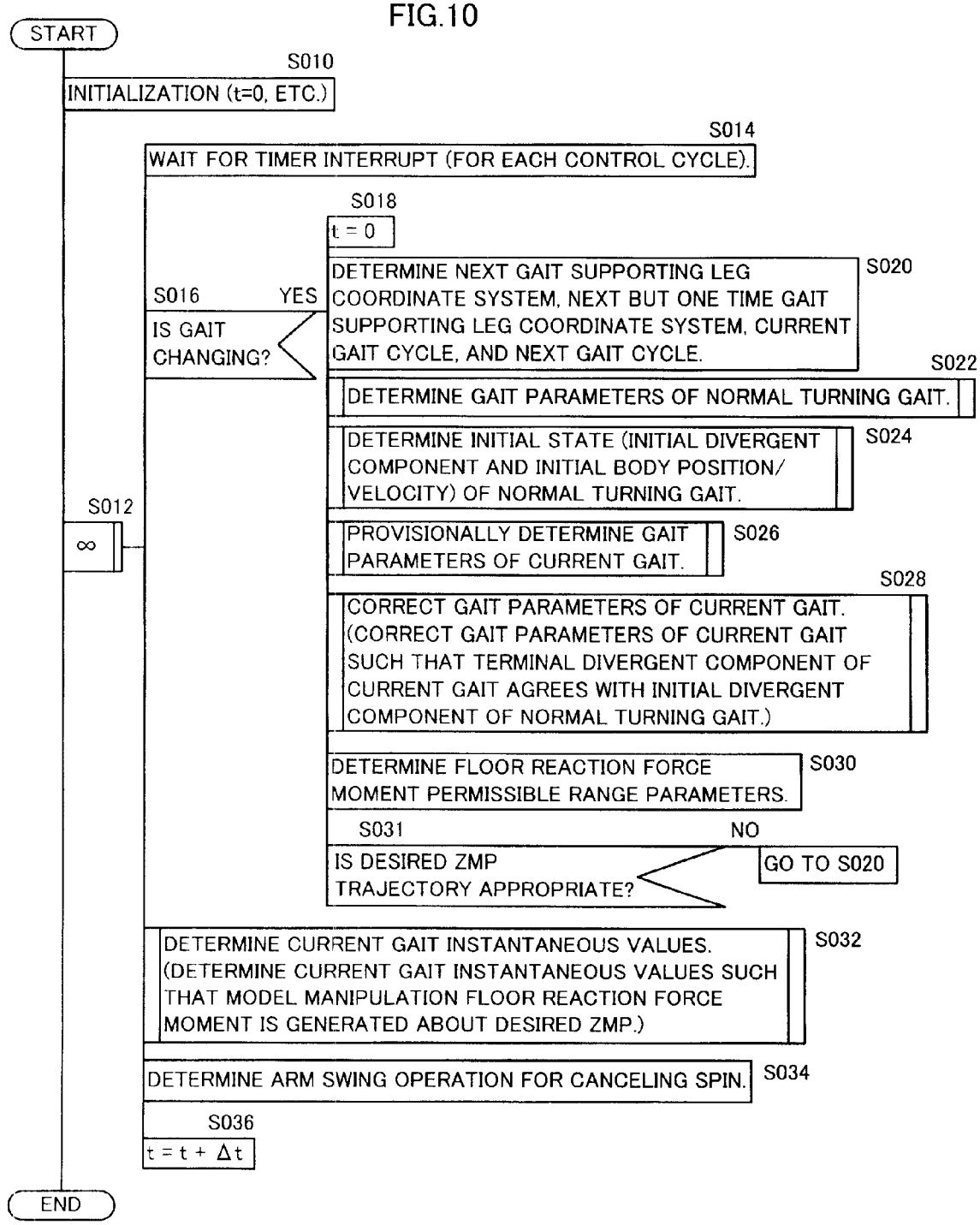
FIG. 10 is a flowchart illustrating main routine processing carried out by the gait generator shown in FIG. 3.

The gait generator 100 generates a desired gait by carrying out the gait generating processing (main routine processing) illustrated by the flowchart (structured flowchart) of FIG. 10.

First, in S010, various initializing operations, such as initializing time t to zero, are performed. This processing is carried out at the time of a startup or the like of the gait generator 100.

Subsequently, the gait generator 100 proceeds via S012 to S014 wherein the gait generator 100 waits for a timer interrupt at each control cycle (the arithmetic processing cycle in the flowchart of FIG. 10). The control cycle is denoted by Δt.

Subsequently, the gait generator 100 proceeds to S016 to determine whether a gait changeover has taken place. At this time, if a changeover of a gait has occurred, then the gait generator 100 proceeds to S018. If a changeover of the gait has not occurred, then the gait generator 100 proceeds to S032. Here, the phrase "the gait changeover" means the timing at which the generation of a last time gait is completed and the generation of a current time gait is about to begin. For example, a control cycle that follows the control cycle at which the generation of the last time gait has been completed provides the gait changeover.

When the gait generator 100 proceeds to S018, time t is initialized to zero. Subsequently, the gait generator 100 proceeds to S020 to determine a next time's gait supporting leg coordinate system, a next but one time's gait supporting leg coordinate system, a current gait cycle, and a next gait cycle. Determining a supporting leg coordinate system means to determine the position of the origin thereof and the posture of the supporting leg coordinate system (the orientation of each coordinate system axis).

These supporting leg coordinate system and gait cycle are basically determined on the basis of the aforesaid required parameters. More specifically, in the present embodiment, the required parameters input to the gait generator 100 include required values that define the expected landing positions/postures of the foot 22 of a free leg for the following two steps (the foot position/posture in a state wherein the foot 22 is rotated without a slippage such that substantially the entire sole comes in contact with a floor surface after the foot 22 lands) and expected landing time. The required values for the first step and the required values for the second step are considered to correspond to the current time gait and the next gait, respectively, and supplied to the gait generator 100 before the generation of the current time gait is started (before the gait changeover in S016 mentioned above). An arrangement may be made so that these required values can be changed in the middle of generating the current time gait.

Then, the next time gait's supporting leg coordinate system is determined on the basis of the required value of the expected landing position/posture of the foot 22 of the free leg of the first step (the foot 22 of the free leg in the current time gait) in the aforesaid required parameters.

Figure 13:
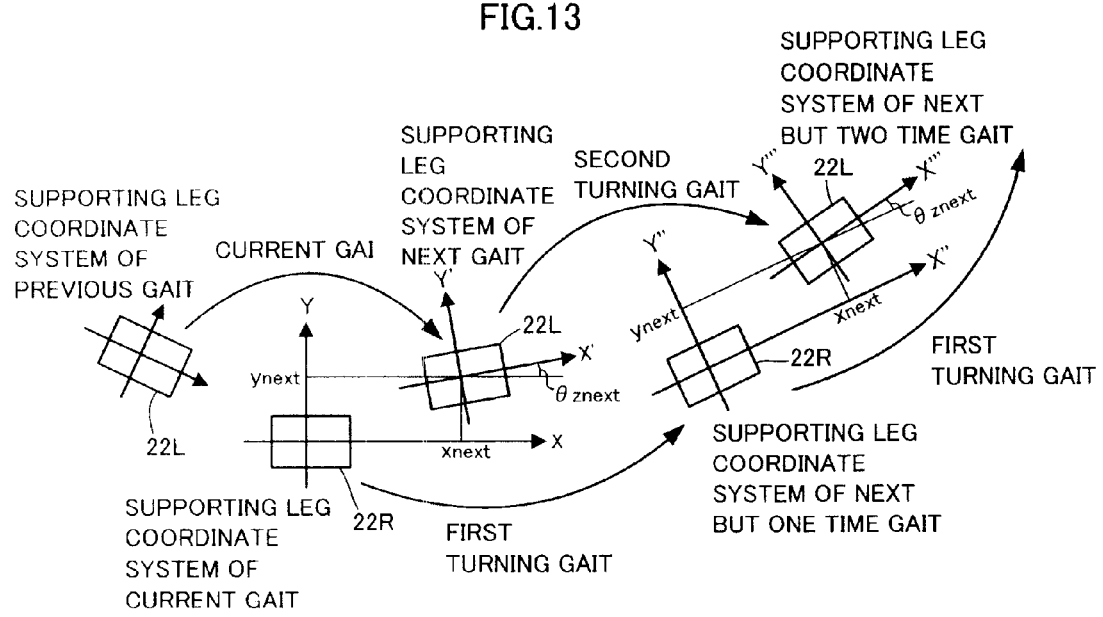
FIG. 13 is a diagram illustrating the modes of motions of feet of the robot shown in FIG. 1 and supporting leg coordinate systems.

For example, referring to FIG. 13, it is assumed that the required values of the expected landing position/posture of the foot 22 of the free leg (22L in the figure) involved in the current time gait (the first step) specify the position/posture obtained by moving, from the landing position/posture of the foot 22 (22R in the figure) of the supporting leg of the current time gait, in the X-axis direction (in the longitudinal direction of the foot 22R of the supporting leg in the current time gait) and in the Y-axis direction (in the lateral direction of the foot 22R of the supporting leg in the current time gait) of the current time's gait supporting leg coordinate system by xnext and ynext, respectively, and rotating about the Z-axis (about the vertical axis) by θznext.

At this time, the next time gait's supporting leg coordinate system is determined to be a coordinate system in which the origin thereof is the representative point of a foot 22L (more specifically, a point on the floor that coincides with the representative point) in the case where the foot 22L is landed according to the required values of the expected landing position/posture of the foot 22L of the free leg in the current time gait (in the case where the representative point of the foot 22 coincides with the required value of the expected landing position and the posture (orientation) of the foot 22 coincides with the required value of the expected landing posture), and the longitudinal direction and the lateral direction of the foot 22L in the horizontal plane passing the origin are defined as an X'-axis direction and a Y'-axis direction, as illustrated.

In the same manner as that described above, the next but one time's gait supporting leg coordinate system (refer to the X"Y" coordinate in FIG. 13) is determined on the basis of the required values of the expected landing position/posture of the foot 22 of the free leg of the second step. The current gait cycle is determined as the time from the expected landing time (required value) of the foot 22 of the supporting leg of the current time gait to the expected landing time (required value) of the foot 22 of the free leg of the first step (current time gait). The next gait cycle is determined to be the time from the expected landing time (required value) of the foot 22 of the free leg of the first step to the expected landing time (required value) of the foot 22 of the free leg of the second step.

The required parameters are input to the gait generator 100 from, for example, a maneuvering device or a server or the like outside the robot 1. Alternatively, the required parameters may be stored and retained beforehand in a memory device of the robot 1 as a moving schedule or the robot 1. Further alternatively, the next and the next but one time's gait supporting leg coordinate systems and the current and the next gait cycles may be determined on the basis of a command (request) from the controlling device and a movement history of the robot 1 up to the moment. The required parameters may be parameters that directly define the positions and postures of the next and the next but one time's gait supporting leg coordinate systems and the current and the next gait cycles.

Supplementally, in the present embodiment, there is a case where the expected landing position/posture of the root 22 of a free leg of the robot 1 in one or both of the current time gait and the next gait, and in turn, the position/posture of at least one of the next time's gait supporting leg coordinate system and the next but one time's gait supporting leg coordinate system are corrected, as necessary, on the basis of the required parameters input to the gait generator 100.

Subsequently, the gait generator 100 proceeds to S022 to determine the gait parameters or a normal turning gait as a virtual cyclic gait following the current time gait (a virtual cyclic gait to which the current time gait aims to converge). The gait parameters in the present embodiment include a foot trajectory parameter that defines a desired foot position/posture trajectory in a normal turning gait, a body posture trajectory parameter that defines a desired body posture trajectory, an arm trajectory parameter that defines a desired arm posture trajectory, a ZMP trajectory parameter that defines a desired ZMP trajectory, and a floor reaction force vertical component trajectory parameter that defines a desired floor reaction force vertical component trajectory.

Here, "the normal turning gait" means a cyclic gait in which no discontinuity takes place in the motional states (motional states, such as foot position/posture and body position/posture) of the robot 1 at the boundary of a gait (a gait boundary of each cycle) when the gait is repeated. Further, "the normal turning gait" is a cyclic gait, which repeats the same pattern of gait at a certain cycle, meaning that it is a gait that permits continuous motions of the robot 1. In other words, "the normal turning gait" is a cyclic gait that enables repeated motions of the same pattern without developing discontinuity in a gait trajectory (a gait which, in principle, does not develop "divergence," which will be discussed later, when repeated an infinite number of times).

In the present embodiment, the normal turning gait, which is a cyclic gait, repeats a gait for one cycle at certain intervals, the gait for one cycle being formed of a gait for two steps of the robot 1, i.e., the gait composed of the first turning gait following the current time gait and the second turning gait following the first turning gait. Here, the term "turning" is used, because a zero turning rate means traveling straight, so that traveling straight can be also included in the term "turning" in a broad sense.

If a desired gait to be generated is a running gait illustrated in FIG. 6, then the first turning gait and the second turning gait of a normal gait are both gaits having the one-leg supporting period and the floating period as with a desired gait. In other words, the basic gait pattern of the first turning gait and the second turning gait are the same as that of the current time gait.

To supplement the description of the normal turning gait (hereinafter referred to simply as the normal gait in some cases), the gait for one cycle of a normal gait of a bipedal robot need to include a gait for at least two steps. In this case, it is possible to set a complicated normal gait in which the gait for one cycle has three steps for more. However, the normal gait is used merely to determine the value of a desired (proper) divergent component at the end (ending time) of the current time gait, as will be discussed later. Therefore, using a normal gait formed of a gait having three steps or more as one cycle provides little effect despite the complicated processing for generating the gait. For this reason, the gait for one cycle of the normal gait in the present embodiment is formed of a gait of two steps (a set of the first turning gait and the second turning gait). In the case of a legged mobile having three feet or more, the number of gaits defining the normal gait will increase accordingly.

Figure 11:
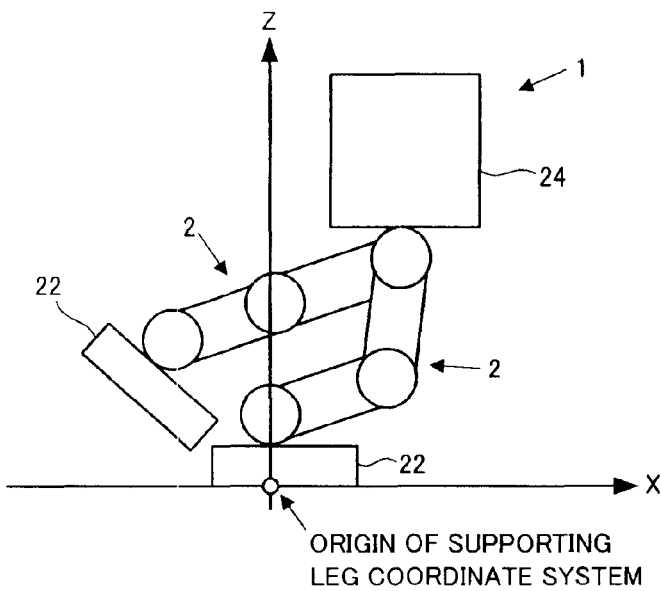
FIG. 11 is a diagram visually showing a divergent state of a posture of the robot shown in FIG. 1.

Here, the term "divergence" means that the position of the body 24 of the robot 1 deviates to a position far apart from the positions of both feet 22, 22, as illustrated in FIG. 11. The value of a divergent component is a numerical value indicating the degree of the deviation of the position of the body 24 of the robot 1 from the positions of both feet 22, 22 (more specifically, the origin of the supporting leg coordinate system set on the ground contact surface of the foot 22 of the supporting leg).

The normal gait is a virtual gait prepared by the gait generator 100 to determine a desired motional state of the robot 1 at the end of the current time gait. Hence, the normal turning gait is not directly output from the gait generator 100.

In the present embodiment, a divergent component is used as an indicator in generating gaits so as to continuously generate desired gaits without developing the aforesaid divergence. In this case, even for a normal gait, which is a typical example of a continuous gait, the initial divergent component of the normal gait (the divergent component at the starting time of the normal gait) changes if the gait parameters of the normal gait change. More specifically, a proper divergent component changes according to the type of gait, such as walking, running and a traveling speed.

In the present embodiment, therefore, when generating a current time gait, the gait generator 100 first determines, on the basis of the required parameters related to the current time gait (or the supporting leg coordinate system and the gait cycle determined in S020), a normal gait as a virtual cyclic gait in the future ideally suited as the gait following the current time gait to be generated (a gait targeted also at convergence in the future) and as a virtual cyclic gait in the future that enables stable travel of the robot 1 to be continued, then determines an initial divergent component of the normal gait. Then, the gait generator 100 generates the current time gait such that the terminal divergent component of the current time gait coincides with the initial divergent component of the determined normal gait (more generally, the current time gait is continued or gradually approximated to the normal gait). The basic guideline of the gait generation described above is the same as that disclosed in Patent No. 3726081 previously proposed by the present applicant.

However, in the present embodiment, the divergent component of a gait is defined on the basis of a state equation of the aforesaid dynamic model (the inverted pendulum model) illustrated in FIG. 9, as will be discussed later. The definition of the divergent component will be discussed in detail hereinafter.

Figure 12:
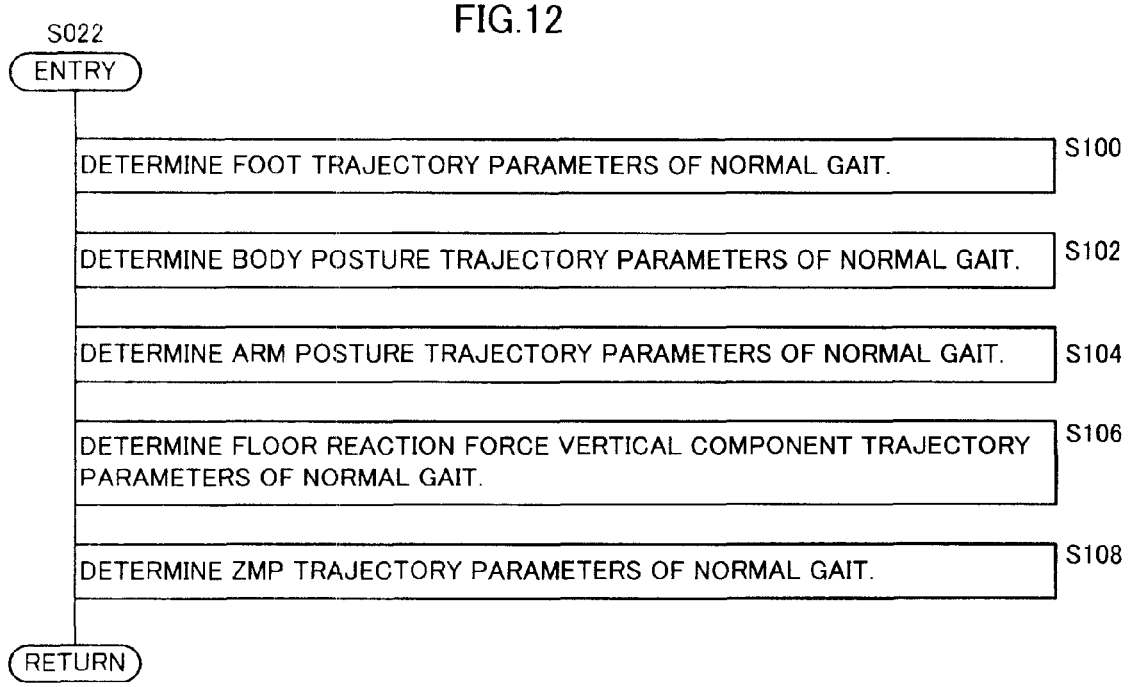
FIG. 12 is a flowchart illustrating subroutine processing in S022 of FIG. 10.

Referring back to the main subject, the gait generator 100 carries out in S022 the subroutine processing illustrated by the flowchart of FIG. 12.

First, in S100, the gait generator 100 determines a foot trajectory parameter of the gait parameters of the normal gait such that a foot position/posture trajectory continues in the order of a current time gait, a first turning gait, and a second turning gait. The following will describe a specific setting method with reference to FIG. 13. In the following description, the foot 22 of the leg 2 on the supporting leg side will be referred to as the supporting leg foot 22, while the foot 22 of the leg 2 on the free leg side will be referred to as the free leg foot 22. The "initial" gait and the "terminal" gait will mean the starting time and the ending time, respectively, of each gait or instantaneous gaits at the starting time and the ending time.

The foot trajectory parameter is constituted of the positions/postures of the supporting leg foot 22 and the free leg foot 22, respectively, at the beginning and the end of the first turning gait and the second turning gait, respectively, and the gait cycle of each turning gait (the time from the beginning to the end of each turning gait). In the foot trajectory parameter, the free leg foot position/posture at the beginning of the first turning gait are defined as the supporting leg foot position/posture at the end of the current time gait observed from a next time gait's supporting leg coordinate system.

In this case, in a running gait, the supporting leg foot 22 at the end of the current time gait is moving in the air. Further, the supporting leg foot position/posture at the end of the current time gait is determined by generating a foot position/posture trajectory (more specifically, a trajectory observed from the next time gait's supporting leg coordinate system) from the supporting leg foot position/posture at the beginning of the current time gait (=the free leg foot position/posture at the end of a last time gait) to a free leg foot position/posture at the end of the next gait, which is determined on the basis of the required value of the expected landing position/posture of the free leg foot 22 of the second step in the aforesaid required parameter (the required values of the expected landing position/posture in the next gait of the supporting leg foot 22 of the current time gait) or a next but one time's gait supporting leg coordinate system corresponding to the required value, to the end of the current time gait by using the aforesaid finite-duration setting filter.

The free leg foot position/posture at the end of the next gait is determined such that the position/posture of the foot 22 obtained by turning the foot 22 in the pitch direction with the toes down while keeping the foot 22 in contact with the ground from the position/posture to a horizontal posture coincide with the position/posture of the next but one time's gait supporting, leg coordinate system. In other words, the free leg foot position/posture at the end of the next gait are the position/posture of the foot 22 in a state wherein the foot has been rotated by a predetermined angle in the pitch direction with the toes lilted while the foot 22 is kept in contact with the ground without a slippage from the required values of the expected landing position/posture of the free leg foot 22 of the second step in the required parameter (a state wherein the heel has been landed with the toes up).

Further, the supporting leg foot position/posture at the beginning of the first turning gait are the free leg foot position/posture at the end of the current time gait observed from the next time gait's supporting leg coordinate system. In this case, the free leg foot position/posture at the end of the current time gait are determined on the basis of the aforesaid next time gait's supporting leg coordinate system or the required values or the expected free leg landing position/posture of the first step (the current time gait) of the aforesaid required parameter corresponding thereto, as with the case of the free leg foot position/posture at the end of the next gait. More specifically, the free leg foot position/posture at the end of the current time gait are determined such that the representative point of the foot 22 when the foot 22 has been rotated, from the position/posture, with the toes down while keeping the foot 22 in contact with the ground until substantially the entire bottom surface of the foot 22 comes in contact with a floor surface coincides with the origin of next time gait's supporting leg coordinate system.

The free leg foot position/posture at the end of the first turning gait is determined on the basis of the position/posture of the next but one gait supporting leg coordinate system observed from the next time gait's supporting leg coordinate system, as with the technique for determining the free leg foot position/posture at the end of the current time gait or the free leg foot position/posture at the end of the next gait. To be more specific, the free leg foot position/posture at the end of the first turning gait are determined such that the position/posture of the foot 22 when the foot 22 has been rotated in the pitch direction without a slippage while keeping the foot 22 in contact with the ground from the position/posture to the horizontal posture coincide with the position/posture of the next but one time's gait supporting leg coordinate system observed from the next time gait's supporting leg coordinate system.

At the end of the first turning gait, the supporting leg foot 22 is off the floor and in the air. In order to determine the trajectory after the supporting leg foot 22 leaves the floor, the expected landing position/posture of the supporting leg foot of the first turning gait are set. The expected landing position/posture of the supporting leg foot of the first turning gait are determined on the basis of the position/posture of the next but two time's gait supporting leg coordinate system observed from the next time gait's supporting leg coordinate system. To be more specific, the expected landing position/posture of the supporting leg foot of the first turning gait are the position/posture of the next but two time's gait supporting leg coordinate system observed from the next time gait's supporting leg coordinate system. The next but two time's gait supporting leg coordinate system is determined such that the relative position/posture relationship between the next but one time's gait supporting leg coordinate system and the next but two time's gait supporting leg coordinate system coincides with the relative position/posture relationship between the current time's gait supporting leg coordinate system and the next time gait's supporting leg coordinate system.

The supporting leg foot position/posture at the end of the first turning gait are determined by generating a foot position/posture trajectory from the supporting leg foot position/posture at the beginning of the first turning gait to the expected landing position/posture of the supporting leg foot of the first turning gait (more specifically, the trajectory observed from the next time gait's supporting leg coordinate system) until the end of the first turning gait by using the aforesaid finite-duration setting filter, as with the case where the supporting leg foot position/posture at the beginning of the first turning gait have been determined.

The free leg foot position/posture at the beginning of the second turning gait are the supporting leg foot position/posture at the end of the first turning gait observed from the next but one time's gait supporting leg coordinate system. The supporting leg foot position/posture at the beginning of the second turning gait are the free leg foot position/posture at the end of the first turning gait observed from the next but one time's gait supporting leg coordinate system.

The free leg foot position/posture at the end of the second turning gait are the free leg foot position/posture at the end of the current time gait observed from the current time's gait supporting leg coordinate system. The supporting leg foot position/posture at the end of the second turning gait are the supporting leg foot position/posture at the end of the current time gait observed from the current time's gait supporting leg coordinate system.

The gait cycles of the first turning gait and the second turning gait are set to be the same as the next gait cycle. The gait cycles of the first turning gait and the second turning, gait do not necessarily have to be the same; however, both cycles are preferably determined on the basis of at least the next gait cycle.

Next, the gait generator 100 proceeds to S102 to determine the body posture trajectory parameters that define a desired body posture trajectory in a normal gait.

In this case, according to the present embodiment, the body posture trajectory parameters of the normal gait are determined such that the desired body posture trajectory specified thereby agrees with the trajectory of a reference body posture in a predetermined pattern established beforehand. The reference body posture in the present embodiment is set to a constant posture (fixed posture) free of temporal changes. The reference body posture is such that, for example, the body trunk axis of the body 24 is steadily set in the vertical direction (a body posture in a state wherein the robot 1 is standing in an upright posture), i.e. a posture in which the body posture angle relative to the vertical direction is steadily maintained at zero. The parameters (e.g., the value of a certain body posture angle of the reference body posture) that define the trajectory of the reference body posture are determined as the body posture trajectory parameters. If the body posture is set at the constant posture, then the angular velocity and the angular acceleration of the body posture angle will automatically be maintained at zero at all times.

Supplementally, the body posture of a normal gait does not have to be a constant posture as long as the body posture is set such that the body posture connects at the beginning of the normal gait (the beginning of a first turning gait) and the end thereof (the end of a second turning gait), i.e., as long as the body posture angle and the angular velocity thereof respectively agree at the beginning and the end of the normal gait. In the present embodiment, the reference body posture has been set to the constant posture as described above in order to ensure easy understanding of the present embodiment.

Subsequently, the gait generator 100 proceeds to S104 to determine arm posture trajectory parameters, more specifically, arm posture trajectory parameters other than those related to the angular momentum changes of both arms about the vertical axis (or the body trunk axis of the body 24). For example, the parameters defining the relative height of the hand distal end of an arm in relation to the body 24 and the relative center-of-gravity position of the entire arm are determined as the arm posture trajectory parameters. In this case, according to the present embodiment, the relative center-of-gravity position of the entire arm is set to be maintained at a constant position relative to the body 24.

Subsequently, the gait generator 100 proceeds to S106 to determine floor reaction force vertical component trajectory parameters. In this case, the floor reaction force vertical component trajectory parameters are determined such that the floor reaction force vertical component trajectory defined by the parameters will be substantially continuous in both the first turning gait and the second turning gait.

To be more specific, a desired floor reaction force vertical component trajectory of a normal gait is set according to a pattern illustrated in, for example, FIG. 14. According to the pattern, in both the first turning gait and the second turning gait, the floor reaction force vertical component changes in a trapezoidal shape in a one-leg supporting period, and the floor reaction force vertical component is maintained at zero in a floating period. The time of a breakpoint of the pattern and the height (peak value) of the trapezoidal portion are determined as the floor reaction force vertical component trajectory parameters.

The floor reaction force vertical component trajectory parameters are determined such that the mean value of the floor reaction force vertical components in the period equivalent to one cycle of the normal gait (the period combining the period of the first turning gait and the period of the second turning gait) agrees with the self weight of the robot 1. In other words, the floor reaction force vertical component trajectory parameters are determined such that the mean value of the floor reaction force vertical components during the period equivalent to one cycle of the normal gait has the same magnitude as that of the gravitational force acting on the entire robot 1 and is in the opposite direction.

Determining the floor reaction force vertical component trajectory parameters (and subsequently the floor reaction force vertical component trajectory) is necessary to satisfy a condition of a normal gait. The condition of the normal gait is that an initial state (the initial state of a first turning gait observed from the supporting leg coordinate system of the first turning gait of the normal gait) and a terminal state (the terminal state of a second turning gait observed from the supporting leg coordinate system of the first turning gait following the second turning gait of the normal gait) on every state amount of the normal gait (motional state amounts, including the position, the posture and the velocity of each portion of the robot 1) coincide with each other (hereinafter, the condition will be referred to as the boundary condition of a normal gait in some cases).

Hence, the difference between the overall center-of-gravity vertical velocity of the robot 1 at the end of the normal gait and the overall center-of-gravity vertical velocity at the beginning of the normal gait (more specifically, the difference between the overall center-of-gravity vertical velocity at the end of the second turning gait and the overall center-of-gravity vertical velocity at the beginning of the first turning gait) must be also zero. The aforesaid difference is the integral value of the difference between the floor reaction force vertical component and the gravitational force (the first-order integral value in the period equivalent to one cycle from the beginning to the end of the normal gait). Therefore, in order to bring the difference to zero, the floor reaction force vertical component trajectory must be determined such that the mean value of the floor reaction force vertical components in the period equivalent to one cycle of the normal gait agrees with the self weight of the robot 1, as described above.

In the present embodiment, the mean value of the floor reaction force vertical components in the period of the first turning gait and the period of the second turning gait, respectively, is made to agree with the self weight of the robot 1. To be more specific, for example, the time of each of the breakpoint of the trapezoidal portion of the floor reaction force vertical component trajectory in each turning gait is set according to the gait cycles of the first turning gait and the second turning gait, and then the height of the trapezoidal portion (the peak value of the floor reaction force vertical component) is determined such that the mean value of the floor reaction force vertical components in each of the periods of the first turning gait and the second turning gait agrees with the self weight of the robot 1. In this case, the height of the trapezoidal portion can be determined by solving an equation which indicates a condition that the mean value and the self weight coincide with each other, taking the height as an unknown value.

Thus, the difference between the overall center-of-gravity vertical velocity at the end of the first turning gait and the overall center-of-gravity vertical velocity at the beginning of the first turning gait becomes zero, and the difference between the overall center-of-gravity vertical velocity at the end of the second turning gait and the overall center-of-gravity vertical velocity at the beginning of the second turning gait also becomes zero. This, however, is not a must. For example, if there is a possibility that the body vertical position becomes excessively high or low in the vicinity of the boundary between the first turning gait and the second turning gait, then the height or the like of the trapezoidal shape of the floor reaction force vertical component trajectory of each turning gait may be corrected from the state wherein the mean value and the self weight coincide with each other in each turning gait.

Subsequently, the gait generator 100 proceeds to S108 to determine ZMP trajectory parameters which define a desired ZMP trajectory of a normal gait composed of the combination of the first turning gait and the second turning gait. In this case, the desired ZMP trajectory is determined such that the stability allowance is high and no sudden change occurs, as previously described.

More specifically, in the running gait illustrated in FIG. 6, the heel of the supporting leg bot 22 (the free leg foot 22 in the floating period) lands, and after a while, substantially the entire bottom surface of the supporting leg foot 22 comes in contact with the ground, then after a while, only the tiptoe of the supporting leg foot 22 comes in contact with the ground. Next, the robot 1 kicks the floor at the tiptoe of the supporting leg foot 22 and jumps into the air, and lastly, lands at the heel of the free leg foot 22. The desired ZMP must exist in a ground contact plane.

Figure 8A:
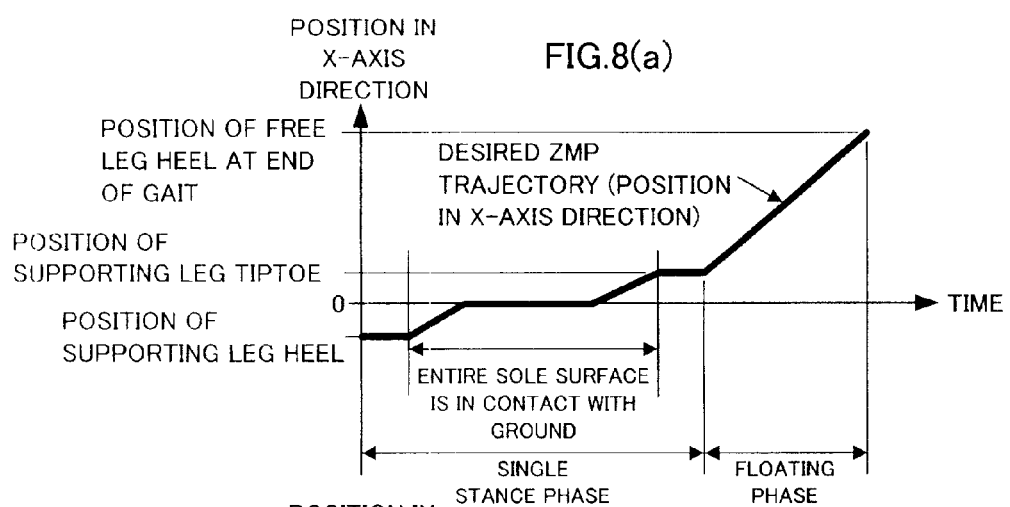
FIGS. 8(a) and 8(b) are graphs illustrating an example of the desired floor reaction force vertical component trajectory (a component in an X-axis direction and a component in a Y-axis direction) generated by the gait generator shown in FIG. 3.

In the present embodiment, therefore, the position of the desired ZMP of each of the first turning gait and the second turning gait of a normal gait in the X-axis direction is determined such that the desired ZMP remains at that position until substantially the entire bottom surface of the foot 22 comes in contact with the ground, taking the heel of the supporting leg foot 22 as the initial position, as illustrated in FIG. 8(a).

Subsequently, the desired ZMP is determined such that the desired ZMP moves to the center of the supporting leg foot 22 and further moves to the tiptoe by the time when the tiptoe of the foot 22 comes in contact with the ground, and thereafter remains at the tiptoe of the supporting leg foot 22 until leaving the floor. After that, as previously described, the desired ZMP is determined such that the desired ZMP continuously moves from the tiptoe of the supporting leg foot 22 to the landing position of the heel of the free leg foot 22 by the time of the next landing of the free leg foot 22.

Thus, the desired ZMP trajectory (the trajectory of the position in the X-axis direction) of the normal gait formed of the first turning gait and the second turning gait is determined as illustrated in FIG. 15. The time and position of each of the breakpoints of the desired ZMP trajectory are determined as the ZMP trajectory parameters of the normal gait. In this case, the time of the breakpoints is determined according to the gait cycles of the first turning gait and the second turning gait determined on the basis of the aforesaid required parameters. Further, the positions of the breakpoints are determined on the basis of the positions/postures of the next time gait's supporting leg coordinate system and the next but one tune's gait supporting leg coordinate system or the required values of the expected free leg foot landing positions/postures of the first step and the second step that define the positions/postures of these coordinate systems.

Figure 8B:
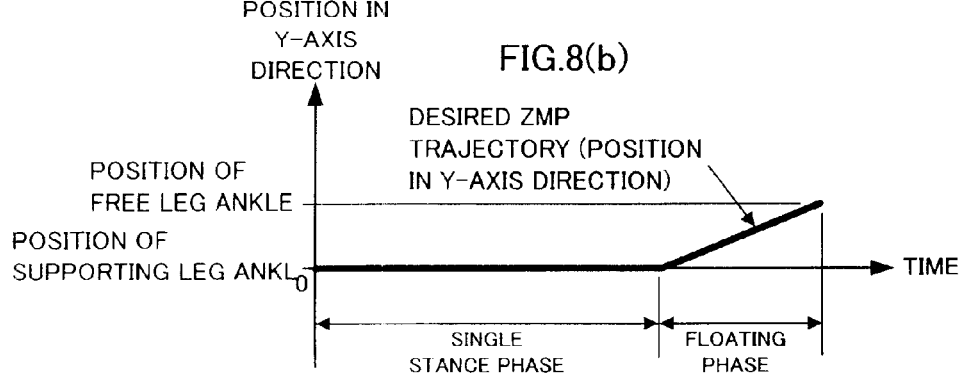

The position in the Y-axis direction of the desired ZMP trajectory is determined in the same manner as that illustrated in FIG. 8(b). To be more specific, the trajectory of the position or the desired ZMP in the Y-axis direction in the first turning gait is determined according to the same pattern illustrated in FIG. 8(b). Further, the trajectory of the position of the desired ZMP in the Y-axis direction in the second turning gait is determined to be a trajectory which has the same configuration as the trajectory of the first turning gait and continues to the end of the trajectory.

This completes the detailed description of the processing in S022 of FIG. 10.

Referring back to FIG. 10, after carrying out the processing in S022 as described above, the gait generator 100 proceeds to S024 wherein the gait generator 100 calculates the initial state of the normal gait. The initial state calculated here specifically includes the initial body posture velocity (the initial body position and the initial body velocity) and the initial divergent component of the normal gait. The initial state is exploratorily calculated by the processing illustrated by the flowchart of FIG. 16.

First, in S200, the gait generator 100 determines the initial states of the desired foot position/posture, the desired arm posture, and the desired body posture angle of the normal gait (the state at the starting time of the normal gait (=the ending time of the current time gait)) on the basis of the normal gait parameters (the gait parameters determined in S022 of FIG. 10). Here, the term "state" means the pair of a position or posture and the temporal change rate thereof (the changing velocity of a position or posture). For example, the initial state of the desired foot position/posture means the pair of the foot position/posture at the starting time of the normal gait and the temporal change rate thereof (i.e., the moving velocity and the changing velocity of the posture of the foot 22). The same applies to the initial state of the desired arm posture and the initial state of the desired body posture angle.

In this case, the initial state of the position/posture of the supporting leg foot and the initial state of the position/posture of the free leg foot are determined on the basis of foot trajectory parameters determined in S100 of FIG. 12.

To be more specific, among the foot trajectory parameters, the supporting leg foot position/posture at the beginning of the first turning gait and the free leg foot position/posture at the beginning of the first turning gait are determined as the supporting leg foot position/posture and the free leg foot position/posture, respectively, at the starting time of the normal gait.

Further, the temporal change rate of the supporting leg foot position/posture at the starting time of the normal gait is calculated as the temporal change rate of the foot position/posture at the starting time (the starting time of the normal gait) of a foot position/posture trajectory from the supporting leg foot position/posture at the beginning of the first turning gait to the tree leg foot position/posture at the end of the second turning gait (the trajectory observed from the next time gait's supporting leg coordinate system), the trajectory being generated by a finite-duration setting filter. In this case, the temporal change rate of the supporting leg foot position/posture at the starting time of the normal gait can be calculated on the basis of the trajectory from the normal gait beginning time to the time immediately thereafter in the foot position/posture trajectory from the supporting leg foot position/posture at the beginning of the first turning gait to the free leg foot position/posture at the end of the second turning gait.

Further, the temporal change rate of the free leg foot position/posture at the starting time of the normal gait is calculated as the temporal change rate of the foot position/posture at the starting time (the starting time of the normal gait) of a foot position/posture trajectory from the supporting leg foot position/posture at the beginning of the current time gait to the free leg foot position/posture at the end of the first turning gait (the trajectory observed from the next time gait's supporting leg coordinate system), the trajectory being generated by a finite-duration setting filter. In this case, in the foot position/posture trajectory from the supporting leg foot position/posture at the beginning of the current time gait to the free leg foot position/posture at the end of the first turning gait, generating a trajectory from the starting time of the current time gait to the starting time (or time immediately thereafter) of the normal gait makes it possible to calculate the temporal change rate of the free leg foot position/posture at the starting time of the normal gait from the trajectory (the trajectory in the vicinity of the starting time of the normal gait).

The initial state of an arm posture is determined by determining the arm posture (including the overall center-of-gravity positions of both arms relative to the body 24) at the starting time of the normal gait and the change amounts of the arm postures in a period immediately following the starting time of the normal gait on the basis of the arm posture trajectory parameters determined in S104 of FIG. 12.

Further, the initial state of the body posture angle is determined by determining the body posture angle at the starting time of the normal gait and the change amount of the body posture angle in a period immediately following the starting time on the basis of the body posture trajectory parameters determined in S102 of FIG. 12. In the present embodiment, the body posture defined by the body posture trajectory parameters is a posture in which the body trunk axis of the body 24 is steadily oriented in the vertical direction. Therefore, the body posture angle and the angular velocity thereof are both zero at the starting time of the normal gait.

Subsequently, the gait generator 100 proceeds to S202 to provisionally determine (Xs, Vxs) (Xs: horizontal position; Vxs: horizontal velocity), which are the candidates of the initial body horizontal position/velocity (the candidates of the horizontal position and the horizontal velocity of the body 24 at the starting time of the normal gait). The candidates (Xs, Vxs) provisionally determined here may be arbitrary and may be provisionally determined as, for example, the candidates (Xs, Vxs) of the body horizontal position/velocity at the initial state of the normal gait determined when the last time gait was generated.

To simplify the description, an example will be taken in which the initial state (the initial body horizontal position/velocity) of a normal gait in the X-axis direction (the roll-axis direction) on a sagittal plane is explored. However, in effect, the initial state of the normal gait (the initial state that satisfies the aforesaid boundary condition of the normal gait) must be explored separately or simultaneously in the X-axis direction (the roll-axis direction) and the Y-axis direction (the pitch-axis direction) on both the position and the velocity.

As an exploratory determining technique, a method in which a pseudo Jacobian (sensitivity matrix) is determined and a next candidate is determined by a steepest descent method or the like, or a simplex method may be used. In the present embodiment, for example, the steepest descent method is used.

Subsequently, the gait generator 100 proceeds to S206 via S204 to determine initial body vertical position/velocity (Zs, Vzs), which is a pair of the vertical position (the position in the Z-axis direction) Zs and the vertical velocity (the velocity in the Z-axis direction) Vzs of the body 24 at the starting time of the normal gait.

In the present embodiment, the initial body vertical velocity Vzs is determined, for example, as described below.

The following expression applies to the kinetic relationship for the robot 1.

Terminal overall center-of-gravity vertical position−Initial overall center-of-gravity vertical position=Second-order integration of(Floor reaction force vertical component/Overall mass of the robot)+Second-order integration of gravitational acceleration+Initial overall center-of-gravity vertical velocity*Duration of one step  Expression 13

(where the gravitational acceleration takes a negative value)

In the normal gait, a terminal overall center-of-gravity vertical position and an initial overall center-of-gravity vertical position coincide with each other, so that the right side of the above expression 13 must be zero. Thus, the initial overall center-of-gravity vertical velocity can be determined from the relationship. To be more specific, first, the value obtained by dividing the floor reaction force vertical component calculated on the basis of the floor reaction force vertical component trajectory parameters determined in S104 of FIG. 12 described above is divided by the overall mass of the robot 1 and the obtained result is subjected to the second-order integration in the period from the beginning to the end of the normal gait, thereby determining the overall center-of-gravity movement amount (the first term of the right side of expression 13) based on the floor reaction force vertical component.

Further, the gravitational velocity is subjected to the second-order integration in the period from the beginning to the end of the normal gait thereby to determine the overall center-of-gravity movement amount (the second term of the right side of expression 13) based on the gravitational force. Then, the sign of the sum of the overall center-of-gravity movement amount based on the floor reaction force vertical component and the overall center-of-gravity movement amount based on the gravitational force, which have been determined as described above, is reversed, and the sum with the reversed sign is divided by the time of one cycle Tcyc of the normal gait to determine the initial overall center-of-gravity vertical velocity.

Further, according to the present embodiment, a multi-mass-point model (geometric model) having mass points in, for example, the body 24 and other portions (legs 2, 2 and arms) is used to determine the vertical velocity of the body 24 which causes the vertical velocity of the center-of-gravity point of the multi-mass-point model to coincide with the initial overall center-of-gravity vertical velocity on the basis of the initial state, including the foot position/posture and the arm postures, determined in S200 and the initial body horizontal position/velocity (Xs, Vxs) determined in S202 (or S218 to be discussed later). The vertical velocity thus obtained is determined as the initial body vertical velocity Vzs.

As the multi-mass-point model, there is, for example, a 3-mass-point model which includes one body mass point having a mass of the body 24 (or the mass combining the body 24 and the arms) and two leg mass points having the masses of the two respective legs 2, 2. In this case, for example, the position of the body mass point is to be defined on the basis of the position/posture of the body 24, and the position of each leg mass point is to be defined on the basis of the foot position/posture of each leg 2. In the case where the 3-mass-point model is used, the vertical velocity of the body mass point can be calculated on the basis of the initial overall center-of-gravity vertical velocity and the initial state of the foot position/posture determined as described above. Then, based on the vertical velocity of the body mass point and the initial state of the body posture angle determined in S200, the initial body vertical velocity Vzs can be determined.

A multi-mass-point model having more mass points (e.g., a geometric model having a mass point in each link of the robot 1) may be used to determine the initial body vertical velocity Vzs more accurately. If the mass of a portion excluding the body 24 of the robot 1 is sufficiently smaller than the body 24, then, for example, the aforesaid initial overall center-of-gravity vertical velocity may be determined directly as the initial body vertical velocity Vzs, regarding that the vertical velocity of the overall center of gravity of the robot 1 substantially agrees with the vertical velocity of the body 24.

Meanwhile, the initial body vertical position Zs of the normal gait is determined by, for example, the body height determining technique previously proposed in Japanese Patent Application Laid-Open No. 10-86080 by the present applicant. At this time, the initial body vertical position Zs that prevents the knees of the legs 2, 2 from being fully stretched at the starting time is determined on the basis of the foot position/posture at the starting time (the supporting leg foot position/posture at the beginning of the first turning gait and the free leg foot position/posture at the beginning of the first turning gait determined in S100 of FIG. 12 described above) and a predetermined geometric condition regarding the bending angle of the knee of each leg 2.

For example, if the knee bending angle of the leg 2 on the supporting leg side is denoted by θsup and the knee bending angle of the leg 2 on the free leg side is denoted by θswg, then the initial body vertical position is determined such that the sum of the reciprocals of the sine function values of the knee bending angles θsup and θswg is a predetermined value (a finite value). Here, the knee bending angles θsup and θswg denote the angles of the axial centers of the cruses relative to the axial centers of the thighs of the legs 2, and increase from zero as the knees are bent from the state wherein the legs 2 are fully stretched. The technique for determining the vertical position of the body 24 is described in detail in the aforesaid Japanese Patent Application Laid-Open No. 10-86080, so that no further description will be given herein.

Supplementally, the robot 1 has 6 degrees of freedom per leg, so that once the initial states of the foot position/posture trajectory and the body position/posture trajectory (the positions/postures and the temporal change rates thereof) are given, the initial states of the motions of the body 24 and the legs 2, 2 of the robot 1 will be all uniquely determined. Accordingly, for example, if the overall mass of the body 24 and the legs 2, 2 substantially agrees with the overall mass of the robot 1, then once the initial states of the motions of the body 24 and the legs 2, 2 are given, the initial overall center-of-gravity vertical velocity will be uniquely determined.

Inversely, since each leg has 6 degrees of freedom, even if one state related to the velocity (e.g., the initial body vertical velocity) in the initial states of the foot position/posture trajectory and the body position/posture trajectory is unknown, the unknown initial state will be uniquely determined once the initial overall center-of-gravity vertical velocity is given.

After the processing in S206, the gait generator 100 proceeds to S208 to provisionally generate a gait as a candidate of a normal gait (a gait for one step (one cycle) of a normal gait). More specifically, based on the normal gait parameters determined in S022 of FIG. 10, the instantaneous values of the desired ZMP, the desired floor reaction force vertical component, the desired foot position/posture, the desired body posture and the desired arm posture at each instant from the starting time to the ending time are sequentially determined. Then, the body position is sequentially determined using the dynamic model (inverted pendulum model) illustrated in FIG. 9 such that the determined desired ZMP and the determined desired floor reaction force vertical component are satisfied, thus generating the gait from the starting time to the ending time of the normal gait. In this case, the aforesaid initial body horizontal position/velocity (Xs, Vxs) and the initial body vertical position/velocity (Zs, Vzs) are set as the initial states of the position and the velocity of the body 24.

The gait is generated only in the gait generator 100 and not output from the gait generator 100 as the desired value for driving the actual robot 1.

Figure 17:
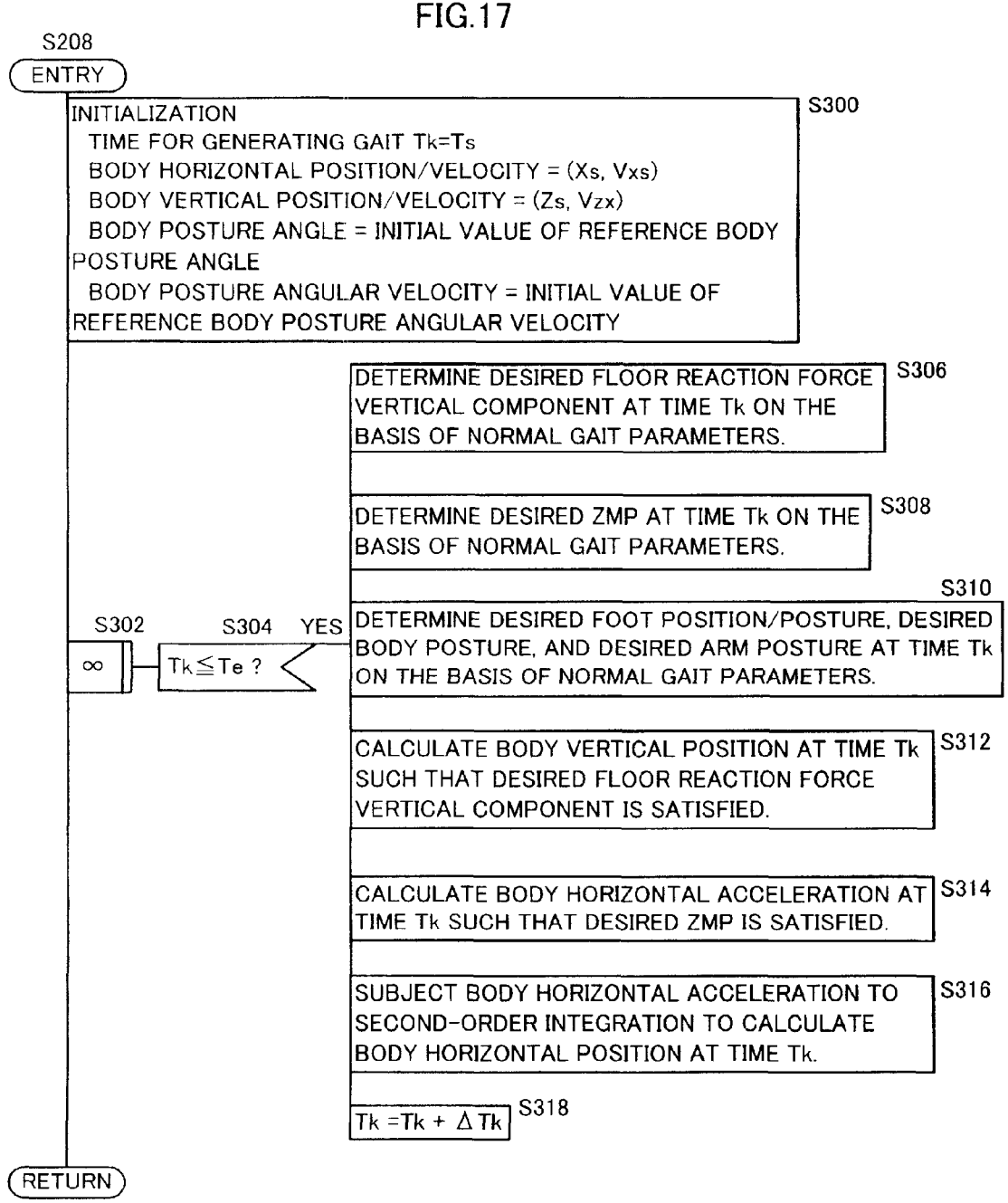
FIG. 17 is a flowchart illustrating the subroutine processing in S208 of FIG. 16.

To be more specifically, the processing in S208 is executed as illustrated by the flowchart of FIG. 17.

The gait generator 100 first carries out various types of initialization in S300. To be more specific, time Tk for generating a gait is initialized to starting time Ts of a normal gait. Further, a latest candidate value (the latest candidate value determined in S202 of FIG. 16 or S216 or S218, which will be discussed later) of the initial body horizontal position/velocity (Xs, Vxs) is substituted into the body horizontal position/velocity, and a latest value (the latest value determined in S206 of FIG. 16) of the initial body vertical position/velocity (Zs, Vzs) is substituted into the body vertical position/velocity. Further, the initial value of a reference body posture angle is substituted into the body posture angle and the initial value of a reference body posture angular velocity is substituted into the body posture angular velocity.

Subsequently, the gait generator 100 proceeds to S304 via S302 to determine whether the time Tk (the current value) for generating a gait is time before ending time Te (=Ts+Tcyc), i.e., whether Tk≦Te. If the determination result is affirmative, then the gait generator 100 carries out the processing of S306 to S316 (the details will be discussed later) so as to determine the instantaneous value of the gait at time Tk.

Subsequently, the gait generator 100 proceeds to S318 to increase the time Tk for generating, a gait by a predetermined notch time ΔTk and then carries out the determination in S304 again. Here, the notch time ΔTk may be set to agree with, for example, the control cycle Δt. However, in order to reduce the calculation volume, ΔTk may be set to be longer than Δt.

Figure 16:
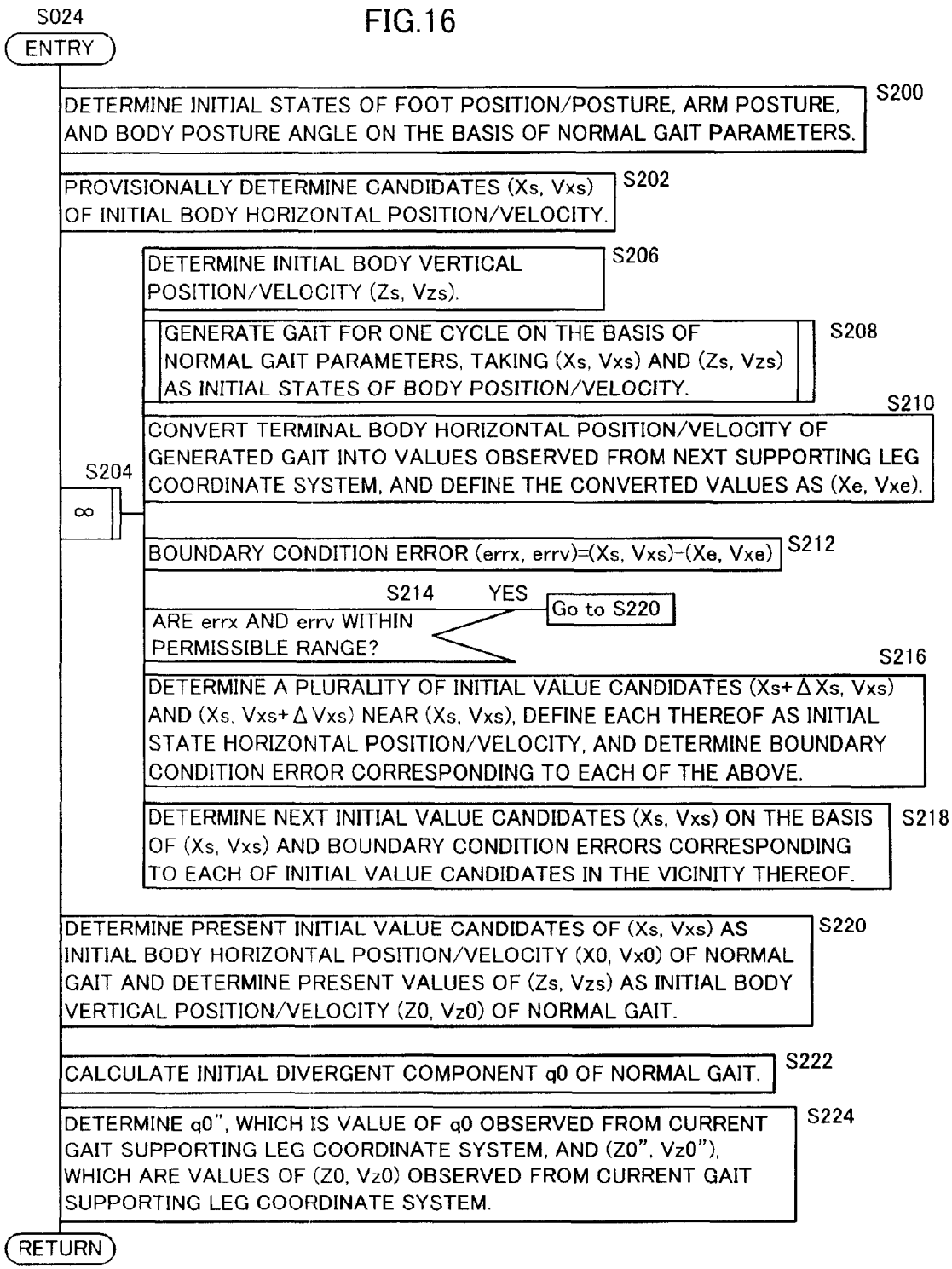
FIG. 16 is a flowchart illustrating the subroutine processing in S024 of FIG. 10.

If the determination result in S304 is affirmative, the processing from S306 to S318 is repeated. If the determination result in S304 is negative, then the processing in FIG. 17, that is, the processing in S208 of FIG. 16, is terminated. Thus, the generation of the normal gait (the provisional normal gait) for one cycle from the starting time to the ending time of the normal gait is completed.

The gait generator 100 carries out the processing for determining the instantaneous value of the provisional normal gait in the aforesaid S306 to S316 as described below. First, in S306, the gait generator 100 determines an instantaneous value of the desired floor reaction force vertical component trajectory shown in FIG. 14 at time Tk on the basis of the normal gait parameters (more specifically, the floor reaction force vertical component trajectory parameters).

Further, in S308, the gait generator 100 determines an instantaneous value of the desired ZMP trajectory shown in FIG. 15 at time Tk on the basis of the normal gait parameters (more specifically, the ZMP trajectory parameters).

Subsequently, the gait generator 100 proceeds to S308 to determine the instantaneous values of the desired foot position/posture (the desired foot positions/postures of both the supporting leg and the free leg), the desired body posture, and the desired arm posture, respectively, at time Tk on the basis of the normal gait parameters (more specifically, the foot trajectory parameter, the body posture trajectory parameter, and the arm posture trajectory parameter). Regarding the desired arm posture, however, more specifically, the overall center-of-gravity positions of both arms are determined, whereas the motions of the arms (arm swinging motions) attributable to changes in the amounts of angular motions about the vertical axis (or the body trunk axis of the body 24) are not yet determined.

Subsequently, the gait generator 100 proceeds to S310 to calculate the body vertical position at time Tk such that the desired floor reaction force vertical component determined in S306 is satisfied (the sum of the inertial force in the vertical direction of the overall center of gravity of the robot 1 and the gravitational force balances with the desired floor reaction force vertical component).

To be more specific, the kinetic relational expressions indicated by expression 15 and expression 16 given below (expressions obtained by discretizing Newton's dynamic equations in the vertical direction) are used to calculate the overall center-of-gravity vertical velocity and the overall center-of-gravity vertical position of the robot 1.

Overall center-of-gravity vertical velocity at time $Tk$=Overall center-of-gravity vertical velocity at time($Tk$-$\Delta Tk$)-(Floor reaction force vertical component/Overall mass of the robot at time $Tk$)+ Gravitational acceleration)*$\Delta Tk$(where the gravitational acceleration takes a negative value)   Expression 15

Overall center-of-gravity vertical position at time $Tk$=Overall center-of-gravity vertical position at time($Tk$-$\Delta Tk$)+Overall center-of-gravity vertical velocity at time $Tk$*$\Delta Tk$   Expression 16

Then, in the present embodiment, the gait generator 100 determines the body vertical position by using, for example, the aforesaid 3-mass-point model (the 3-mass-point model described in relation to the processing in S206) on the basis of the overall center-of-gravity vertical position, the desired foot position/posture, and the reference body posture (the desired body posture) at time Tk calculated as described above. In this case, the positions of two leg mass points in the 3-mass-point model are determined on the basis of the desired foot position/posture. Further, the vertical position of the body mass point at which the vertical position of the overall center of gravity in the 3-mass-point model agrees with the overall center-of-gravity vertical position at time Tk obtained as described above is determined. Then, the body vertical position is determined on the basis of the vertical position of the body mass point and the desired body posture (the reference body posture).

A multi-mass-point model having more mass points (e.g., a model having a mass point in each link of the robot 1) may be used to determine the body vertical position more accurately. If the mass of a portion excluding the body 24 is sufficiently smaller than the body 24, then the overall center-of-gravity vertical position may be considered, in a simplified manner, to agree with the vertical position of the center of gravity of the body 24, and the body vertical position may be determined from the overall center-of-gravity vertical position and the desired body posture (reference body posture).

Subsequently, the gait generator 100 proceeds to S314 to determine the body horizontal acceleration (the acceleration of the body 24 in the horizontal direction) at time Tk such that the desired ZMP is satisfied (such that the dynamic balance condition that the horizontal component of a moment generated about the desired ZMP by the resultant force of the inertial force of the robot 1 and the gravitational force is zero is satisfied).

At this point, the instantaneous values (the values at current time Tk) of the foot position/posture, the arm postures, the body posture, and the body vertical position of the normal gait (provisional normal gait) have been determined, so that determining the remaining body horizontal position will determine the desired motion of the entire robot 1, excluding the motional degrees of freedom of the arms that cause changes in the amount of the angular motions about the vertical axis. Hence, once the body horizontal position is determined, all floor reaction forces except for a moment of the floor reaction force about the vertical axis will be uniquely determined.

In the present embodiment, the desired floor reaction force vertical component and the desired ZMP of the normal gait (provisional normal gait) are defined by the floor reaction force vertical component trajectory parameters and the desired ZMP trajectory parameters, respectively, of the normal gait parameters determined in S022 of FIG. 10. Therefore, the floor reaction force dependently determined according to a determined body horizontal position is only the floor reaction force horizontal component.

Supplementally, in the robot 1 according to the present embodiment, the degree of freedom of each leg 2 is six, so that determining the desired foot position/posture and the desired body position/posture will uniquely determine the position/posture of each portion of each leg 2. The arm motional degree of freedom causing a change in the amount of the angular motion about the vertical axis is used to cancel a spinning force, which will be described hereinafter.

In S314, the body horizontal acceleration is determined by using, for example, the aforesaid expression 04 related to the dynamic model (the inverted pendulum model) in FIG. 9. To be more specific, the vertical position and the horizontal position of the body mass point 24*b* at current time Tk are determined from the body vertical position at current time Tk, the body horizontal position at time (Tk−ΔTk), and the desired body posture at current time Tk. Alternatively, the body horizontal position at the time Tk may be estimated in an interpolation manner on the basis of the time series of the body horizontal position up to the time (Tk−ΔTk) or the gait state at the time (Tk−ΔTk), and the estimated body horizontal position may be used in place of the body horizontal position at the time (Tk−ΔTk).

Further, the value obtained by subtracting the gravitational force (=mb*g) acting on the body mass point 24*b* from the floor reaction force vertical component at current time Tk is divided by a mass mb of the body mass point 24*b* to determine the vertical acceleration of the body mass point 24*b* at current time Tk.

Then, the vertical position, the horizontal position, and the vertical acceleration of the body mass point 24*b*, which have been determined as described above, are substituted into zb, Xb, and d2Zb/dt2, respectively, of the aforesaid expression 04, and the horizontal position and the vertical position of the desired ZMP at current time Tk are substituted into Xzmp and Zzmp, respectively, of expression 04. Further, an expression with Mzmp_y of the expression 04 set to zero is solved on d2Xb/dt2, thereby calculating the body mass point horizontal acceleration d2Xb/dt2 at current time Tk. Then, the body mass point horizontal acceleration d2Xb/dt2 is determined as the body horizontal acceleration at current time k.

Alternatively, a more precise dynamic model may be used to exploratorily determine the body horizontal acceleration that zeros the horizontal component of a floor reaction force moment about the desired ZMP.

Subsequently, the gait generator 100 proceeds to S316 to subject the body horizontal acceleration determined in S314 to the second-order integration so as to calculate the body horizontal position at current time Tk. To be more specific, a value obtained by multiplying the body horizontal acceleration by notch time ΔTk is added to the body horizontal velocity at time Tk−ΔTk so as to determine the body horizontal velocity at current time Tk. Further, a value obtained by multiplying the body horizontal velocity by the notch time ΔTk is added to the body horizontal position at the time Tk−ΔTk so is to determine the body horizontal position at current time Tk.

This completes the detailed description of the processing for generating gaits carried out in S306 to S316.

After completing the processing in S208 of FIG. 16, the gait generator 100 proceeds to S210 to convert the terminal body horizontal position/velocity of the generated gait (provisional normal gait) into values observed from the supporting leg coordinate system corresponding to the supporting leg at that instant (the supporting leg coordinate system having the X''' axis and the Y''' axis in FIG. 13 as the two axes in the horizontal direction) and defines the values as (Xe, Vxe) (Xe: Terminal body horizontal position Vxe: Terminal body horizontal velocity).

Subsequently, the gait generator 100 proceeds to S212 to calculate the difference between the initial body horizontal position/velocity (Xs, Vxs) and the terminal body horizontal position/velocity (Xe, Vxe), as illustrated. The difference (Xs−Xe, Vxs−Vxe) is referred to as the body horizontal position/velocity boundary condition error (errx, errv). The normal gait is a gait that satisfies the boundary condition, so that (Xs, Vxs) and (Xe, Vxe) must agree with each other. Hence, the body horizontal position/velocity boundary condition error (errx, errv) has to be zero or substantially zero. In the present embodiment, (Xs, Vxs) at which the body horizontal position/velocity boundary condition error (errx, errv) becomes substantially zero is exploratorily determined, as described below.

Subsequently, the gait generator 100 proceeds to S214 to determine whether the body horizontal position/velocity boundary condition error (errx, errv) falls within a permissible range appropriately set beforehand (whether both errx and errv fall within the permissible range).

If the determination result in S214 is negative, then the gait generator 100 proceeds to S216. In this S216, a plurality of (two in the present embodiment) initial value candidates (Xs+ΔXs, Vxs). (Xs, Vxs+ΔVxs) is determined in the vicinity of (Xs, Vxs). Here. ΔXs and ΔVxs mean predetermined minute change amounts relative to Xs and Vxs, respectively. Then, taking these initial value candidates as the initial states of the body horizontal position/velocity, the same processing as that in S208 described above is carried out to generate a normal gait (provisional normal gait) by using gait parameters. Further, the terminal body position/velocity of the generated normal gait are converted into values (Xe+ΔXe1, Vxe+ΔVxe1), (Xe+ΔXe2, Vxe+ΔVxe2), which are observed from the supporting leg coordinate system corresponding to the supporting leg at that instant (the supporting leg coordinate system having the X''' axis and the Y''' axis in FIG. 13 as the two axes in the horizontal direction). Here, (Xe+ΔXe1, Vxe+ΔVxe1) means the terminal body position/velocity corresponding to (Xs+ΔXs, Vxs), and (Xe+ΔXe2, Vxe+ΔVxe2) means the terminal body position/velocity corresponding to (Xs, Vxs+ΔVxs). In the processing for generating the normal gait (provisional normal gait) in this case, the initial states of the state amounts except for the body horizontal position/velocity may be set to be the same as the case where, for example, the initial value candidates of the body horizontal position/velocity are (Xs, Vxs). Further in S216, the same processing as that in the aforesaid S210 is carried out to determine the difference between each initial value candidate and its corresponding terminal body position/velocity, that is, the body horizontal position/velocity boundary condition errors corresponding to the initial value candidates (Xs+ΔXs, Vxs) and (Xs, Vxs+ΔVxs), respectively.

Subsequently, the gait generator 100 proceeds to S218 to determine the next initial value candidates of (Xs, Vxs) are determined by an exploratory method on the basis of the body horizontal position/velocity boundary condition errors relative to (Xs, Vxs) and the initial value candidates (Xs+ΔXs, Vxs) and (Xs, Vxs+ΔVxs) in the vicinity thereof. As the exploratory technique, a method in which a pseudo Jacobian (sensitivity matrix) is determined and a next candidate is determined by a steepest descent method or the like, or a simplex method may be used. For example, a sensitivity matrix is determined. The sensitivity matrix indicates the degree of change in the body horizontal position/velocity boundary condition error observed when the body horizontal position and the body horizontal velocity are changed from their initial value candidates (Xs, Vxs) by minute amounts on the basis of the body horizontal position/velocity boundary condition errors relative to (Xs, Vxs) and the initial value candidates (Xs+ΔXs, Vxs) and (Xs, Vxs+ΔVxs) in the vicinity thereof. Then, based on the sensitivity matrix, initial value candidates (Xs, Vxs) that reduce the body horizontal position/velocity boundary condition errors are newly determined. After determining the new initial value candidates (Xs, Vxs) of the body horizontal position/velocity as described above, the gait generator 100 returns to S206.

As long as the determination result given in S214 is negative, the gait generator 100 repeats the processing of S206 through S218. If the determination result in S214 turns to be affirmative, then the gait generator 100 leaves the repetition loop (S204) and proceeds to S220. In this case, the provisional normal gait generated immediately before the gait generator 100 leaves the repetition loop of S204 will be obtained as the normal gait that satisfies the boundary condition.

In S220, the initial value candidates of the initial body horizontal position/velocity (Xs, Vxs) and the initial body vertical position/velocity (Zs, Vzs) in the provisional normal gait lastly generated in S208 of the repetition loop of S204 are determined as the initial body horizontal position/velocity (X0, Vx0) and the initial body vertical position/velocity (Z0, Vz0), respectively, of the normal gait to be determined.

Subsequently, the gait generator 100 proceeds to S222 to calculate the normal gait initial divergent component (the value of the divergent component at the starting time Ts of a normal gait) q0.

Here, in the present embodiment, the value of the divergent component of a gait is defined as described below. In S222, the normal gait initial divergent component q0 is calculated according to the definition.

First, when the aforesaid expression 03 indicating the relationship between the motion of the body mass point 24b in the inverted pendulum model in FIG. 9 and a floor reaction force moment (the floor reaction force moment about the origin of the supporting leg coordinate system) is represented by a state equation, the following expression 100 is derived. Here, it is assumed that the relative change amount (the divergence in height of the body 24) of the height (the vertical position) of the body 24 with respect to a mean height when the robot 1 travels is sufficiently small, so that Zb of the second term of the right side of expression 03 agrees with a fixed value h, which is set beforehand as the mean height of the body mass point 24b. Here, a floor reaction force moment Mb_y of the aforesaid expression 03 is denoted by Min as an input moment to the inverted pendulum.

$$\frac{d}{dt}XVb = \begin{bmatrix} 0 & 1 \\ \frac{(g+d2Zb/dt2)}{h} & 0 \end{bmatrix} * XVb + \begin{bmatrix} 0 \\ \frac{1}{h*mb} \end{bmatrix} * \text{Min}$$  Expression 100 where $$XVb \equiv \begin{bmatrix} Xb \\ Vxb \end{bmatrix}, \quad Vxb \equiv dXb/dt$$

Rewriting the expression 100 to an expression based on a discrete-time system provides the state equation of expression 102 given below.

$$XVb(k+1)=A(k)*XVb(k)+B(k)*\text{Min}(k)$$  Expression 102

The variables followed by suffixes (k) and (k+1) mean the value at the k-th time and the value at the k+1-th time, respectively, in the discrete-time system. In the following description, the k-th time and the k+1-th time may be denoted simply by time k and time k+1 respectively, in some cases.

As defined in the note related to expression 100, XVb in expression 102 denotes a state variable vector (longitudinal vector) taking the horizontal position Xb of the body mass point 24b and the horizontal velocity Vxb, which is the temporal change rate thereof, as the state variables.

Further, A(k) and B(k) in expression 102 denote a secondary square matrix (state transition matrix) and a secondary longitudinal vector, respectively, and the component values thereof are determined as indicated by the following expressions 104a to 104c and 106a to 106c. A symbol ΔT denotes a notch time of the discrete-time system, and ω0 denotes the angular frequency value defined by expression 108 of the following note. Further, exp( ) denotes an exponential function of the base of a natural logarithm.

In the case where $g + d2Zb/dt2 > 0$ $$A(k) = \begin{bmatrix} \frac{\exp(\omega 0 * \Delta T) + \exp(-\omega 0 * \Delta T)}{2} & \frac{\exp(\omega 0 * \Delta T) - \exp(-\omega 0 * \Delta T)}{2*\omega 0} \\ \frac{\exp(\omega 0 * \Delta T) - \exp(-\omega 0 * \Delta T)}{2} * \omega 0 & \frac{\exp(\omega 0 * \Delta T) + \exp(-\omega 0 * \Delta T)}{2} \end{bmatrix}$$  Expression 104a $$B(k) = \begin{bmatrix} -1 + \frac{\exp(\omega 0 * \Delta T) + \exp(-\omega 0 * \Delta T)}{2} \\ \frac{\exp(\omega 0 * \Delta T) - \exp(-\omega 0 * \Delta T)}{2} * \omega 0 \end{bmatrix} * \frac{1}{\omega 0^2} * \frac{1}{h*mb}$$  Expression 106a In the case where $g + d2Zb/dt2 = 0$ $$A(k) = \begin{bmatrix} 1 & \Delta T \\ 0 & 1 \end{bmatrix}$$  Expression 104b $$B(k) = \begin{bmatrix} \frac{(\Delta T)^2}{2} \\ \Delta T \end{bmatrix} * \frac{1}{h*mb}$$  Expression 106b In the case where $g + d2Zb/dt2 < 0$ $$A(k) = \begin{bmatrix} \cos(\omega 0 * \Delta T) & \frac{\sin(\omega 0 * \Delta T)}{\omega 0} \\ -\omega 0 * \sin(\omega 0 * \Delta T) & \cos(\omega 0 * \Delta T) \end{bmatrix}$$  Expression 104c $$B(k) = \begin{bmatrix} 1 + \cos(\omega 0 * \Delta T) \\ -\omega 0 * \sin(\omega 0 * \Delta T) \end{bmatrix} * \frac{1}{\omega 0^2} * \frac{1}{h*mb}$$  Expression 106c where $$\omega 0 \equiv \sqrt{\left| \frac{g + d2Zb/dt2}{h} \right|}$$  Expression 108

In this case, as is obvious from expressions 104a to 104c, 106a to 106c and expression 108, the component values of A(k) and B(k) are dependent upon the value or the vertical acceleration d2Zb/dt2 (the motional acceleration in the vertical direction d2Zb/dt2) of the body mass point 24b. Hence, the component values of A(k) and B(k) will be the values dependent upon the inertial force in the vertical direction of the body mass point 24b (=−mb*d2Zb/dt2), i.e., the function value of the inertial force. The gravitational force acting on the body mass point 24a has a fixed value. In other words, therefore, the component values of A(k) and B(k) are the function values of the resultant force of the inertial force of the body mass point 24b in the vertical direction and the gravitational force acting on the body mass point 24b or a floor reaction force vertical component balancing the resultant force.

Supplementally, if the mass mb of the body mass point 24b of the inverted pendulum agrees with the overall mass of the robot 1 as in the present embodiment, then the floor reaction force vertical component that balances the resultant force of the inertial force in the vertical direction of the body mass point 24b and the gravitational force acting on the body mass point 24b agrees with the floor reaction force vertical component (the translational floor reaction force vertical component of a total floor reaction force) acting on the robot 1.

Further, in the running gait illustrated in FIG. 6, g+d2Zb/dt2>0 holds in a one-leg supporting period, whereas g+d2Zb/dt2=0 holds in a floating period.

In a system represented by the state equation of expression 102 described above, if an initial value XVb(0) of the state variable vector XVb (the value of XVb at time at which k=0 (time 0)) and the time series of the input moment Min (the horizontal component Mb_y of the floor reaction force moment) from time 0 to time k−1 are given, then the value XVb(k) of the state variable vector XVb at arbitrary time k(>0) will be given by the following expression 110.

$$XVb(k) = \phi(k, 0) * XVb(0) + \sum_{i=0}^{k-1} \phi(k, i+1) * B(i) * \text{Min}(i) \quad \text{Expression 110}$$

where $$\phi(k, j) \equiv A(k-1) * A(k-2) * \ldots * A(j)$$

$$(j = 0, 1, \ldots, k)$$

Regarding $\phi(k,j)$ defined by the note in expression 110, if j=k, then $\phi(k,j)$=Identity matrix.

Attention will now be paid to the behavior of the inverted pendulum model in the normal gait described above. It is assumed that the initial time Ts of the normal gait is time k=0, the ending time Te of the normal gait (=Ts+Tcyc) is time k=kcyc (provided kcyc≡Tcyc/ΔT), and the state variable vector XVb defined by the motion of the normal gait at the starting time Ts is XVb(0). Further, in the state variable vector XVb at the ending time Te of the normal gait (time k=kcyc), the component dependent on the state variable vector value XVb(0) at the starting time Ts of the normal gait is denoted by XVb(kcyc). At this time, the relationship between XVb(kcyc) and XVb(0) will be represented by the following expression 112 on the basis of the above expression 110.

$$XVb(kcyc) = \phi(kcyc,0) * XVb(0) \quad \text{Expression 112}$$

where $\phi(kcyc,0) = A(kcyc-1) * \ldots * A(1) * A(0)$

Further, the two characteristic values of a matrix $\phi(kcyc,0)$ of the right side of expression 112 are denoted by $\lambda 1$ and $\lambda 2$, characteristic vectors (longitudinal vectors) corresponding to the respective characteristic values are denoted by $(a11, a21)^T$ and $(a12, a22)^T$, and a second-order square matrix having these characteristic vectors as a first row and a second row is denoted by Γcyc. A matrix obtained by diagonalizing $\phi(kcyc, 0)$ by using the matrix Γcyc is denoted by Λ. In other words, Λ is defined by expression 114 given below. Hereinafter, the matrix Γcyc will be referred to as the diagonalizing matrix.

$$\Lambda \equiv \Gamma_{cyc}^{-1} * \phi(k_{cyc}, 0) * \Gamma_{cyc} \text{ where} \quad \text{Expression 114}$$

$$\Lambda \equiv \begin{bmatrix} \lambda 1 & 0 \\ 0 & \lambda 2 \end{bmatrix}$$

$$\Gamma_{cyc} \equiv \begin{bmatrix} a11 & a12 \\ a21 & a22 \end{bmatrix}$$

$$\phi(k_{cyc}, 0) * \begin{bmatrix} a11 \\ a21 \end{bmatrix} = \lambda 1 * \begin{bmatrix} a11 \\ a21 \end{bmatrix}$$

$$\phi(k_{cyc}, 0) * \begin{bmatrix} a12 \\ a22 \end{bmatrix} = \lambda 2 * \begin{bmatrix} a12 \\ a22 \end{bmatrix}$$

The following expression 116 is derived from the expression 114 and the above expression 112.

$$\Gamma cyc^{-1} * XVb(kcyc) = \Lambda * \Gamma cyc^{-1} * XVb(0) \quad \text{Expression 116}$$

The matrix $\phi(kcyc,0)$ to be diagonalized by the diagonalizing matrix Γcyc denotes the product of the state transition matrixes A(0), A(1), . . . , A(kcyc−1) at each time (more specifically, at each time of notch time ΔT from time 0 to time kcyc−1) in a period from the starting time (time 0) to the ending time (time kcyc) of one cycle of a normal gait, as indicated by the note to the above expression 112. Hence, the matrix $\phi(kcyc,0)$ depends on the time series of the inertial force of the body mass point 24b in the period or one cycle of the normal gait. Hence, each component value of the diagonalizing matrix Γcyc accordingly also depends on the time series of the inertial force of body mass point 24b in the period of one cycle of the normal gait.

Here, a vector obtained by linearly converting a state variable vector XVb(k) at arbitrary time k by an inverse matrix Γcyc$^{-1}$ of the diagonalizing matrix Γcyc (hereinafter referred to as the converted state variable vector) is denoted by (p(k), q(k))$^T$. The converted state variable vector (p(k), q(k))$^T$ is defined by expression 118 given below.

$$(p(k), q(k))^T = \Gamma cyc^{-1} * XVb(k) \quad \text{Expression 118}$$

The following expression 120 is derived from the expression 118 and the above expression 116.

$$(p(kcyc), q(kcyc))^T = \Lambda * (p(0), q(0))^T \quad \text{Expression 120}$$

In this expression 120, if $\lambda 1 > 1$, then the absolute value of p(kcyc)>the absolute value of the initial value p(0), and if $\lambda 1 \leq 1$, then the absolute value of p(kcyc)≦the absolute value of the initial value p(0). Similarly, if $\lambda 2 > 1$, then the absolute value of q(kcyc)>the absolute value of the initial value q(0), and if $\lambda 2 \leq 1$, then the absolute value of q(kcyc)≦the absolute value or the initial value q(0).

Meanwhile, the normal gait in the present embodiment is a gait repeating the one-leg supporting period and the floating period alternately (the running gait in FIG. 6), so that it may be considered that a state in which g+d2Zb/dt2≦0 and a state in which g+d2Zb/dt2>0 are alternately set rather than the state in which g+d2Zb/dt2≦0 being always maintained. In such a normal gait, generally, one of the two characteristic values $\lambda 1$ and $\lambda 2$ of $\phi(kcyc,0)$ takes a value that is larger than 1, while the other takes a value that is smaller than 1.

Therefore, hereinafter, $\lambda 1 < 1$ and $\lambda 2 > 1$ applies. More specifically, the first component p(k) of the converted state variable vector (p(k), q(k))$^T$ denotes the component corresponding to the characteristic value $\lambda 1$ which is smaller than 1, and the second component q(k) thereof denotes the component corresponding to the characteristic value $\lambda 2$, which is larger than 1. At this time, p(k) has a meaning as the state amount of a motional component having convergent property in a normal gait infinitely repeated, while q(k) has a meaning as the state amount of a motional component having divergent property in the normal gait infinitely repeated.

Hence, in the present embodiment, the second component q(k) of the converted state variable vector $(p(k), q(k))^T$ defined by expression 118 is defined as the aforesaid divergent component. The divergent component q(k) thus defined takes a linearly coupled value of the state variables Xb(k) and Vxb(k). In this case, in the linear coupling, the weighting coefficients by which Xb(k) and Vxb(k) are multiplied are dependent on the time series of the inertial force of the body mass point 24b in the period of one cycle of the normal gait. The first component p(k) of the converted state variable vector $(p(k), q(k))^T$ defined by expression 118 is referred to as the convergent component.

The convergent component p(k) and the divergent component q(k) defined by the above expression 118 are the convergent component p(k) and the divergent component q(k), respectively, on a sagittal plane (the convergent component and the divergent component corresponding to the state variable vector XVb having, as its components, the horizontal position Xb and the horizontal velocity Vxb of the body mass point 24b in the X-axis direction). In the same manner, the convergent component and the divergent component on a lateral plane are defined.

To be more specific, the convergent component and the divergent component on the lateral plane are defined by an expression in which the components Xb and Vxb of the state variable vector XVb(k) of the right side of expression 118 have been replaced by the horizontal position and the horizontal velocity, respectively, of the body mass point 24b in the Y-axis direction. In this case, the matrix $\Gamma cyc^{-1}$ of expression 118 remains the same in both axial directions, namely, the X-axis direction and the Y-axis direction.

According to the definition of the divergent component q described above, the normal gait initial divergent component q0 is calculated in S222 as described below.

The gait generator 100 calculates the instantaneous value of the inertial force of the body mass point 24b at each time Tk for every notch time ΔT in the period of one cycle from the starting time Ts to the ending time Ts (each time k from time k=0 to time k=kcyc−1 in terms of the discrete-time system) of the normal gait on the basis of normal gait parameters. In this case, if the mass mb of the body mass point 24b of the inverted pendulum agrees with the overall mass of the robot 1, then the resultant force of the inertial force in the vertical direction of the body mass point 24b and the gravitational force acting on the body mass point 24b in the normal gait balances with a floor reaction force vertical component in the normal gait.

In the present embodiment, therefore, the gait generator 100 calculates the instantaneous value of the floor reaction force vertical component at each time in the period of one cycle of the normal gait on the basis of the aforesaid floor reaction force vertical component trajectory parameter of the normal gait parameters. The instantaneous value is the same as the value calculated in S306 of FIG. 17. Then, the gait generator 100 uses the value obtained by dividing each instantaneous value of the calculated floor reaction force vertical component by the mass mb of the body mass point 24b (=the overall mass of the robot 1) as the value of (g+d2Zb/dt2) of the above expression 100 to calculate the state transition matrix A(k)(k=0, 1, . . . , kcyc−1) according the above expressions 104a to 104c.

In the running gait illustrated in FIG. 6, the floor reaction force vertical component will not take any negative value. In actuality, therefore, A(k) will be calculated according to either expression 104a or 104b.

Supplementally, as an alternative, a multi-mass-point model (geometric model), such as the aforesaid 3-mass-point model, may be used to calculate the inertial force in the vertical direction (or the vertical acceleration) of the body 24 of the robot 1 in the normal gait, then the calculated inertial force (or the vertical acceleration) may be used as the inertial force (or the vertical acceleration) of the body mass point 24b to calculate the state transition matrix A(k) at each time (k=0, 1, . . . , kcyc−1). For example, the instantaneous value of the inertial force of the body mass point 24b in the normal gait may be calculated as described below by using the aforesaid 3-mass-point model.

The instantaneous value of the inertial force in the vertical direction of two leg mass points in the aforesaid 3-mass-point model is calculated on the basis of a foot trajectory parameter of a normal gait, and the instantaneous value of the inertial force in the vertical direction of the overall center of gravity of the robot 1 is calculated on the basis of a floor reaction force vertical component trajectory. Further, the value obtained by subtracting the instantaneous value of the inertial force in the vertical direction of the two leg mass points from the instantaneous value of the inertial force in the vertical direction of the overall center of gravity is calculated as the instantaneous value of the inertial force in the vertical direction of the body mass point 24b. In this case, the resultant force of the inertial force in the vertical direction of the body mass point 24b and the gravitational force acting on the body mass point 24b (or g+d2Zb/dt2) may take a negative value.

After calculating kcyc pieces of A(k)(k=0, . . . , kcyc−1) in the period of one cycle from the starting time Ts to the ending time Ts of the normal gait as described above, the gait generator 100 multiplies the values of A(k) to calculate the matrix φ(kcyc,0)(=A(kcyc−1)* . . . *A(1)*A(0)) of the right side of expression 112.

Further, the gait generator 100 calculates the characteristic values λ1 and λ2 of the matrix φ(kcyc,0) and the characteristic vectors $(a11, a21)^T$ and $(a12, a22)^T$ corresponding thereto, and determines, from the characteristic vectors, the aforesaid diagonalizing matrix Γcyc according to the note to the above expression 114. Then, the gait generator 100 calculates the inverse matrix $\Gamma cyc^{-1}$ of the diagonalizing matrix Γcyc.

Further, the gait generator 100 determines the initial body mass point position/velocity, which is the pair of the horizontal position and horizontal velocity of the body mass point 24b of the inverted pendulum at the starting time Ts of the normal gait, from the initial body horizontal position/velocity (X0, Vx0) of the normal gait determined in S220 and the initial state of the body posture angle of the normal gait.

Then, the gait generator 100 calculates the normal gait initial divergent component q0 according to the above expression 118 from the inverse matrix $\Gamma cyc^{-1}$ determined as described above and the initial body mass point horizontal position/velocity. To be more specific, a component in the X-axis direction (a state amount vector in the X-axis direction) and a component in the Y-axis direction (a state amount vector in the Y-axis direction) of the initial body mass point horizontal position/velocity are respectively multiplied by $\Gamma^{-1}$ to calculate the initial divergent component q0 in each of the X-axis direction and the Y-axis direction.

After calculating the initial divergent component q0 of the normal gait as described above, the gait generator 100 proceeds to S224 to convert the initial divergent component q0 of the normal gait into a value observed from a current time's gait supporting leg coordinate system, determining the converted value as q0". Further, the gait generator 100 converts the initial body vertical position/velocity (Z0, Vz0) into values observed from the current time's gait supporting leg coordinate system, determining the converted values as (Z0", Vz0").

Supplementally, the (Z0", Vz0") agree with the body vertical position/velocity at the end of a second turning gait observed from the supporting leg coordinate system the supporting leg coordinate system having the X"-axis and the Y"-axis as two axes on the horizontal plane in FIG. 13) of the second turning gait. Further, q0" also agrees with the divergent component at the end of the second turning gait observed from the supporting leg coordinate system of the second turning gait. Hence, these properties may be used to calculate (Z0", Vz0") and q0".

This completes the processing in S024 of FIG. 10, namely, the subroutine processing for determining the initial state of the normal gait.

Figure 18:
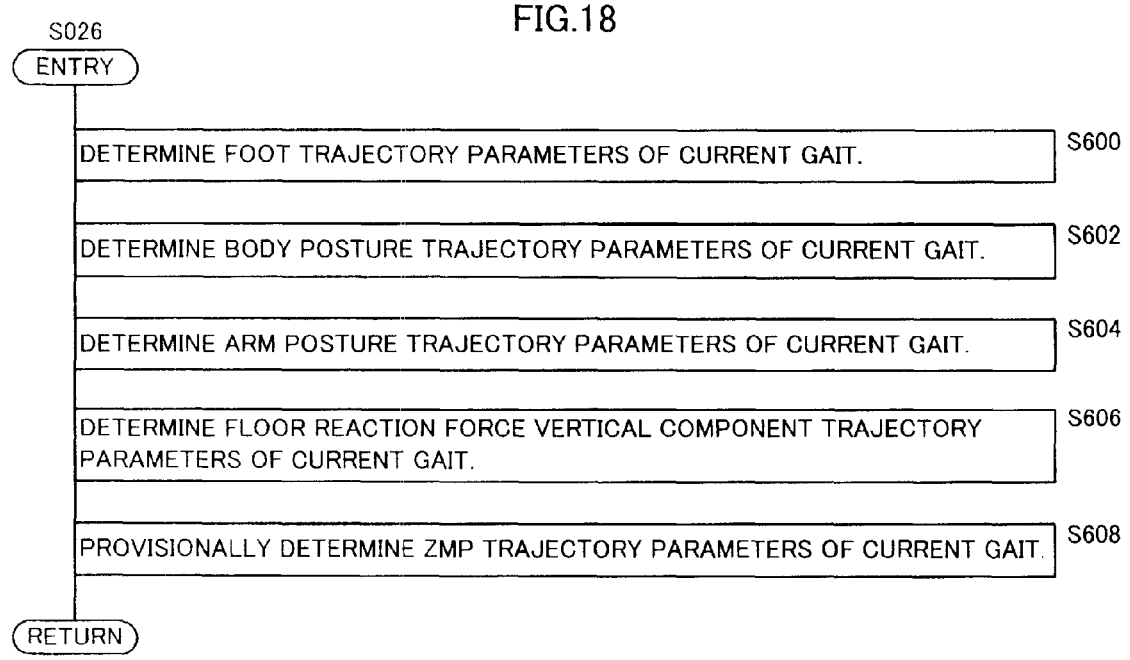
FIG. 18 is a flowchart illustrating the subroutine processing in S026 of FIG. 10.

Subsequently, the gait generator 100 proceeds to S026 of FIG. 10 to determine the gait parameters (some being provisionally determined) of the current time gait. More specifically, in S026, the processing illustrated by the flowchart of FIG. 18 is carried out.

First, in S600, the gait generator 100 determines the foot trajectory parameter of the current time gait such that the foot position/posture trajectory of a current time gait connects to the foot position/posture trajectory of a normal gait.

To be more specific, the initial free leg foot position/posture of the current time gait (the free leg foot position/posture at the start of the current time gait) is set to the supporting leg foot position/posture at the end of the last time gait observed from the current time's gait supporting leg coordinate system (the present free leg foot position/posture).

The initial supporting leg foot position/posture of the current time gait (the supporting leg foot position/posture at the start of the current time gait) is set to the free leg foot position/posture at the end of the last time gait observed from the current time's gait supporting leg coordinate system (the present supporting leg foot position/posture).

Further, the free leg foot position/posture at the end of the current time gait are determined according to a next time gait's supporting leg coordinate system observed from the current time's gait supporting leg coordinate system (the required values of the expected landing position/posture of the free leg foot 22 of a first step related to the current time gait). More specifically, the free leg foot position/posture at the end of the current time gait are determined such that the representative point of the free leg foot 22 agrees with the origin of the next time gait's supporting leg coordinate system observed from the current time's gait supporting leg coordinate system when the foot 22 has been rotated from the free leg foot position/posture at the end of the current time gait by a predetermined angle in the pitch direction without a slippage until substantially the entire bottom surface of the foot 22 comes in contact with the ground while holding the foot 22 in contact with a floor.

At the end of the current time gait, the supporting leg foot 22 is off the floor and in the air. To determine the trajectory after the supporting leg foot 22 leaves the floor, first, the position/posture of the supporting leg foot 22 of the current time gait at the end of the next gait, that is, the free leg foot position/posture at the end of the next gait are determined. The free leg foot position/posture at the end of the next gait are determined according to the next but one time's gait supporting leg coordinate system observed from the current time's gait supporting leg coordinate system (the required values of the expected landing position/posture of the free leg foot 22 of the second step related to the current time gait).

To be more specific, the free leg foot position/posture at the end of the next gait are determined such that the representative point of the foot 22 agrees with the origin of the next but one time's gait supporting leg coordinate system observed from the current time's gait supporting leg coordinate system when the foot 22 has been rotated from the foot position/posture by a predetermined angle in the pitch direction without a slippage until substantially the entire bottom surface of the foot 22 comes in contact with the ground while holding the foot 22 in contact with a floor.

Then, the supporting, leg foot position/posture at the end of the current time gait are determined by generating the foot position/posture trajectory from the supporting leg foot position/posture at the start of the current time gait determined as described above to the free leg foot position/posture at the end of the next gait by the aforesaid finite-duration setting filter up to the end of the current time gait.

Subsequently, the gait generator 100 proceeds to S602 to determine the body posture trajectory parameters of the current time gait. The body posture trajectory parameters are determined such that the body posture trajectory defined thereby continuously connects to the body posture trajectory of a normal gait (such that the body posture angle and the angular velocity at the end of the current time gait agree with the body posture angle and the angular velocity, respectively, at the start of the normal gait). In this case, according to the present embodiment, the body posture defined by the body posture trajectory parameters of the current time gait is set to the aforesaid reference body posture, which is steadily a fixed posture (the posture in which the body trunk axis of the body 24 is oriented in the vertical direction), as with the body posture of the normal gait.

the body posture trajectory of the current time gait is set to continuously connect to the body posture trajectory of the normal gait, then the body posture trajectory may be set to temporally change from the start to the end of the current time gait.

Subsequently, the gait generator 100 proceeds to S604 to determine the arm posture trajectory parameters of the current time gait. The arm posture trajectory parameters are determined in the same manner as that for the arm posture trajectory parameters of a normal gait such that the arm posture trajectory of the current time gait uninterruptedly continues to the arm posture trajectory of the normal gait.

As with the arm posture trajectory parameters of the normal gait, the arm posture trajectory parameters of the current time gait determined here are parameters (e.g., the parameters defining the relative height of the hand distal end of an arm in relation to the body 24 and the relative center-of-gravity position of the entire arm) other than those related to the angular momentum changes of both arms about the vertical axis (or the body trunk axis of the body 24).

Subsequently, the gait generator 100 proceeds to S606 to determine the floor reaction force vertical component trajectory parameters of the current time gait such that the floor reaction force vertical component trajectory defined thereby becomes a virtually continuous trajectory, as illustrated in FIG. 7. However, the floor reaction force vertical component trajectory parameters of the current time gait are determined such that both the overall center-of-gravity vertical position/velocity of the robot 1 and the floor reaction force vertical component trajectory of the current time gait continuously connect to the aforesaid normal gait.

To be more specific, first, the initial overall center-of-gravity vertical position/velocity of the normal gait observed from the current time's gait supporting leg coordinate system are determined mainly on the basis of the values (Z0", Vz0")

obtained by converting the initial body vertical position/velocity of the normal gait lastly determined by the processing in S024 of FIG. 10 (the processing for determining the initial state of the normal gait) into the values observed from the current time's gait supporting leg coordinate system, i.e., (Z0", Vz0") determined in S224 of FIG. 16.

For example, the initial overall center-of-gravity vertical position/velocity of the normal gait are determined using the aforesaid 3-mass-point model (the 3-mass-point model described in relation to the processing in S206). In this case, the positions and velocities of two leg mass points in the 3-mass-point model are determined on the basis of the desired foot position/posture and the temporal change rate (changing velocity) thereof at the start of the normal gait observed from the current time's gait supporting leg coordinate system. Further, the position/velocity of the body mass point in the 3-mass-point model are determined from the aforesaid (Z0", Vz0") and the body posture angle (=reference body posture angle) at the start of the normal gait and the temporal change rate thereof. Then, based on the positions and the velocities of these three mass points, the center-of-gravity positions and velocities of the three mass points are calculated as the initial overall center-of-gravity vertical position/velocity of the normal gait.

A multi-mass-point model having more mass points (e.g., a geometric model having a mass point in each link of the robot 1) may be used to determine the initial overall center-of-gravity vertical position/velocity of the normal gait more accurately. If the mass of a portion excluding the body 24 is sufficiently smaller than the body 24, then the initial overall center-of-gravity vertical position/velocity of the normal gait may be determined from the aforesaid (Z0", Vz0") and the body posture angle at the start of the normal gait (=reference body posture angle) and the temporal change rate thereof.

The initial overall center-of-gravity vertical position/velocity of the normal gait determined as described above are substituted into the terminal overall center-of-gravity vertical position/velocity of the above expression 13 and the following expression 41, and the overall center-of-gravity vertical position and velocity of the instantaneous values of the last time gait (more specifically, the values indicating the terminal state of the last time gait observed from the current time's gait supporting leg coordinate system) are substituted into the initial overall center-of-gravity vertical position and velocity of the above expression 13 and the following expression 41, thereby determining the floor reaction force vertical component trajectory parameters of the current time gait such that the relationship between expression 13 and expression 41 is satisfied. The integral values in expression 13 and expression 41 are to be the integral values obtained during the period from the start to the end of the current time gait.

Terminal overall center-of-gravity vertical velocity−
Initial overall center-of-gravity vertical
velocity=First-order integration of(Floor reaction
force vertical component/Mass of the robot)+
First-order integration of gravitational accelera-
tion                                                        Expression 41

(where the gravitational acceleration takes a negative value)

More specifically, first, at least two parameters of the floor reaction force vertical component trajectory parameters (e.g., the time of breakpoints) defining the floor reaction force vertical component trajectory illustrated in FIG. 7 are defined as independent unknown variables, and the values of the unknown variables are determined by solving the simultaneous equation formed of expression 13 and expression 41.

As the floor reaction force vertical component trajectory parameters defined as the unknown variables, for example, the height of the trapezoid (the peak value of the floor reaction force vertical component) and the width (the duration of the one-leg supporting period) in the floor reaction force vertical component trajectory illustrated in FIG. 7 may be selected. In this case, the slopes on both sides of the trapezoid in FIG. 7 will take values determined on the basis of a current gait cycle or the like, or values of time of breakpoints of the floor reaction force vertical component trajectory except for the time at which a one-leg supporting period is switched to a floating period, the values being determined on the basis of a current gait cycle and the like. Supplementally, if only one unknown variable is selected, then there will be generally no solution that satisfies the simultaneous equation of expression 13 and expression 41.

Supplementally, in the present embodiment, the floor reaction force vertical component trajectory parameters of the current time gait determined as described above correspond to the up-and-down-direction inertial force parameters in the present invention. Hence, the processing in S606 implements the means for determining the up-and-down-direction inertial force parameters in the present invention.

Subsequently, the gait generator 100 proceeds to S608 to determine the ZMP trajectory parameters (e.g., the time and positions of breakpoints of a ZMP trajectory) defining the ZMP trajectory such that the ZMP trajectory of the current time gait will have a high stability allowance and develop no sudden change. For example, the ZMP trajectory parameters are provisionally determined such that the ZMP trajectory has the pattern as illustrated in FIG. 8. The ZMP trajectory parameters of the current time gait are provisionally determined such that the ZMP trajectory of the current time gait will uniterruptedly connect to the ZMP trajectory of the aforesaid normal gait (such that the position of the ZMP at the end of the current time gait agrees with the position of the ZMP at the start of the normal gait).

In this case, in a running gait, the time and positions of breakpoints of the ZMP trajectory in a one-leg supporting period may be set in the same manner as that for setting the ZMP trajectory parameters of the normal gait described above. Further, the ZMP trajectory parameters may be set such that the desired ZMP trajectory in the floating period linearly and continuously changes from the start of a floating period to the position of the ZMP at the start of the normal gait.

The ZMP trajectory parameters of the current time gait determined in S608 are provisionally determined parameters and are to be therefore corrected as will be described later. Thereafter, the desired ZMP of the current time gait defined by the provisionally determined ZMP trajectory parameters until the correction is completed will be hereinafter referred to as the provisional desired ZMP. The gait parameters of the current time gait that include the provisionally determined ZMP trajectory parameters are referred to as the provisional current time gait parameters.

Referring back to the description with reference to FIG. 10, after carrying out the processing in S026 as described above, the gait generator 100 carries out the processing for correcting the gait parameters (specifically, the ZMP trajectory parameters) of the current time gait in S028. In this processing, the ZMP trajectory parameters of the gait parameters for causing the body position/posture trajectory of the current time gait to continue or approach to the normal gait are corrected.

Figure 19:
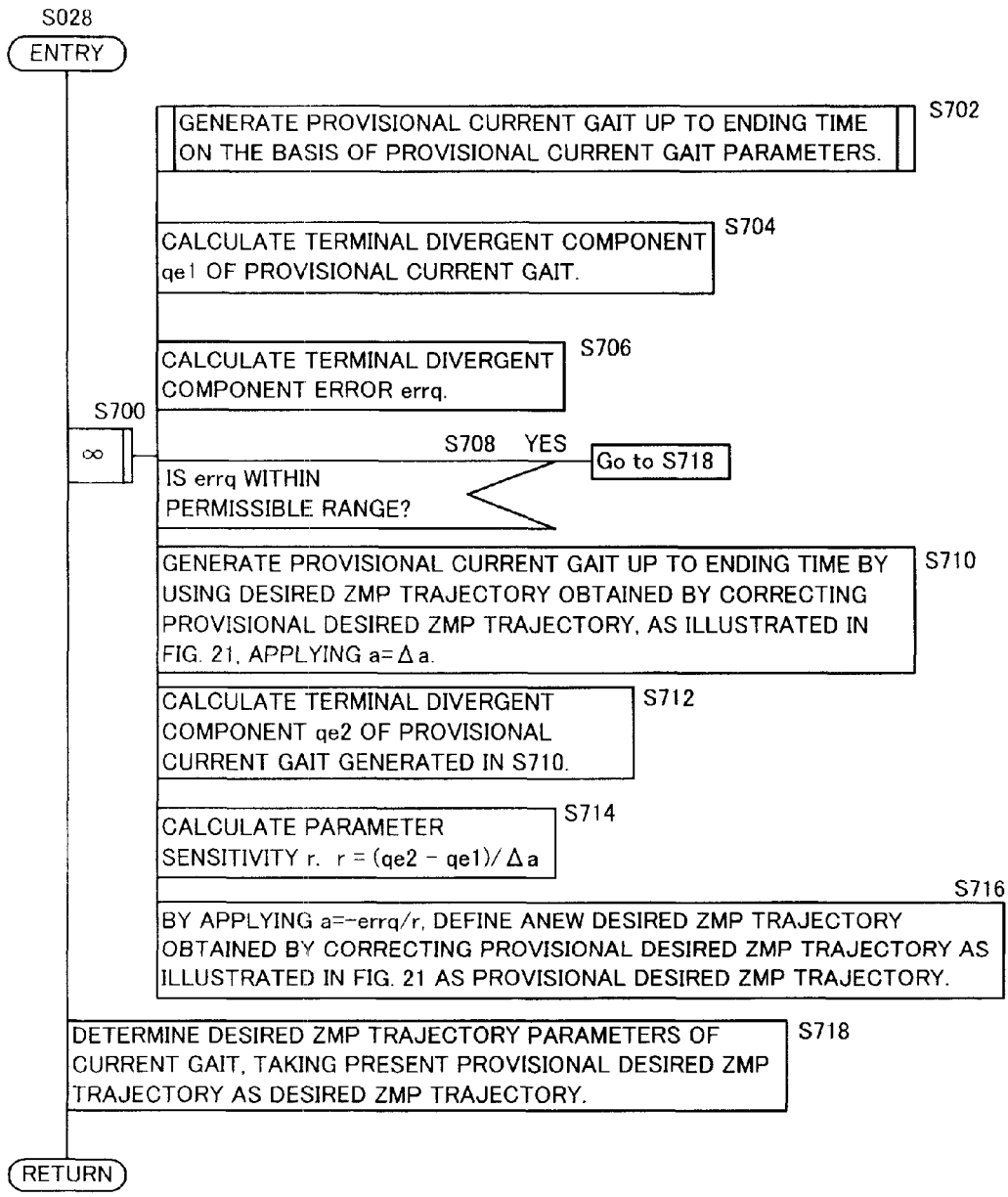
FIG. 19 is a flowchart illustrating the subroutine processing in S028 of FIG. 10.

This processing is carried out as illustrated by the flowchart of FIG. 19.

First, the gait generator 100 proceeds to S702 via S700 and generates a provisional current time gait until the ending time of the current time gait on the basis of the provisional current time gait parameters including the provisionally determined ZMP trajectory parameters.

Figure 20:
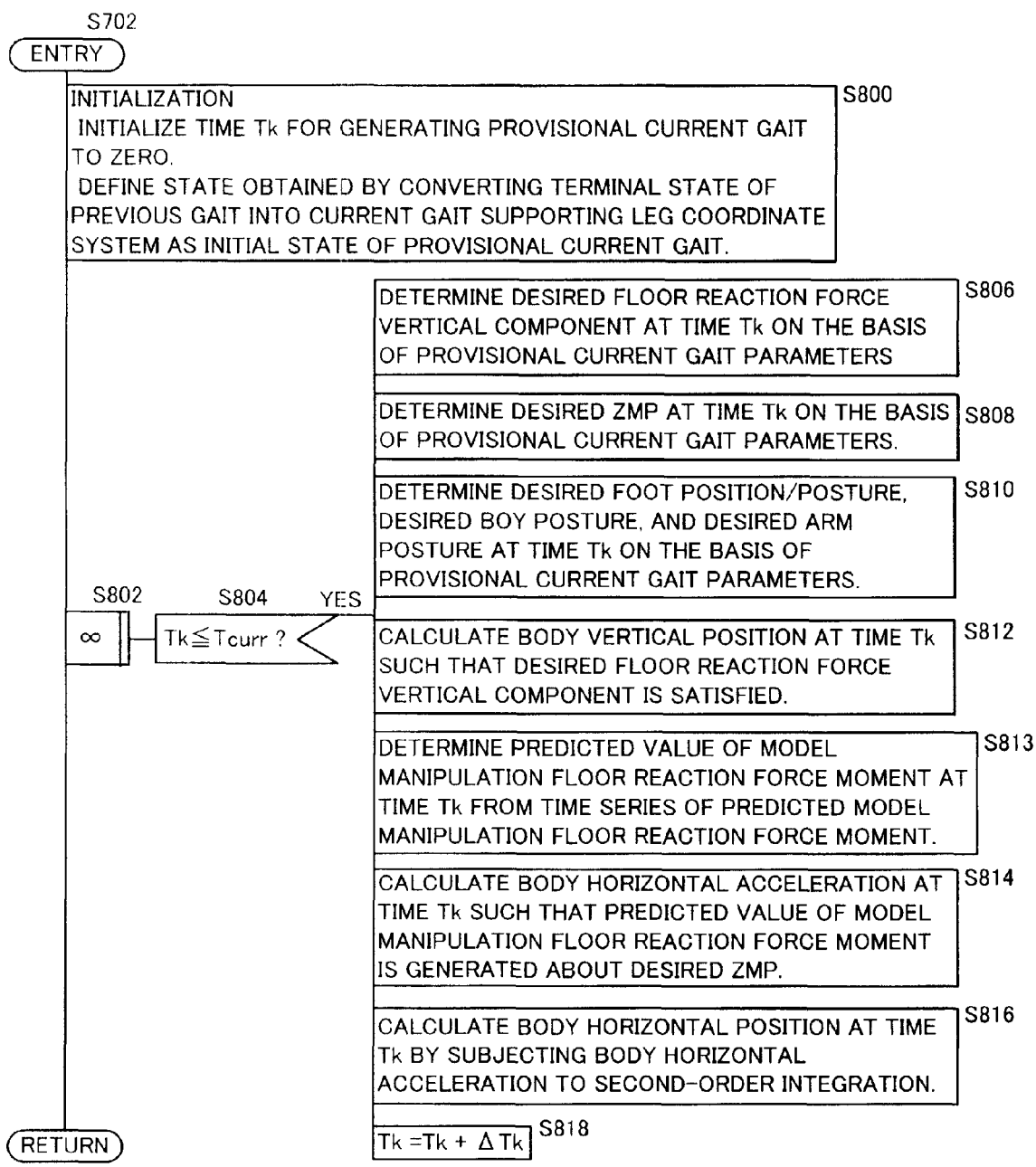
FIG. 20 is a flowchart illustrating the subroutine processing in S702 of FIG. 19.

In S702, the processing illustrated by the flowchart of FIG. 20 is carried out.

First, in S800, the gait generator 100 carries out various types of initializations. To be more specific, the time Tk for generating a provisional current time gait is initialized to zero. Further, the state at the end of the last time gait (more specifically, the desired body position and the desired body velocity, the desired body posture angle and the angular velocity thereof, the desired foot position/posture, the desired arm posture, and the like at the ending time of the last time gait) converted into a current time's gait supporting leg coordinate system is set as the initial state of the provisional current time gait.

Subsequently, the gait generator 100 proceeds to S804 via S802 to determine whether time Tk (current value) for generating the provisional current time gait is time before ending time of a current time gait Tcurr (whether TK≦Tcurr applies). If the determination result is affirmative, then the gait generator 100 carries out the processing of S806 to S816 (the details thereof will be discussed later) thereby to determine the instantaneous value or the at time Tk.

Subsequently, the gait generator 100 proceeds to S818 wherein the gait generator 100 increments the time Tk for generating the provisional current time gait by predetermined notch time ΔTk, and then repeats the determination in S804. Here, the notch time ΔTk may be set to coincide with, for example, a control cycle Δt. However, the ΔTk may be set to be longer than Δt so as to reduce the calculation volume.

If the determination result in S804 is affirmative, then the processing from S806 to S818 is repeated. If the determination result in S804 turns to negative, then the processing illustrated in FIG. 20, that is, the processing in S702 of FIG. 19, is terminated. Thus, the generation of the provisional current time gait from the starting time to the ending time of the current time gait is completed.

The gait generator 100 carries out the processing for determining the instantaneous values of the provisional current time gait in the aforesaid S806 to S816 as follows.

First, in S806, the gait generator 100 determines the instantaneous value at time Tk of the desired floor reaction force vertical component trajectory illustrated in FIG. 7 on the basis of the provisional current time gait parameters (more specifically, the floor reaction force vertical component trajectory parameters).

Subsequently, in S808, the gait generator 100 determines the instantaneous value of the desired ZMP trajectory (the provisional desired ZMP trajectory) illustrated in FIG. 8 it time Tk on the basis of the provisional current time gait parameters (more specifically, the provisionally determined ZMP trajectory parameters).

Subsequently, the gait generator 100 proceeds to S810 to determine the instantaneous values of the desired foot position/posture, the desired body posture, and the desired arm posture at time Tk on the basis of the provisional current time gait parameters (more specifically, the foot trajectory parameters, the body posture trajectory parameters, and the arm posture trajectory parameters). Regarding the desired arm postures, more specifically, the overall center-of-gravity positions of both arms are determined, whereas the motions of the arms (arm swinging motions) that change the amounts of angular motions about the vertical axis (or the body trunk axis of the body 24) are not yet determined.

Subsequently, the gait generator 100 proceeds to S812 to calculate the body ti vertical position at time Tk such that the desired floor reaction force vertical component determined in S806 is satisfied (such that the sum of the inertial force of the overall center of gravity of the robot 1 in the vertical direction and the gravitational force is balanced with the desired floor reaction force vertical component). The same calculation method as that used in S312 of FIG. 17 (the processing for calculating the instantaneous value of the body vertical position in the normal gait) may be applied. However, the multi-mass-point model used in S812 may be different from the model used in S312.

Subsequently, the gait generator 100 proceeds to S813 to determine the predicted value of the model manipulation floor reaction force moment at time Tk (the predicted value of the model manipulation floor reaction force moment at the time when the time Tk has elapsed from the initial time of the predicted model manipulation floor reaction force moment time series that has been received) on the basis of the predicted model manipulation floor reaction force moment time series input at the present moment (the current control cycle of the gait generator 100) from the model manipulation floor reaction force moment predictor 114.

Subsequently, the gait generator 100 proceeds to S814 to determine the body horizontal acceleration at time Tk such that the predicted value of the model manipulation floor reaction force moment determined in S813 is generated about the desired ZMP (such that the horizontal component of the moment generated about the desired ZMP due to the resultant force of the inertial force of the robot 1 and the gravitational force balances out the predicted value or the model manipulation floor reaction force moment at time Tk).

In other words, the body horizontal acceleration at time Tk is determined such that the moment generated about the desired ZMP by the resultant force of the inertial force of the robot 1 and the gravitational force coincides with the moment having a sign reversed from that of the predicted value of the model manipulation floor reaction force moment at time Tk.

In this case, the body horizontal acceleration of the provisional current time gait at time Tk is calculated by using, for example, the dynamic model (the inverted pendulum model) illustrated in FIG. 9.

To be more specific, the vertical position and the horizontal position of the body mass point 24b at time Tk are determined from the body vertical position of the provisional current time gait at time Tk, the body horizontal position at time (Tk−ΔTk), and the desired body posture at time Tk. Incidentally, ΔTk denotes the notch time at which the instantaneous value of the provisional current time gait is calculated. Further, the body horizontal position at time Tk may be estimated by interpolation on the basis of the time series of the body horizontal position up to time (Tk−ΔTk) or the gait state at time (Tk−ΔTk), and the estimated body horizontal position may be used in place of the body horizontal position at time (Tk−ΔTk).

Further, the value obtained by subtracting the gravitational force acting on the body mass point 24b (=mb*g) from the floor reaction force vertical component of the provisional current time gait at time Tk is divided by the mass mb of the body mass point 24b, thereby determining the vertical acceleration of the body mass point 24b at time Tk.

Further, the body mass point horizontal acceleration d2Xb/dt2 at time Tk is calculated by solving, on d2Xb/dt2, an expression obtained by substituting Zb, Xb and d2Zb/dt2 of the aforesaid expression 04 by the vertical position, the horizontal position, and the vertical acceleration, respectively, of the body mass point 24b determined as described above, substituting Xzmp and Zzmp of the expression 04 by the horizontal position and the vertical position of the desired ZMP at time Tk, and by causing Mzmp_y of the expression 04 to coincide with the predicted value of the model manipulation floor reaction force moment at time Tk. Then, the body mass point horizontal acceleration d2Xb/dt2 is determined as the body horizontal acceleration at time Tk.

Alternatively, a more precise dynamic model may be used to exploratorily determine the body horizontal acceleration that causes the horizontal component of a floor reaction force moment about the desired ZMP to coincide with the predicted value of the model manipulation floor reaction force moment.

Subsequently, the gait generator 100 proceeds to S816 to subject the body horizontal acceleration determined in S814 to the second-order integration so as to calculate the body horizontal position at current time Tk. The calculation method is the same as that used in S316 of FIG. 17.

This completes the detailed description of the processing (the processing for generating a provisional current time gait) carried out by the gait generator 100 in S702 of FIG. 19.

In the present embodiment, the provisional current time gait is generated from the beginning to the end by the processing in S702 described above. In this case, the provisional current time gait will be carried out, assuming that the predicted value of the model manipulation floor reaction force moment indicated by a predicted model manipulation floor reaction force moment time series is fed back to the gait generator 100 at each time from the beginning to the end of the provisional current time gait by carrying out the processing in S813 and S814.

The present embodiment is the same as the first embodiment except for the aspect described above. In the present embodiment, the value (instantaneous value) of a first model manipulation floor reaction force moment used for determining the instantaneous value of the current time gait in S032 of FIG. 10 is the value at the initial time of the time series of the predicted model manipulation floor reaction force moment, that is, the value of the first model manipulation floor reaction force moment output by the model manipulation floor reaction force moment distributor 118 at the current time.

After executing the processing in S702 as described above, the gait generator 100 carries out the processing in S704.

In S704, the gait generator 100 calculates a terminal divergent component qe1 (a divergent component qe1 at the end of a provisional current time gait) on the basis of body horizontal position/velocity (Xe, Vxe) at the end of the provisional current time gait generated in S702.

To be more specific, the gait generator 100 first determines the horizontal position/velocity (the horizontal position and the horizontal velocity) of the body mass point 24b of the inverted pendulum model in FIG. 9 on the basis of (Xe, Vxe) and the body posture (the reference body posture in the present embodiment) at the end of the provisional current time gait. Then, from the body mass point horizontal position/velocity, the terminal divergent component qe1 of the provisional current time gait is calculated according to the above expression 118, as with S222 of FIG. 16 described above. In this case, $\Gamma^{-1}$ used to calculate qe1 is the same as that calculated by the processing, in S222.

Subsequently, the gait generator 100 proceeds to S706 to calculate a terminal divergent component error errq (=qe1−q0″), which is the difference between the terminal divergent component qe1 of the provisional current time gait determined as described above and the initial divergent component q0″ of the normal gait determined in S224 of FIG. 16.

Further, the gait generator 100 proceeds to S708 to determine whether the terminal divergent component error errq determined as described above falls within a permissible range (a range in the vicinity of 0), that is, whether errq is zero or almost zero. More specifically, the determination in S708 is carried out on the terminal divergent component error errq in each axial direction of the X-axis direction and the Y-axis direction. If the terminal divergent component errors errq in both the X-axis direction and the Y-axis direction fall within the permissible range, then the determination result in S708 turns to be affirmative. In the terminal divergent component error errq in one of the axial directions does not fall within the permissible range, then the determination result in S708 turns to be negative.

Figure 21:
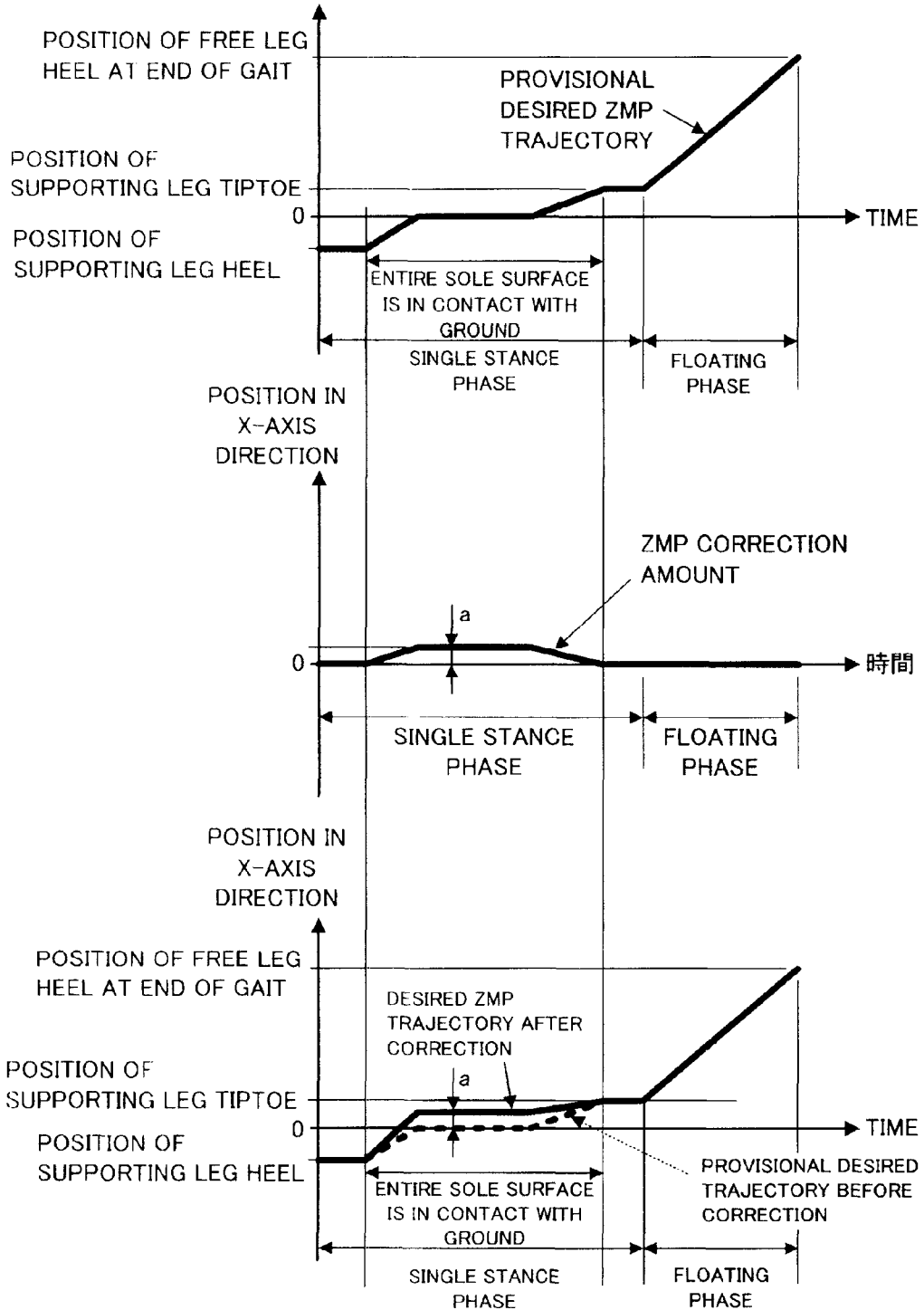
FIG. 21 is a graph for explaining the processing in S710 of FIG. 19.

In the determination result in S708 is negative, the gait generator 100 proceeds to S710 to generate a provisional current time gait up to ending time, as with the aforesaid S702, by using a desired ZMP trajectory obtained by correcting a present provisional desired ZMP trajectory by a correction amount of a trapezoidal pattern, applying a=Δa (Δa: a predetermined minute amount), as illustrated in FIG. 21. In other words, the gait generator 100 generates a provisional current time gait anew by using a desired ZMP trajectory obtained by correcting the provisional desired ZMP trajectory used for generating the provisional current time gait in S702. In this case, the current time gait parameters other than the desired LMP are the same as those used in S702.

Here, referring to FIG. 21, the "a" mentioned above denotes the height of the correction amount of the trapezoidal pattern (hereinafter referred to as the ZMP correction amount in some cases) for correcting the provisional desired ZMP trajectory (to be added to the provisional desired ZMP trajectory) in order to cause the terminal divergent component of the provisional current time gait to coincide with the initial divergent component of the normal gait as much as possible (to consequently converge the body horizontal position/posture trajectory of the current time gait to the body horizontal position/posture trajectory of the normal gait).

In this case, according to the present embodiment, the provisional desired ZMP trajectory is corrected during the period in which substantially entire bottom surface of the supporting leg foot 22 is in contact with the ground (entire sole surface in contact with the ground period). Hence, the ZMP correction amount is set such that the ZMP correction amount is not zero (≠0) during the entire sole surface in contact with the ground period, while the ZMP correction amount is zero (=0) during a period other than the entire sole surface in contact with the ground period. Further, the time of breakpoints of the ZMP correction amounts of the aforesaid trapezoidal pattern is set according to the time of breakpoints of the provisional desired ZMP trajectory in the entire sole surface in contact with the ground period. In S710, a=Δa (Δa: a predetermined minute amount) applies in order to observe a change in the aforesaid terminal divergent component error errq when a present provisional desired ZMP trajectory has been corrected by a minute amount by the ZMP correction amount of the aforesaid trapezoidal pattern.

Supplementally, the aforesaid processing in S710 has been described, taking, as an example, the case where the position of the desired ZMP in the X-axis direction is corrected. In actuality, however, the position of the desired ZMP in the Y-axis direction is also corrected. As with the correction of the position in the X-axis direction, the correction of the position in the Y-axis direction is made such that the desired ZMP trajectory during the entire sole surface is in contact with the ground period is changed from the provisional desired ZMP trajectory according to the trapezoidal pattern. In this case, the aforesaid Δa may be set to the same value in each axial direction or may be set to values that are different from each other.

If correcting the desired ZMP trajectory in one of the axial directions of the X-axis direction and the Y-axis direction exerts no influences or sufficiently small influences on the terminal divergent component in the other axial direction, then the processing from S710 to S716, which will be discussed later, may be carried out in the X-axis direction and the Y-axis direction separately.

After generating the provisional current time gait in S710 as described above, the gait generator 100 proceeds to S712 to calculate a terminal divergent component qe2 in the provisional current time gait in the same manner as that in S704 on the basis of the body horizontal position/velocity (Xe2, Vxe2) at the end of the provisional current time gait determined in S710.

In the present embodiment, $\Delta a$ has been set to a minute amount of a predetermined value in S710. Alternatively, however, $\Delta a$ may be variably set such that $\Delta a$ approaches zero as the terminal divergent component error errq is reduced by repetitive operation described below. In general, however, even when $\Delta a$ is set to a constant, the terminal divergent component error errq can be set to fall within a permissible range by performing the repetitive calculation a few time.

Subsequently, the gait generator 100 proceeds to S714 and calculates a parameter sensitivity r (the ratio of a change in the terminal divergent component error relative to $\Delta a$) according to the expression in the flowchart. More specifically, the gait generator 100 calculates the parameter sensitivity r by dividing the difference between the terminal divergent component qe2 calculated in S712 and the terminal divergent component qe1 calculated in S704 (=qe2−qe1) by $\Delta a$. In this case, to be more specific, for example, the component of (qe2−qe1) in the X-axis direction is divided by $\Delta a$ related to the ZMP correction amount in the X-axis direction thereby to calculate the parameter sensitivity r in the X-axis direction. Further, the component of (qe2−qe1) in the Y-axis direction is divided by $\Delta a$ related to the ZMP correction amount in the Y-axis direction thereby to calculate the parameter sensitivity r in the Y-axis direction.

Subsequently, the gait generator 100 proceeds to S716 and sets, as the height "a" of the ZMP correction amount of the trapezoidal pattern, the value obtained by reversing the sign of the value determined by dividing the terminal divergent component error errq determined in S706 by the parameter sensitivity r determined in S714, i.e., a=−errq/r, and then determines anew, as the provisional desired ZMP, the desired ZMP obtained by correcting the provisional desired ZMP pattern on the basis of the ZMP correction amount, as illustrated in FIG. 21. In this case, the ZMP correction amount height "a" is calculated separately for the X-axis direction and the Y-axis direction, respectively.

If correcting the desired ZMP trajectory in one of the axial directions, namely, the X-axis direction and the Y-axis direction, exerts influences on the terminal divergent component in the other axial direction, then the influences are preferably taken into account in determining the height "a" of the ZMP correction amount in each axial direction.

Subsequently, the gait generator 100 carries out the processing from S702 again. At this time, as long as the determination result given in S708 is negative, the processing of S702 through S716 described above is repeated. If the determination result in S708 turns to be affirmative, then the gait generator 100 leaves the repetition loop (S700) and proceeds to S718.

By carrying out the loop processing of S702 through S716 described above, the ZMP correction amount (consequently the desired ZMP trajectory of the current time gait) which allows the terminal divergent component qe1 to agree or almost agree with the initial divergent component q0" of the normal gait is exploratorily determined.

In S718 following the loop processing, the gait generator 100 determines the present provisional desired ZMP trajectory (the provisional desired ZMP trajectory set immediately before leaving the repetition loop in S700) as the final desired ZMP trajectory of the current time gait, and determines the ZMP trajectory parameters based thereon. This terminates the processing in S028 of FIG. 10 (the processing for correcting the current time gait parameters).

In the present embodiment, the ZMP correction amount has been set to be the trapezoidal pattern. Alternatively, however, other patterns, such as a triangular pattern or a pattern having a continuously changing curvature, may be used.

Referring back to FIG. 10, after correcting the current time gait parameters in S028 as described above, the gait generator 100 proceeds to S030 to determine floor reaction force moment permissible range parameters that define the permissible range of a floor reaction force moment (more specifically, the horizontal component of a floor reaction force moment) about the desired ZMP at each time from the start to the end of the current time gait. The permissible range of the floor reaction force moment defined by the floor reaction force moment permissible range parameters is used as previously described in the compensating total floor reaction force moment distributor 110 and also used in the determination processing in S030, which will be discussed later.

The result obtained by dividing the floor reaction force moment by a floor reaction force vertical component corresponds to the amount of deviation of the ZMP (the central point of a floor reaction force) from a desired ZMP. Hence, the floor reaction force moment permissible range may be converted into a ZMP permissible range (floor reaction force central point permissible range) as the permissible range of the position of a ZMP (the floor reaction force central point), and the parameters defining the ZMP permissible range may be determined.

The floor reaction force moment permissible range determined in S030 means the permissible range of an actual floor reaction force moment about the desired ZMP controlled by the control processing (compliance control) by the aforesaid composite-compliance operation determiner 104 when used in the compensating total floor reaction force moment distributor 110. The floor reaction force moment permissible range will be described below.

The compliance control implemented by the processing carried out by the composite-compliance operation determiner 104 controls the position/posture of the foot 22 such that the floor reaction force moment generated about the desired ZMP will be the desired floor reaction force moment for compliance control. When the compliance control faithfully is implemented as desired, the actual floor reaction force central point will be a point, the position of which is deviated in the horizontal direction from the desired ZMP by a value obtained by dividing the desired floor reaction force moment by a floor reaction force vertical component. The actual floor reaction force central point cannot deviate from a ZMP-existable range indicated by a so-called supporting polygon (in a strict expression, the range in which the actual floor reaction force central point can exist). If the actual floor reaction force central point excessively approaches the boundary of the ZMP-existable range, then problems will be posed. For example, the proper ground contact feeling of the foot 22 deteriorates or the bottom surface of the foot 2 floats.

The floor reaction force moment permissible range is to impart restrictions to the floor reaction force moment for compliance control in order to prevent the aforesaid problems. For this reason, the floor reaction force moment permissible range is preferably determined such that the floor reaction force central point permissible range obtained by dividing the floor reaction force moment permissible range by a floor reaction force vertical component is included in the ZMP-existable range.

More specifically, the floor reaction force central point permissible range (ZMP permissible range) should be determined on the basis of the supporting polygon. In this case, the floor reaction force central point permissible range can be generally set to have a complicated shape. In the present embodiment, however, the floor reaction force central point permissible range is set to, for example, a region of a rectangular shape (a rectangular shape having sides parallel to the X-axis direction and the Y-axis direction) on a floor surface in order to simplify the calculation. In this case, the floor reaction force moment permissible range obtained by converting the floor reaction force central point permissible range into a floor reaction force moment is set independently for a component in the X-axis direction and a component in the Y-axis direction, respectively.

Figure 22:
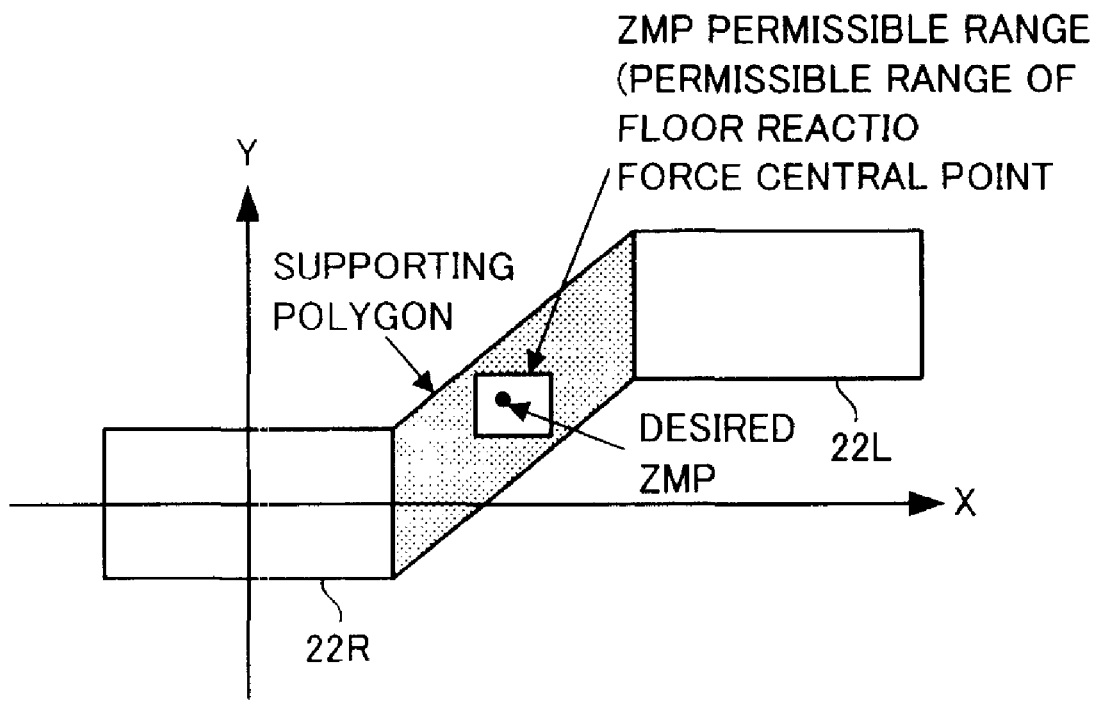
FIG. 22 is a diagram for explaining the processing in S030 of FIG. 10.

For example, if the supporting polygon and the desired ZMP are in the situation illustrated in FIG. 22, then the floor reaction force central point permissible range (ZMP permissible range) is set to be included in the supporting polygon, as illustrated. At the same time, the floor reaction force central point permissible range (ZMP permissible range) is set to include the desired ZMP.

The supporting polygon indicated in the form of a stippled region in FIG. 22 illustrates a supporting polygon of a walking gait (a supplemental description will be given later of the gait generation related to a walking gait) in a two-leg supporting period. This example schematically illustrates a state wherein the tiptoe of the right foot 22R is in contact with the ground, while the heel of the left foot 22L is in contact with the ground.

In the one-leg supporting period of a walking gait or the running gait in FIG. 6, the supporting polygon provides the ground contact surface (the surface of contact with a floor surface) of the supporting leg foot 22. In this case, a floor reaction force central point permissible range is set to include a desired ZMP and also to be included in the supporting polygon or to substantially match the supporting polygon. If the desired ZMP deviates from the supporting polygon or is excessively close to the boundary of the supporting polygon, then, temporarily, for example, an arbitrary region in the supporting polygon that does not include the desired ZMP or a point in the supporting polygon that is different from the desired ZMP (a region having a zero area) is set as the floor reaction force central point permissible range.

Further, in the floating period of the running gait in FIG. 6, the floor reaction force central point permissible range is set to be, for example, the region having zero width in both X-axis direction and the Y-axis direction, the center thereof being the desired ZMP. This means that the floor reaction force central point permissible range is set to the point of the desired ZMP itself, meaning that the region has a zero area.

When setting the floor reaction force central point permissible range as described above, the supporting polygon in the current time gait is calculated on the basis of the foot position/posture trajectory parameters of the current time gait parameters determined in S028 (or S026).

In the present embodiment, the range obtained by converting the floor reaction force central point permissible range set as described above to a floor reaction force moment is determined as the standard permissible range of floor reaction force moments. The standard permissible range is a permissible range based on an assumption that the floor in an environment in which the robot 1 travels is a standard floor (e.g., a floor having a flat surface with its frictional coefficient and hardness meeting predetermined requirements).

Further, according to the present embodiment, the gait generator 100 determines floor reaction force moment permissible range parameters by correcting, as necessary, the standard permissible range of floor reaction force moments according to received floor geometry information.

To be more specific, in the case where the floor recognized from the input floor geometry information is not a floor with a flat surface, and the floor makes it difficult to change the expected landing position/posture of the free leg foot 22 in a current time gait or a next gait from the position/posture defined by required parameters (e.g., a floor formed of scattered paving stones or the like), and if the actual posture of the robot 1 deviates from a desired posture, then the deviation of the posture of the actual robot 1 is preferably restrained by the desired floor reaction force moment for the compliance control. i.e., by holding the foot 22 of the actual robot 1, as much as possible. In this case, therefore, the gait generator 100 determines the floor reaction force moment permissible range parameters such that the floor reaction force moment permissible range is expanded further than the standard permissible range within an extent that the floor reaction force central point permissible range corresponding to the floor reaction force moment permissible range does not deviate from the aforesaid supporting polygon.

Further, in the case where, for example, the robot 1 is to go up or down a staircase, the free leg foot 22 is usually landed such that a portion near the heel or a portion near a tiptoe of the free leg foot 22 of the robot 1 extends beyond a step surface of the staircase. In this case, the area of the supporting polygon is smaller than that when the robot 1 travels on a standard floor. Hence, if the floor recognized on the basis of received floor geometry information for generating gaits (the floor on which the robot 1 is about to travel) is a staircase, then the gait generator 100 determines the floor reaction force moment permissible range parameters such that the floor reaction force moment permissible range is narrower than the standard permissible range.

Further, if, for the example, the hardness of the floor recognized on the basis of received floor geometry information is less than that of a standard floor, then it is difficult in the actual robot 1 to set a large desired floor reaction force moment for compliance control to be generated about a desired ZMP. In this case, therefore, the gait generator 100 determines the floor reaction force moment permissible range parameters such that the floor reaction force moment permissible range is narrower than the standard permissible range.

Thus, in S030, the floor reaction force moment permissible range or a floor reaction force central point permissible range corresponding thereto is determined such that it depends not only on a desired ZMP trajectory and a supporting polygon defined by foot position posture trajectory parameters but also on a floor geometry, including the properties of a floor.

In the present embodiment, the standard permissible range of a floor reaction force moment has been corrected, as appropriate, according to a floor geometry. Alternatively, however, the floor reaction force central point permissible range set on the basis of a desired ZMP trajectory and a supporting polygon may be corrected according to a floor geometry, and the corrected floor reaction force central point permissible range may be converted to a floor reaction force moment permissible range.

After determining the floor reaction force central point permissible range parameters in S030 as described above, the gait generator 100 proceeds to S031 to determine whether the desired ZMP trajectory defined by the ZMP trajectory parameters determined in S028 is a proper trajectory. In this case, according to the present embodiment, the gait generator 100 determines whether the desired ZMP trajectory is a proper trajectory by determining whether each instantaneous value (the instantaneous value at each predetermined notch time) of the desired ZMP trajectory defined by the ZMP trajectory parameters of a current time gait exists in the floor reaction force central point permissible range corresponding to the floor reaction force moment permissible range determined in the aforesaid S030.

More specifically, the gait generator 100 determines the floor reaction force central point permissible range corresponding to each instantaneous value of the desired ZMP on the basis of the floor reaction force moment permissible range parameters.

The gait generator 100 then determines that the desired ZMP trajectory defined by the ZMP trajectory parameters of the current time gait is a proper trajectory if the desired ZMP at each time of the current time gait exists in the floor reaction force central point permissible range at that time. If the desired ZMP at any time of the current time gait deviates from the floor reaction force central point permissible range at that time, then the gait generator 100 determines that the desired ZMP trajectory defined by the ZMP trajectory parameters of the current time gait is not a proper trajectory. The gait generator 100 assumes that each instantaneous value of the desired ZMP in a floating period in which both legs 2 and 2 of the robot 1 are not in contact with the ground always falls in the floor reaction force central point permissible range.

If the determination result in S031 is negative (if the desired ZMP trajectory is not a proper trajectory), then the gait generator 100 carries out the processing from S020 again. In this case, in S020, the gait generator 100, for example, changes the expected landing position/posture of the free leg foot 22 of the current time gait (consequently, the position/posture in the next time gait's supporting leg coordinate system) to position/posture shifted from current values (i.e., the expected landing position/posture determined by the processing in S020 at a control cycle immediately preceding the current control cycle). To be more accurate, the aforesaid expected landing position/posture to be changed means at least one of the expected landing position and the expected landing posture.

In this case, the change amount or amounts of the expected landing position/posture are determined by the aforesaid determination processing in S031 on the basis of the direction of deviation or the deviation amount of the desired ZMP deviating from the floor reaction force central point permissible range. The change amount or amounts are basically determined such that the desired ZMP will be included or will be easily included in a supporting polygon defined by the updated expected landing position/posture.

Alternatively, the expected landing position/posture of the free leg foot 22 of the next gait (consequently, the position/posture in the next but one time's gait supporting leg coordinate system) may be changed in addition to the expected landing position/posture of the free leg foot 22 of the current time gait. Furthermore, the expected landing time of the free leg foot 22 may be changed whenever the expected landing position/posture of the free leg foot 22 of the current time gait or the next gait are changed.

Thus, after carrying out the processing in S020 again, the gait generator 100 carries out again the processing from S022 and after in the manner described above. In other words, the processing from S020 to S028 is repeated until the determination result in S030 changes to be affirmative.

Supplementally, the floor reaction force central point permissible range used in the determination processing in S031 does not have to be the same as the floor reaction force central point permissible range corresponding to the floor reaction force moment permissible range determined in S030 (specifically, the permissible range used in the processing by the compensating total floor reaction force moment distributor 110, which will be discussed later). For example, the floor reaction force central point permissible range used in the determination processing in S031 may be a range having a different area or boundary configuration from the area or boundary configuration of the floor reaction force central point permissible range corresponding to the floor reaction force moment permissible range determined in S030 (specifically, the permissible range used in the processing by the compensating total floor reaction force moment distributor 110, which will be discussed later).

Referring back to FIG. 10, if the determination result in S031 is affirmative or if the determination result in S016 is negative, then the gait generator 100 proceeds to S032 to determine current time gait instantaneous values (the instantaneous values of the desired foot position/posture or the like of the current time gait at a present control cycle). In this S032, the current time gait instantaneous values are determined such that the model manipulation floor reaction force moment determined as previously described by the posture stabilization control calculator 112 is generated about a desired ZMP.

Figure 23:
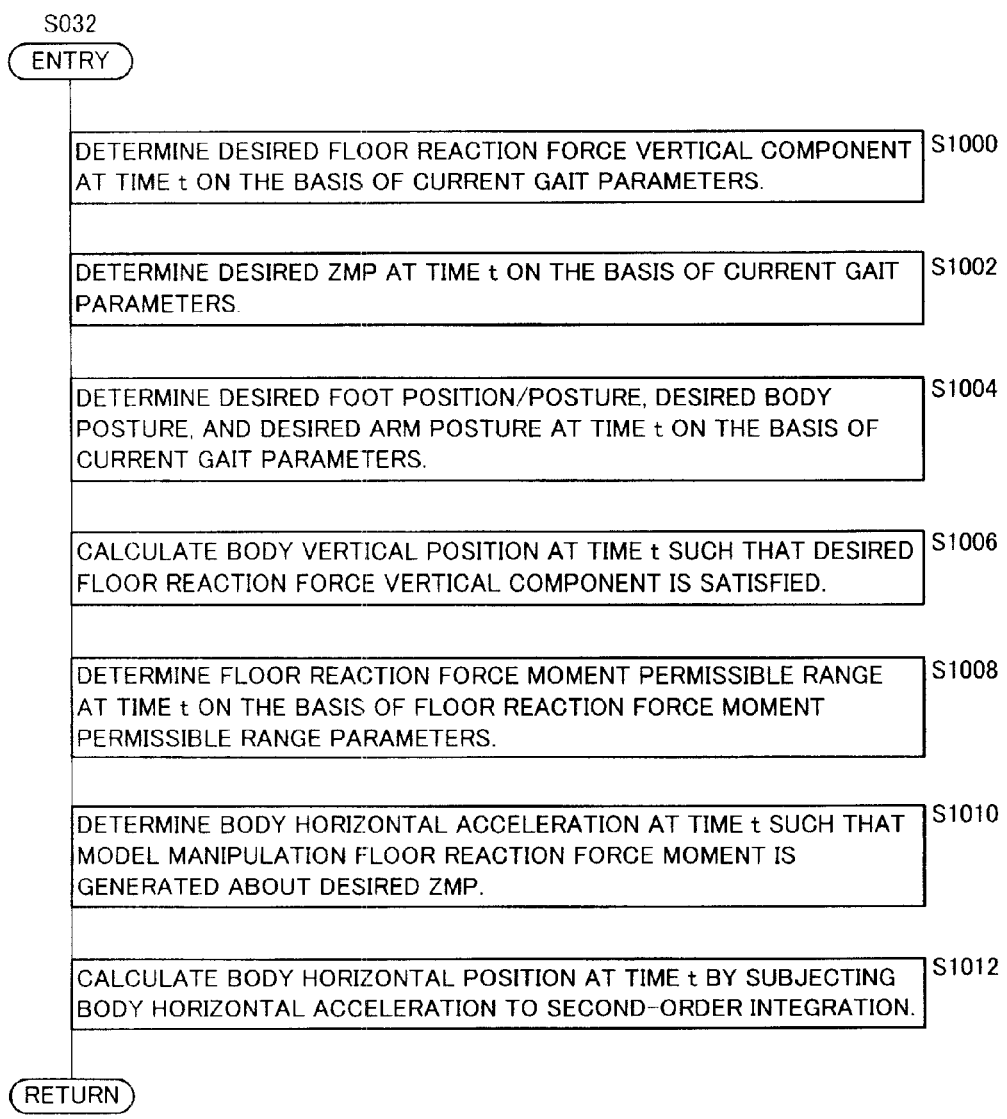
FIG. 23 is a flowchart illustrating the subroutine processing in S032 of FIG. 10.

To be specific, gait instantaneous values are determined as illustrated by the flowchart of FIG. 23. The gait generator 100 first carries out the processing from S1000 to S1006 in the same manner as that for the processing from S806 to S812 of FIG. 20 (or from S306 to S312 of FIG. 17) thereby to calculate the instantaneous values of the desired floor reaction force vertical component, the desired ZMP, the desired foot position/posture, the desired body posture, the desired arm posture, and the desired body vertical position at current time t (the present control cycle) of a current time gait.

These instantaneous values are calculated in the same manner as that of the processing from S806 to S812 of FIG. 20 (or from S306 to S312 of FIG. 17) except that the current time gait parameters that have been lastly corrected in S028 of FIG. 10 are used as the gait parameters.

Subsequently, the gait generator 100 proceeds to S1008 to determine the instantaneous values of the floor reaction force moment permissible range at the current time t of the current time gait on the basis of the floor reaction force moment permissible range parameters determined in S030 of FIG. 10. The instantaneous values of the floor reaction force moment permissible range are output from the gait generator 100 to the compensating total floor reaction force moment distributor 110 (refer to FIG. 3). Further, the model manipulation floor reaction force moment calculated according to the above expression 52 (the value at the current time t) in the distributor 110 is supplied to the gait generator 100.

Subsequently, the gait generator 100 proceeds to S1010 to determine the body horizontal acceleration at the current time t of the current time gait such that the value at the initial time in the time series of the predicted model manipulation floor reaction force moment imparted from the model manipulation floor reaction force moment predictor 114 (the value of the model manipulation floor reaction force moment output by the compensating total floor reaction force moment distributor 110 at current time t) is generated about the desired ZMP (such that the horizontal component of the moment generated about the desired ZMP by the resultant force of the inertial force of the robot 1 and the gravitational force is balanced with the model manipulation floor reaction force moment).

In other words, the body horizontal acceleration at the current time t of the current time gait is determined such that the moment generated about the desired ZMP by the resultant force of the inertial force of the robot 1 and the gravitational force agrees with the model manipulation floor reaction force moment at current time t with its sign reversed.

In this case, the body horizontal acceleration of the current time gait is calculated in the same manner as that of the processing in S814 of FIG. 20 by using, for example, the dynamic model (the inverted pendulum model) in FIG. 9.

To be more specific, at the current time t of the current time gait, the vertical position and the horizontal position of the body mass point 24b at the current time t are determined on the basis of the body vertical position, the body horizontal position at time (t−Δt), and the desired body posture at the current time t. Alternatively, the body horizontal position at the time t may be estimated in an interpolation manner on the basis of the time series of the body horizontal position up to the time (t−Δt) or the gait state at the time (t−Δt), and the estimated body horizontal position may be used in place of the body horizontal position at the time (t−Δt).

Further, the value obtained by subtracting the gravitational force (=mb*g) acting on the body mass point 24b from the floor reaction force vertical component at the current time t of the current time gait is divided by the mass mb of the body mass point 24b to determine the vertical acceleration of the body mass point 24b at the current time t.

Then, the vertical position, the horizontal position, and the vertical acceleration of the body mass point 24b, which have been determined as described above, are substituted into Zb, Xb, and d2a/dt2, respectively, of the above expression 04, and the horizontal position and the vertical position of the desired ZMP at the current time t are substituted into Xzmp and Zzmp, respectively, of expression 04. Further, an expression with Mzmp_y of the expression 04 coinciding with the model manipulation floor reaction force moment at current time t is solved on d2Xb/dt2, thereby calculating the body mass point horizontal acceleration d2Xb/dt2 at the current time t. Then, the body mass point horizontal acceleration d2Xb/dt2 is determined as the body horizontal acceleration at the current time t.

Alternatively, a more precise dynamic model may be used to exploratorily determine the body horizontal acceleration that causes the horizontal component of a floor reaction force moment about the desired ZMP to coincide with the model manipulation floor reaction force moment.

Subsequently, the gait generator 100 proceeds to S1012 to subject the body horizontal acceleration determined in S1010 as described above to the second-order integration so as to calculate the body horizontal position at the current time t. The calculating method is the same as that used in S316 of FIG. 17 (or S816 of FIG. 20). This completes the processing in S032 of FIG. 10.

Subsequently, the gait generator 100 proceeds to S034 to determine arm motions for cancelling a spin force (for zeroing or substantially zeroing the vertical component of the floor reaction force moment generated about the desired ZMP due to the motions of portions except for the arms of the robot 1). To be more specific, the floor reaction force moment vertical component trajectory at the desired ZMP in the case where the arms are not swung (strictly speaking, each instantaneous value with a reversed sign of the vertical component trajectory of the moment acting on the desired ZMP due to the resultant force of the gravitational force and the inertial force of the robot when a gait is generated without arm swings) is determined.

In other words, the instantaneous value of the vertical component of the floor reaction force moment about the desired ZMP that balances with the instantaneous value of the motion (not including arm swinging motion) of the current time gait generated by the processing in S032 is determined. Then, the instantaneous value of the floor reaction force moment vertical component is divided by an equivalent inertial moment of an arm swinging motion so as to determine an angular acceleration of an arm swinging motion necessary to cancel the spin force. If an arm swing is excessively large, then the instantaneous value of the floor reaction force moment vertical component may be divided by a value that is larger than the equivalent inertial moment.

Subsequently, the gait generator 100 subjects the angular acceleration to the second-order integration, then sets the angle obtained by passing the integration result through a low-cut titter for preventing the integration value from becoming excessive as the arm swing motion angle. However, in the arm swing motion, the right and left arms are longitudinally swung in opposite directions to avoid causing changes in the positions of the centers of gravity of both arms. Alternatively, an arm swing motion for cancelling the spin force may be generated also in the normal gait and the arm swing motion in the current time gait may be determined such that the connection thereof to the one in the normal gait is ensured.

Subsequently, the gait generator 100 proceeds to S036 to add the control cycle Δt to the time t and carries out the processing from S014 again.

Thus, the instantaneous values of the current time gait are generated in a time series manner.

In this case, the trajectory (time series) of the desired motion of the current time gait of the robot 1 (the desired foot positions/postures, the desired body position/posture, and the desired arm postures) is determined such that the desired floor reaction force vertical component trajectory defined by the desired floor reaction force vertical component parameters (the parameters determined in S606 of FIG. 18) is satisfied (such that the total sum of the vertical inertial force of the overall center of gravity of the robot 1 and the gravitational force acting on the overall center of gravity balances out a desired floor reaction force vertical component).

Further, the trajectory of the desired motion of the current time gait is determined with another requirement that the trajectory is converged (gradually approximated) to the motion trajectory of a normal gait as a virtual reference motion in the future.

More specifically, a provisional current time gait is generate, assuming that, at the timing when the gait generator 100 determines current time gait parameters (at the control cycle of a gait changeover in the present embodiment), the time series of the model manipulation floor reaction force moment sequentially fed back to the gait generator 100 (the model manipulation floor reaction force moment output by the compensating total floor reaction force moment distributor 110) coincides with the time series of the aforesaid predicted model manipulation floor reaction force moment as the predicted value thereof in the future after current time. Then, the desired ZMP trajectory parameter is corrected, as appropriate, such that the terminal divergent component of the provisional current time gait agrees with the initial divergent component of a normal gait, thus determining the current time gait parameters, including the desired ZMP trajectory parameter.

Thus, the current time gait parameters are determined such that the current time gait connects with the normal gait (such that a future gait is converged to the normal gait) under the aforesaid assumption related to a first model manipulation floor reaction force moment fed back to the gait generator 100.

Further, using the current time gait parameters determined as described above, the desired motion of the current time gait is determined such that the model manipulation floor reaction force moment will be additionally generated about the desired ZMP in the dynamic model (the inverted pendulum model in the present embodiment) indicating the relationship between a motion of the robot 1 and a floor reaction force.

The arrangement described above restrains the time series of the instantaneous value of a current time gait actually output by the gait generator 100 (the time series of the instantaneous value determined in S032 of FIG. 10) from deviating from the time series of the instantaneous values of the current time gait (a preferable time series) which are targeted by determined current time gait parameters, thus permitting improved agreement between the aforesaid time series. This in turn makes it possible to generate, with high reliability, a desired motion of a gait that ensures the continuity of motion of the robot 1.

Here, a supplemental description will be given of the correspondence relationship between the present embodiment described above and the present invention.

In the present embodiment, the processing by the gait generator 100 (the processing illustrated by the flowchart of FIG. 10) implements the desired motion determining unit in the present invention. In this case, the motion of a desired gait (the desired foot position/posture, the desired body position/posture, and the desired arm posture) sequentially output from the gait generator 100, i.e., the instantaneous value of a motion of the desired gait determined in S032 of FIG. 10 corresponds to the instantaneous value of the desired motion in the present invention. Further, the dynamic model (the inverted pendulum model in the present embodiment) illustrated in FIG. 9 corresponds to the dynamic model in the present embodiment. The model manipulation floor reaction force moment used for the processing in S1010 of FIG. 23 corresponds to the model external force manipulated variable in the present invention. Generating a model manipulation floor reaction force moment about a desired ZMP with respect to the robot on the dynamic model illustrated in FIG. 9 corresponds to causing an additional external force to act on the robot.

Further, the steps S020 to S031 carried out by the gait generator 100 at a gait changeover implement the unit which variably determines leg motion parameters and ZMP trajectory parameters in the present invention. In this case, the foot trajectory parameters and ZMP trajectory parameters in current time gait parameters in the present embodiment correspond to the leg motion parameters and ZMP trajectory parameters, respectively, used as arithmetic parameters in the present invention.

The processing in S022 of FIG. 10 carried out by the gait generator 100 implements the reference parameter determining unit in the present invention. In this case, the motion of the normal gait corresponds to the reference motion, and the gait parameters of the normal gait correspond to reference parameters.

Further, the processing carried out by the composite-compliance operation determiner 104, the robot geometric model 102, and the joint displacement controller 108 implements the operation control unit in the present invention. The processing carried out by the composite-compliance operation determiner 104 imparts the compliance function to the operation control unit.

The processing carried out by the posture stabilization control calculator 112 and the compensating total floor reaction force moment distributor 110 implements the feedback manipulated variable determining unit in the present invention. In this case, the body posture angle error $\Delta\theta$ corresponds to a posture state amount deviation in the present invention. The model manipulation floor reaction force moment corresponds to the model external force manipulated variable in the present invention, and the desired floor reaction force moment for compliance control corresponds to an actual robot external force manipulated variable. Further, generating the desired floor reaction force moment for compliance control about a desired ZMP in the actual robot 1 corresponds to applying an additional external force to the robot 1.

Further, the processing carried out by the model manipulation floor reaction force moment predictor 114 implements the model external force manipulated variable predicting unit in the present invention. In this case, the time series of the predicted model manipulation floor reaction force moment corresponds to the time series of a future predicted value of a model external force manipulated variable in the present invention.

Supplementally, in the present embodiment, the processing by the model manipulation floor reaction force moment predictor 114 to generate the time series of the predicted model manipulation floor reaction force moment has been carried out independently of the processing carried out by the gait generator 100. Alternatively, however, the time series of the predicted model manipulation floor reaction force moment may be generated in the processing by the gait generator 100 (e.g., during the processing S018 through S028 in FIG. 8).

The following will describe some modifications of the embodiments described above.

Figure 24:
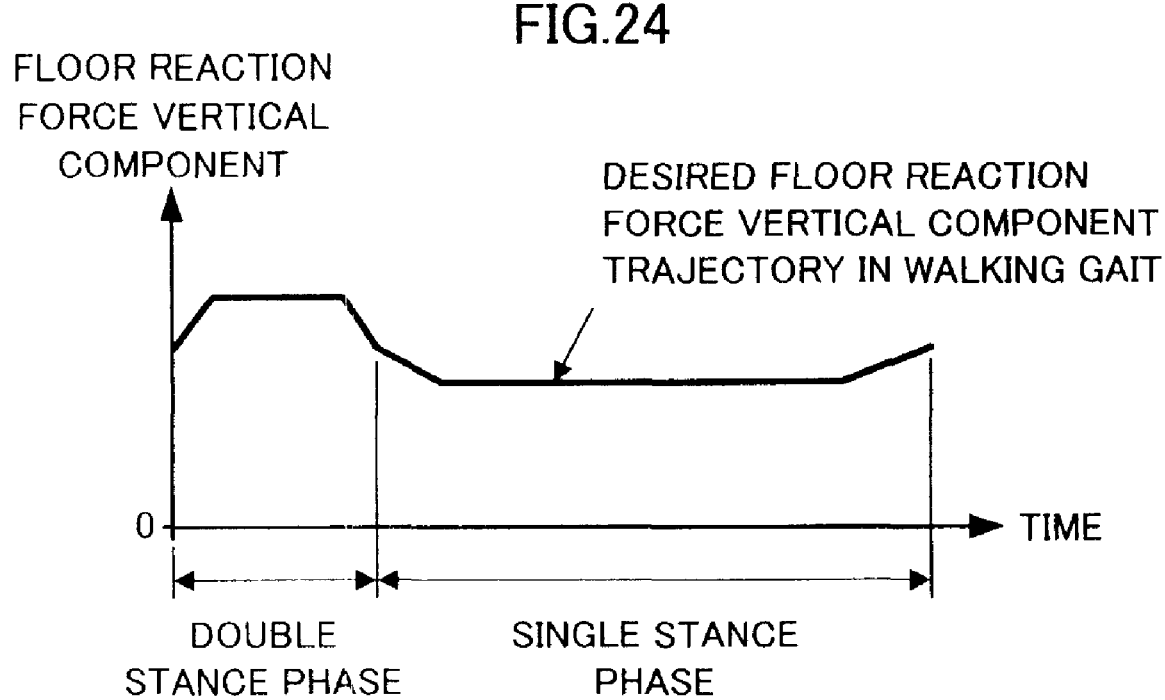
FIG. 24 is a graph illustrating a desired floor reaction force vertical component trajectory in a walking gait of the robot shown in FIG. 1.

The embodiments have been described, taking the running gait in FIG. 6 as an example of the desired gait in which the inertial force in the vertical direction of the body 24 changes. Alternatively, however, the motion of the robot 1 may be effected by using a walking gait, in which the inertial force in the vertical direction of the robot 1 changes, as the desired gait. In this case, the inertial force in the vertical direction of the body 24 can be changed while the robot 1 is walking by setting the floor reaction force vertical component trajectory (the trajectory for one step) to, for example, the pattern indicated by the line graph of FIG. 24. In the example of FIG. 24, the floor reaction force vertical component trajectory is set to have a trapezoidal shape bulging in the direction in which the floor reaction three vertical component increases (bulging upward) in a two-leg supporting period, while it is set to have a trapezoidal shape bulging in the direction in which the floor reaction force vertical component decreases (bulging downward) in a one-leg supporting period.

However, the floor reaction force vertical component trajectory in a desired gait for the robot 1 to walk may be a trajectory in which the value of the floor reaction force vertical component is maintained substantially at a constant value.

In the aforesaid embodiments, in order to make the descriptions easy to understand, the gait generator 100 has generated desired gaits by using the relatively simple dynamic model illustrated in FIG. 9. Alternatively, however, the desired gaits may be generated by using a complicated dynamic model with a higher dynamic accuracy. For example, the dynamic model (the dynamic model provided with a flywheel and a plurality of mass points) presented in an embodiment of, for example, Japanese Patent No. 4246638 by the applicant of the present application, may be used to generate the desired gaits.

Further alternatively, a multi-mass-point model provided with a mass point in each link of the robot 1 may be used to generate the desired gaits.

When generating the desired gaits by using these dynamic models, the permissible range limiting the frictional force between the feet 22 of the robot 1 and a floor surface may be variably set according to the timing of a gait or a floor condition, and a desired gait may be generated with a requirement that the frictional force generated according to the inertial force of the robot 1 falls within the permissible range. The technique for generating such a desired gait may be, for example, the technique proposed by the applicant of the present application in an embodiment of the aforesaid Japanese Patent No. 4246638.

In the aforesaid embodiments, the manipulated variable of the dimension of the floor reaction force moment about a desired ZMP as a model external force manipulated variable and an actual robot external force manipulated variable in the present invention. Alternatively, however, another type of manipulated variable may be used, e.g., the correction amount of a desired ZMP, which allows the body posture angle error $\Delta\theta$ to be manipulated.

Further, in the embodiments described above, the processing in S020 to S031 of FIG. 10 has been carried out only at a changeover of a gait (in the case where the determination result in S016 is affirmative). Alternatively, however, the processing in S020 to S031 may be carried out at each control cycle of the gait generator 100.

In this case, in the processing carried out in S702 of FIG. 19, the provisional current time gait from current time t to the ending time of a current time gait (the instantaneous value of a provisional current time gait at each notch time $\Delta Tk$) may be generated by the same processing as that from S806 to S818 of FIG. 20, taking, for example, the gait motional state determined immediately before (e.g., immediately preceding control cycle) at current time t (the time of a current control cycle of the gait generator 100) as the starting point. Except for this processing, the processing by the gait generator 100 may be the same as that of the aforesaid embodiments.

Further, according to the embodiments described above, in the processing for generating gaits by the gait generator 100, the current time gait parameters, such as a ZMP trajectory parameter, have been determined by using normal gait motions, which are cyclic motions, as future reaching targets (convergence targets). Alternatively, however, reaching targets other than the normal gait motions may be set as the future targets.

For example, the desired position and the desired velocity of the center of gravity of the robot 1 at the expected landing time of the free leg foot 22 of a current time gait may be set, and by using these desired position and desired velocity as the future reaching targets, the gait generator 100 may carry out the processing for generating a gait (the processing for generating a current time gait).

In this case, as a setting example of the desired position and the desired velocity of the center of gravity of the robot 1 at the expected landing time of the free leg foot 22 of the current time gait, the desired position in the horizontal direction of the center of gravity of the robot 1 at the expected landing time of the free leg foot 22 is set in the midway between the expected position of the free leg foot 22 at the expected time and the expected position of the supporting leg foot 22. Further, a value obtained by multiplying the mean velocity, which is obtained by dividing the change amount of the center of gravity of the robot 1 during a period from the beginning time of a current time gait to the expected landing time of the free leg foot 22 by the time of the period, by a certain coefficient is set as the desired velocity of the center of gravity of the robot 1 at the expected landing time of the free leg foot 22.

Thus, targets other than normal gait motions may be set as the future reaching targets related to the motions of gaits generated by the gait generator 100.

In the aforesaid embodiments, the divergent component q(k) has been defined according to the aforesaid expression 118. Alternatively, however, the divergent component may be defined in a simplified manner as with the one in Japanese Patent No. 3726081. More specifically, the divergent component q(k) may be defined as follows.

$q(k)$=Horizontal position of body mass point+Horizontal velocity of body mass point/$\omega a$ where $\omega a$: specified value set beforehand Then, the initial divergent component of a normal gait and the terminal divergent component of a current time gait may be calculated according to the above definition.

What is claimed is:

1. A control device for a legged mobile robot to control the motion of a legged mobile robot, which travels by moving a plurality of legs extended from a base body thereof, by sequentially determining the instantaneous value of a desired motion of the robot and by controlling the motion of the robot such that an actual motion of the robot follows the time series of the instantaneous value of the desired motion, the control device comprising:

a desired motion determining unit which uses a preset dynamic model expressing the dynamics of the robot and carries out arithmetic processing for calculating a motion of the robot on the dynamic model so as to sequentially determine the instantaneous value of a desired motion of the robot;

a motion control unit which controls the motion of the robot so as to cause the actual motion of the robot to follow the time series of the instantaneous value of the desired motion;

a feedback manipulated variable determining unit which sequentially observes a posture state amount error indicating the degree of deviation of an actual posture of the robot from a posture of the robot defined by the instantaneous value of the desired motion, and sequentially determines, on the basis of the observed value of the posture state amount error, at least a model external force manipulated variable specifying an additional external force to be additionally applied to the robot on the dynamic model as a feedback manipulated variable having a function for bringing the posture state amount error close to zero;

a model external force manipulated variable predicting unit which determines the time series of a future predicted value of the model external force manipulated variable supplied to the desired motion determining unit from the feedback manipulated variable determining unit on the basis of the determined model external force manipulated variable; and a future target determining unit which determines a future reaching target of a desired motion of the robot, wherein the desired motion determining unit comprises at least a unit which determines arithmetic parameters necessary for the arithmetic processing by using the time series of a future predicted value of the determined model external force manipulated variable and the determined reaching target such that a requirement that the time series of the instantaneous value of the desired motion determined in the case where it is assumed that the arithmetic processing is carried out while additionally applying the time series of an additional external force, which is defined by the time series of a future predicted value of the determined model external force manipulated variable, to the robot on the dynamic model in a predetermined period in the future will reach or converge to the determined reaching target in the future is satisfied, and carries out the arithmetic processing by using the arithmetic parameters while additionally applying the additional external force, which is defined by the model external force manipulated variable determined by the feedback manipulated variable determining unit, to the robot on the dynamic model.

2. A control device for a legged mobile robot according to claim 1,
wherein the future target determining unit is a unit which determines, as the parameter indicative of the reaching target, a reference parameter defining a reference motion, which is a virtual reference motion serving as the future convergence target of a desired motion of the robot and which cyclically repeats a motion of in a same pattern, and
the requirement is a requirement that the time series of the instantaneous value of the desired motion determined in the case where it is assumed that the arithmetic processing is carried out while additionally applying the time series of a future predicted value of the determined model external force manipulated variable to the robot on the dynamic model in a predetermined period in the future will converge to the reference motion defined by the determined reference parameter in the future.

3. The control device for a legged mobile robot according to claim 1,
wherein the desired motion determining unit has a unit which carries out the arithmetic processing by using a leg motion parameter defining the desired motion trajectory of the distal end of each leg of the robot and the ZMP trajectory parameter defining the trajectory of a desired ZMP of the robot as the arithmetic parameters and which variably determines the leg motion parameter and the ZMP trajectory parameter such that at least the aforesaid requirement is satisfied and that the desired ZMP defined by the ZMP trajectory parameter falls in a predetermined permissible range depending on the desired motion trajectory of the distal end of each leg defined by the leg motion parameter.

4. The control device for a legged mobile robot according to claim 1,
wherein the feedback manipulated variable determining unit is a unit which sequentially determines, as the feedback manipulated variable having a function for brining the posture state amount error close to zero, the model external force manipulated variable and the actual robot external force manipulated variable that defines the additional external force to be additionally applied to the actual robot on the basis of the observed value of the posture state amount error, and
the motion control unit has a compliance control function which controls the motion of the robot to cause the actual motion of the robot to follow the time series of the instantaneous value of the desired motion while additionally applying an additional external force defined by the actual robot external force manipulated variable to the actual robot.

* * * * *